(12) United States Patent
Lee et al.

(10) Patent No.: US 10,558,239 B2
(45) Date of Patent: Feb. 11, 2020

(54) LAYERED ACCESSORY CASE FOR ELECTRONIC DEVICE AND CRADLING DEVICE THEREOF

(71) Applicants: Samsung Electronics Co., Ltd., Gyeonggi-do (KR); HaA inc Korea, Seoul (KR)

(72) Inventors: Jae-Wook Lee, Gyeonggi-do (KR); Sangpil Kil, Seoul (KR); Jung-Hun Kim, Gyeonggi-do (KR); Young Ho Rhee, Gyeonggi-do (KR); Jong-Chul Choi, Gyeonggi-do (KR)

(73) Assignees: Samsung Electronics Co. Ltd (KR); HaA inc Korea (KR)

( * ) Notice: Subject to any disclaimer, the term of this patent is extended or adjusted under 35 U.S.C. 154(b) by 0 days.

(21) Appl. No.: 15/941,740

(22) Filed: Mar. 30, 2018

(65) Prior Publication Data

US 2018/0284841 A1     Oct. 4, 2018

(30) Foreign Application Priority Data

Mar. 31, 2017 (KR) .......................... 10-2017-0042170

(51) Int. Cl.
| | |
|---|---|
| *H04M 1/00* | (2006.01) |
| *G06F 1/16* | (2006.01) |
| *H04B 1/3888* | (2015.01) |
| *H04M 1/725* | (2006.01) |
| *A45C 11/00* | (2006.01) |

(52) U.S. Cl.
CPC ............ *G06F 1/1628* (2013.01); *A45C 11/00* (2013.01); *H04B 1/3888* (2013.01); *H04M 1/7253* (2013.01); *A45C 2011/001* (2013.01); *A45C 2011/002* (2013.01); *A45C 2011/003* (2013.01); *A45C 2200/15* (2013.01); *G06F 2200/1633* (2013.01)

(58) Field of Classification Search
None
See application file for complete search history.

(56) References Cited

U.S. PATENT DOCUMENTS

| | | | | |
|---|---|---|---|---|
| 7,518,077 B2* | 4/2009 | Guo | ....................... | H01H 15/10 |
| | | | | 200/536 |
| 8,744,357 B2* | 6/2014 | Zhu | ...................... | H04B 5/0043 |
| | | | | 340/568.1 |
| 8,785,798 B2* | 7/2014 | Gao | ....................... | H01H 15/24 |
| | | | | 200/537 |
| 9,100,064 B2* | 8/2015 | Griffin | ..................... | H04B 5/02 |

(Continued)

FOREIGN PATENT DOCUMENTS

| | | |
|---|---|---|
| KR | 10-2013-0080484 | 7/2013 |
| KR | 10-2014-0021392 | 2/2014 |

*Primary Examiner* — Tuan A Tran
(74) *Attorney, Agent, or Firm* — The Farrell Law Firm, P.C.

(57) ABSTRACT

An electronic device having a detachable layered accessory case includes a communication unit, and a layered accessory case capable of being coupled to or separated from the electronic device, wherein the layered accessory case includes a first case configured to cover at least a portion of the electronic device, and a second case configured with a layered structure in the first case. A communication functional unit is capable of delivering a signal with respect to the communication unit, and may be disposed in one or both of the first case and the second case.

7 Claims, 110 Drawing Sheets

(56) References Cited

U.S. PATENT DOCUMENTS

| | | | | |
|---|---|---|---|---|
| 9,681,719 B2* | 6/2017 | Ehrlich | .................. | A45C 11/00 |
| 2004/0203381 A1* | 10/2004 | Cahn | .................... | H04B 5/0012 |
| | | | | 455/41.2 |
| 2008/0029379 A1* | 2/2008 | Guo | ....................... | H01H 15/10 |
| | | | | 200/547 |
| 2009/0209306 A1* | 8/2009 | Griffin | ................ | H04M 1/0202 |
| | | | | 455/575.4 |
| 2013/0271264 A1* | 10/2013 | Page | ........................ | G08B 1/08 |
| | | | | 340/6.1 |

* cited by examiner (a)          (b)

(a)          (b)

LAYERED ACCESSORY CASE FOR ELECTRONIC DEVICE AND CRADLING DEVICE THEREOF

CROSS REFERENCE TO RELATED APPLICATION(S)

This application is based on and claims priority under 35 U.S.C. § 119 to Korean Patent Application No. 10-2017-0042170, filed on Mar. 31, 2017, in the Korean Intellectual Property Office, the disclosure of which is incorporated herein by reference.

BACKGROUND

1. Field

The present disclosure relates to a switching structure between a layered external case detachable from an electronic device and a cradling device supporting the layered external case.

2. Description of Related Art

A typical electronic device may be coupled to an electronic device to protect the electronic device from an impact such as a drop, and may be used as an auxiliary electronic device or an auxiliary switchgear device. In addition, the accessory case may function as an ornament by varying its color, material, or exterior design.

In addition to a simple protection function, a conventional accessory case provides only a simple service function. Therefore, in order to provide a subdivided individual service functions, the accessory case may need to be inconveniently replaced.

SUMMARY

Embodiments of the disclosure are to address at least the above-mentioned problems and/or disadvantages and to provide at least the advantages described below.

In accordance with an embodiment, an accessory case of an electronic device includes a first case configured to cover at least a portion of the electronic device, and a second case configured with a layered structure in the first case. A communication functional unit is configured in one or both of the first case and the second case.

In accordance with another embodiment, an electronic device includes a communication unit, and a layered accessory case capable of being coupled to or separated from the electronic device. The layered accessory case includes a first case configured to cover at least a portion of the electronic device, and a second case configured with a layered structure in the first case. A communication functional unit is capable of delivering a signal with respect to the communication unit, and disposed in one or both of the first case and the second case.

In accordance with another embodiment, an accessory case includes a case, a button disposed at one side of the case, at least one coupling lever disposed inside the case and configured to move in response to a pressing operation of the button, an inclination mechanism disposed below the button and configured to convert the pressing operation of the button to a horizontal movement operation of the coupling lever, and a magnetic switch disposed inside the case and turned on or off in response to a movement of the coupling lever.

In accordance with another embodiment, an accessory case of an electronic device includes a case, a sliding key disposed at one side of the case, and at least one switch disposed at one side of the case and turned on or off depending on whether the sliding key moves. The switch includes a first switch disposed to face the sliding key and disposed to be interfered with by movement of at least a portion of the sliding key, and a second switch disposed in proximity to the first switch and turned on or off by at least the portion of the sliding key.

In accordance with another embodiment, an apparatus includes an accessory case protecting an electronic device, a mounting projection coupled to the accessory case in a layered structure, a mounting body coupled to the mounting projection to mount the electronic device, and a contact switch disposed on the mounting projection and automatically operating depending on the mounting operation. The contact switch includes a button protruding to be at least partially exposed to an outer side of the mounting projection, and a switch disposed inside the mounting projection and operating when at least one portion of the button is pressed by the mounting body.

According to embodiments, a layered accessory case may be configured in a layered structure, and an additional accessory case may be configured to provide services specified to individuals.

According to embodiments, a layered accessory case includes a switch, and is configured to automatically operate the switch when mounted to a cradle, thereby providing a specified service while mounting an electronic device.

According to embodiments, a layered accessory case is mountable to a cradle, and is rotatable in a mounted state. Therefore, a switch simultaneously operates automatically after being mounted.

BRIEF DESCRIPTION OF THE DRAWINGS

The above and other aspects, features and advantages of certain embodiments will be more apparent from the following description taken in conjunction with the accompanying drawings, in which.

DETAILED DESCRIPTION

Figure 1A:
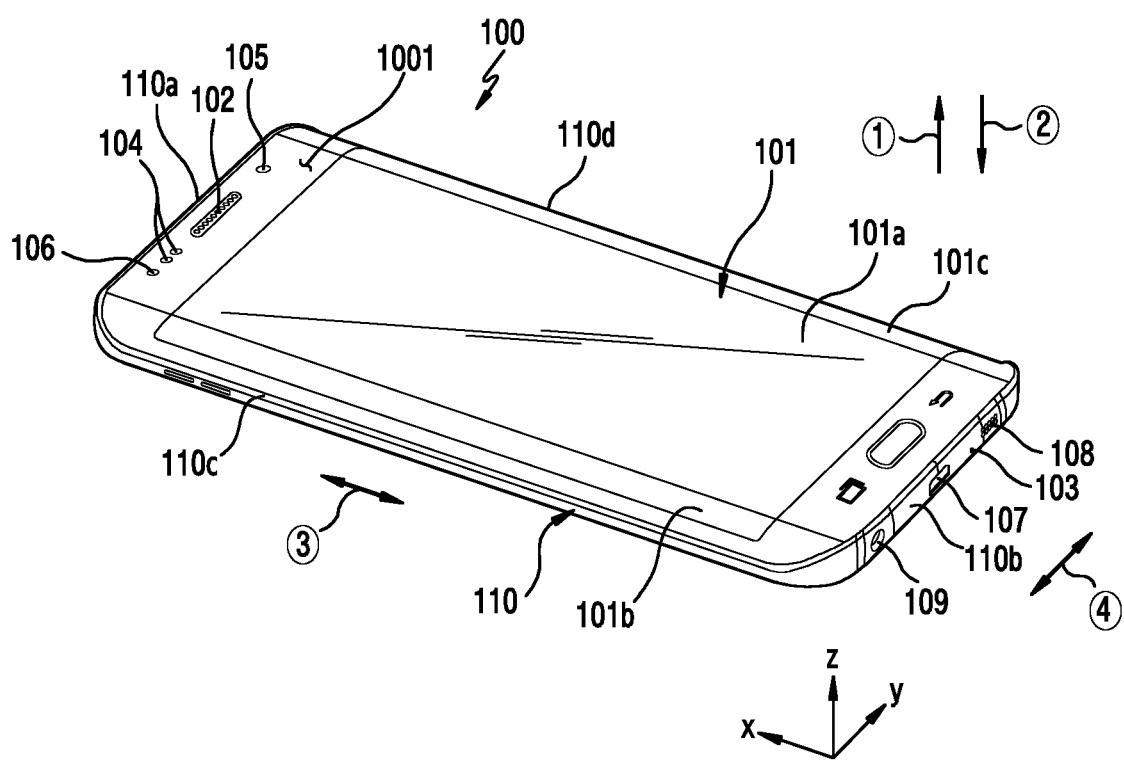
FIG. 1A is a perspective view illustrating a front side of an electronic device, according to an embodiment.

Embodiments of the present disclosure will be described with reference to accompanying drawings. However, embodiments of the present disclosure are not limited to specific embodiments, and it should be understood that modifications, equivalents, and/or alternatives of the embodiments described herein can be variously made. Descriptions of well-known functions and/or configurations will be omitted for the sake of clarity and conciseness.

The expressions "have," "may have," "include," "comprise," "may include" and "may comprise" used herein indicate the existence of corresponding features, such as numeric values, functions, operations, or components and do not preclude the presence of additional features.

The expressions "A or B," "at least one of A or/and B," or "one or more of A or/and B," as used herein may include any and all combinations of one or more of the associated listed items. For example, "A or B," "at least one of A and B," or "at least one of A or B" may refer to (1) where at least one A is included, (2) where at least one B is included, or (3) where both of at least one A and at least one B are included.

Terms, such as "first" and "second," as used herein, may refer to various elements of embodiments of the present disclosure, but do not limit the elements. Such terms do not limit the order and/or priority of the elements. Furthermore, such terms may be used to distinguish one element from another element. For example, "a first user device" and "a second user device" indicate different user devices regardless of the order or priority. Without departing from the scope of the present disclosure, a first element may be referred to as a second element, and similarly, a second element may be referred to as a first element.

It will be understood that when an element, such as a first element, is referred to as being "(operatively or communicatively) coupled with/to" or "connected to" another element, such as a second element, it can be directly coupled with/to or connected to another element or coupled with/to or connected to another element via an intervening element, such as a third element. In contrast, when an element, such as a first element, is referred to as being "directly coupled with/to" or "directly connected to" another element, such as a second element, it should be understood that there is no intervening element, such as a third element.

The expressions "configured to" or "set to" may be used interchangeably with the expressions "suitable for," "having the capacity to," "designed to," "adapted to," "made to," or "capable of". The terms "configured to" or "set to" do not mean only "specifically designed to" in hardware. Instead, the expression "a device configured to" may mean that the device is "capable of" operating together with another device or other components. For example, a "processor configured to (or set to) perform A, B, and C" may mean a dedicated processor (for example, an embedded processor) for performing a corresponding operation or a generic-purpose processor (for example, a central processing unit (CPU) or an application processor (AP)) which may perform corresponding operations by executing one or more software programs which are stored in a memory device.

Terms used in the present disclosure describe specified embodiments of the present disclosure and are not intended to limit the scope of other embodiments. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal way, unless expressly so defined herein in embodiments of the present disclosure. In some cases, even if terms are defined in the specification, they may not be interpreted to exclude embodiments of the present disclosure.

An electronic device may include smartphones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) audio layer 3 (MP3) players, mobile medical devices, cameras, or wearable devices, such as smart glasses, head-mounted-devices (HMDs), electronic apparels, electronic bracelets, electronic necklaces, electronic appcessory, electronic tattoos, smart mirrors, or smart watches.

The electronic devices may be smart home appliances and may include at least one of televisions (TVs), digital video disk (DVD) players, audio players, refrigerators, air conditioners, cleaners, ovens, microwave ovens, washing machines, air cleaners, set-top boxes, home automation control panels, security control panels, TV boxes, such as Samsung HomeSync™, Apple TV™, or Google TV™, game consoles, such as Xbox™ and PlayStation™, electronic dictionaries, electronic keys, camcorders, and electronic picture frames.

The electronic devices may include various portable medical measurement devices, such as a blood glucose monitoring device, a heartbeat measuring device, a blood pressure measuring device, and a body temperature measuring device, a magnetic resonance angiography (MRA), a magnetic resonance imaging (MRI) device, a computed tomography (CT), scanners, ultrasonic devices, navigation electronic devices, global positioning system receivers (GPSs), event data recorders (EDRs), flight data recorders (FDRs), vehicle infotainment devices, electronic equipment for vessels, such as navigation systems and gyrocompasses, avionics, security devices, head units for vehicles, industrial or home robots, automatic teller machines (ATMs), points of sales (POSs) devices, or Internet of things (IoT) devices, such as light bulbs, various sensors, electric or gas meters, sprinkler devices, fire alarms, thermostats, street lamps, toasters, exercise equipment, hot water tanks, and heaters, boilers.

The electronic devices may include at least one of a part of furniture or buildings/structures, electronic boards, electronic signature receiving devices, projectors, or various measuring instruments, such as water meters, electricity meters, gas meters, or wave meters. The electronic devices may be one or more combinations of the above-mentioned devices and may be flexible electronic devices. Also, electronic devices according to an embodiment are not limited to the above-mentioned devices, and may include new electronic devices according to the development of new technologies.

Figure 1B:
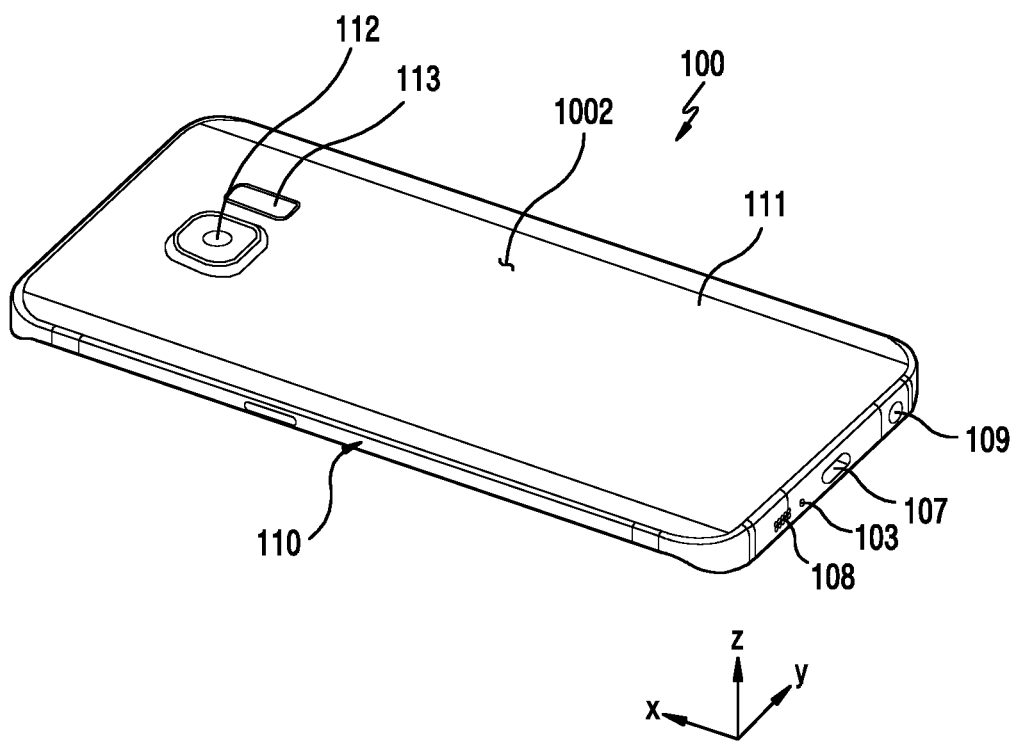
FIG. 1B is a perspective view illustrating a rear side of an electronic device, according to an embodiment.

FIG. 1A is a perspective view illustrating a front side of an electronic device, according to an embodiment of the present disclosure. FIG. 1B is a perspective view illustrating a rear side of an electronic device, according to an embodiment of the present disclosure. An orthogonal coordinate system is used in which an X-axis may imply a widthwise direction of an electronic device, a Y-axis may imply a lengthwise direction of the electronic device, and a Z-axis may imply a thickness direction of the electronic device.

Referring to FIG. 1A and FIG. 1B, an electronic device 100 may include a housing 110 to serve as an exterior and to protect an electronic component. The housing 110 may include a first side facing a first direction ①, a second side facing a second direction ② opposite to the first direction ①, and a lateral side facing a lateral direction perpendicular to each of the first and second directions ① and ② and at least partially covering a space between the first and second sides. The lateral direction may be a third direction ③ or a fourth direction ④, or may include both the third and fourth directions ③ and ④. The first side of the housing 110 may be a first plate, and the second side of the housing 110 may be a second plate.

In the housing 110, the first side may be an upper side of the housing when the first direction ① faces an upward direction, and the second side may be a rear side of the housing when the second direction ② faces a downward direction. In the housing 110, the first side may be a front side when the first direction ① faces the upward direction, and the second side may be a rear side when the second direction ② faces the downward direction.

The housing 110 may include a plurality of lateral sides. The lateral sides may include a lateral side of an upper edge 110a of the housing 110, a lateral side of a lower edge 110b of the housing, a side of a left edge 110c of the housing, and a lateral side of a right edge 110d of the housing. The upper edge 110a, the lower edge 110b, the left edge 110c, and the right edge 110d may together constitute a rim or boundary of the electronic device 100.

The electronic device 100 may include a single display 101. The single display 101 may include a flat display 101a and curved displays 101b and 101c disposed at at least one edge region of the flat display 101a. The display 101 may occupy at least 50% of an area of the housing 110. The display 101 may include a display module and a transparent member (e.g., a glass cover or a transparent window). The display module may include a display panel and a touch panel. The flat display 101a and the curved displays 101b and 101c may be configured by one flexible-type display module.

The flat display 101 may have first and second displays 101b and 101c disposed at a circumferential portion, that is, left and right edges. Although it is described with regards to the present embodiment that the first and second curved displays 101b and 101c are disposed on left and right edges of the flat display 101, the curved display may be located at various edge regions without being limited to the aforementioned position.

For example, the curved display may be disposed at any one of the upper edge 110a, the lower edge 110b, the left edge 110c, the right edge 110d, the upper and lower edges 110a and 110b, the left and right edges 110c and 110d, and the upper, lower, left and right edges 110a, 110b, 110c, and 110d. The upper and lower edges 110a and 110b to which first and second displays 122 and 123 are not displayed may include a portion of a metal housing. The portion of the metal housing may be an outer metal frame separated by an insulator, and thus may operate as an antenna radiator.

The electronic device 100 may include a receiver 102 disposed to output a voice of a peer user. The electronic device 100 may include a microphone device 103 disposed to transmit user's voice to the peer user.

The electronic device 100 may have components disposed around a place in which the receiver 102 is installed, to perform various functions of the electronic device 100. The components may include at least one sensor module 104 including at least one sensor, such as an illumination sensor (e.g., a light sensor), a proximity sensor, an infrared sensor, an ultrasonic sensor, a fingerprint sensor, and an iris sensor. The component may include a front camera device 105 and an indicator 106 (e.g., an LED device) to allow the user to recognize state information of the electronic device.

The electronic device 100 may include a speaker device 108 disposed on one side of the microphone device 103. The electronic device 100 may include an interface connector port 107 disposed on the other side of the microphone device 103 to charge the electronic device 100 by being provided with a data transmission/reception function and external power by means of an external device. The electronic device 100 may include an ear-jack hole 109 disposed on one side of the interface connector port 107.

The electronic device 100 may include the housing 110, which may be constructed of a conductive member and a non-conductive member. The housing 110 may be disposed along a rim of the electronic device 100, and may be disposed in such a manner that it extends to a portion of a front side or at least a portion of a rear side. The housing 110 defines at least a portion of a thickness of the electronic device 100 along the rim of the electronic device 100, and may have a closed loop shape. However, without being limited thereto, the housing 110 may be disposed on at least a portion of the thickness of the electronic device 100. At least a portion of the housing 110 may be included inside the electronic device 100.

The electronic device 100 may include a rear window 111 disposed on the second side (e.g., the rear side) facing the first side. The electronic device 100 may include a rear camera device 112 disposed through the rear window 111. The electronic device 100 may include at least one electronic component 113 disposed on one side of the rear camera device 112. The electronic component 113 may include at least one of an illumination sensor (e.g., a light sensor), a proximity sensor, an infrared sensor, an ultrasonic sensor, a heart rate sensor, a flash device, and a finger print sensor.

The electronic device 100 has a communication unit disposed inside the housing 110 to communicate with first and second communication chips described below in a wireless or wired manner. For example, the first and second communication chips may respectively include first and second near-field communication modules.

Hereinafter, a detachable and replaceable layered accessory case in an electronic device is described with reference to the accompanying drawings. The accessory case protects the electronic device, is utilized as an auxiliary electronic device, and has an ornament capability.

Figure 2A:
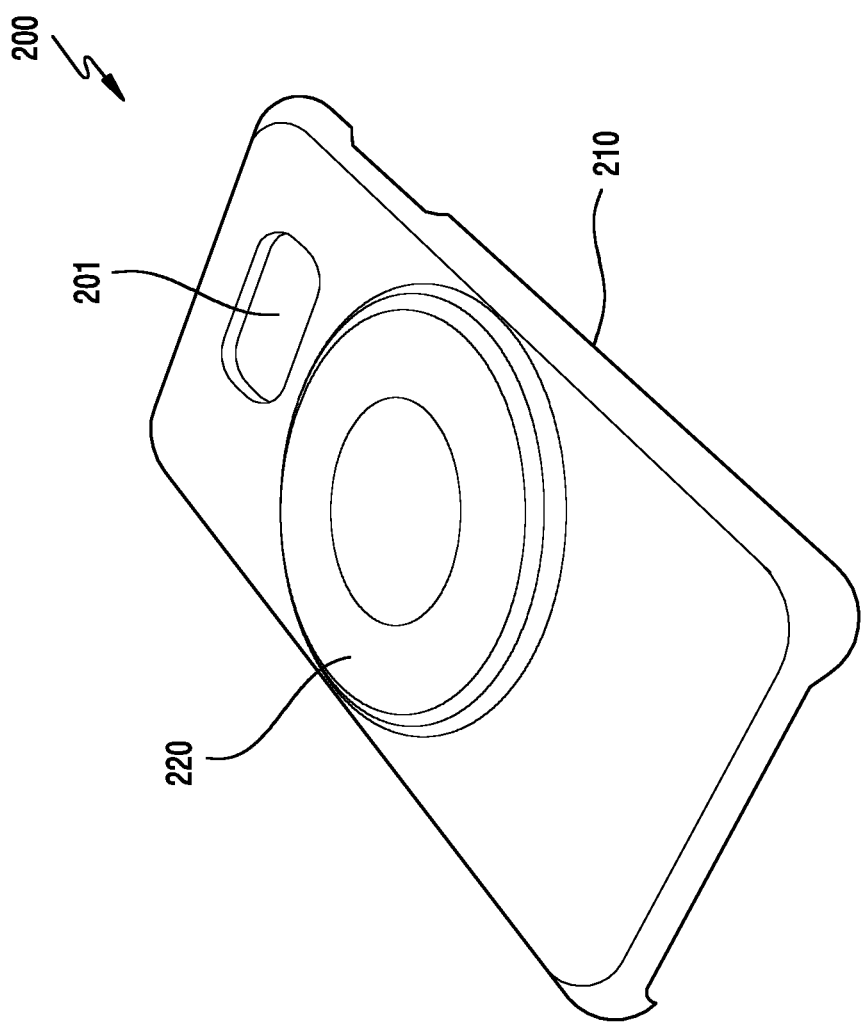
FIG. 2A is a perspective view illustrating a layered accessory case, according to an embodiment.
Figure 2B:
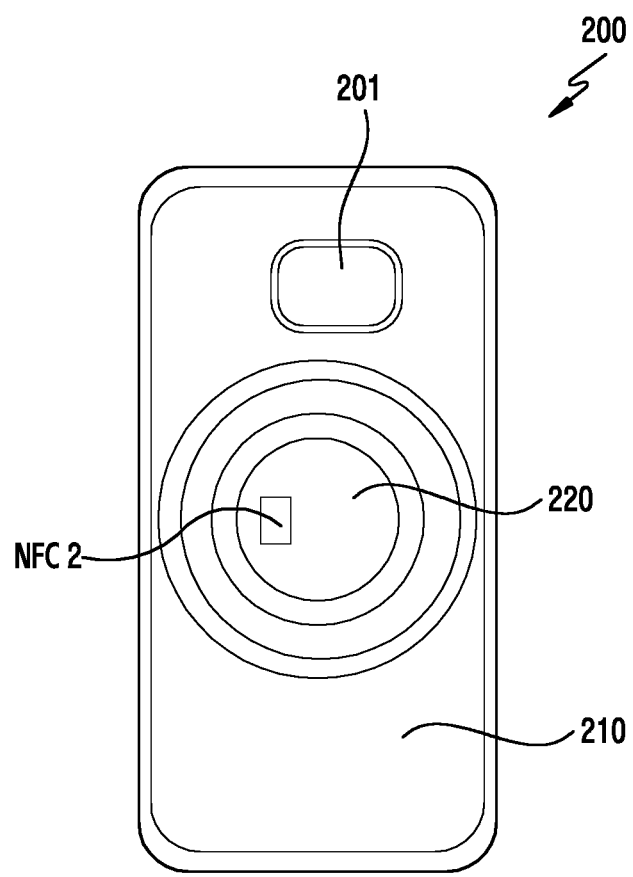
FIG. 2B is a rear view illustrating a layered accessory case, according to an embodiment.
Figure 2C:
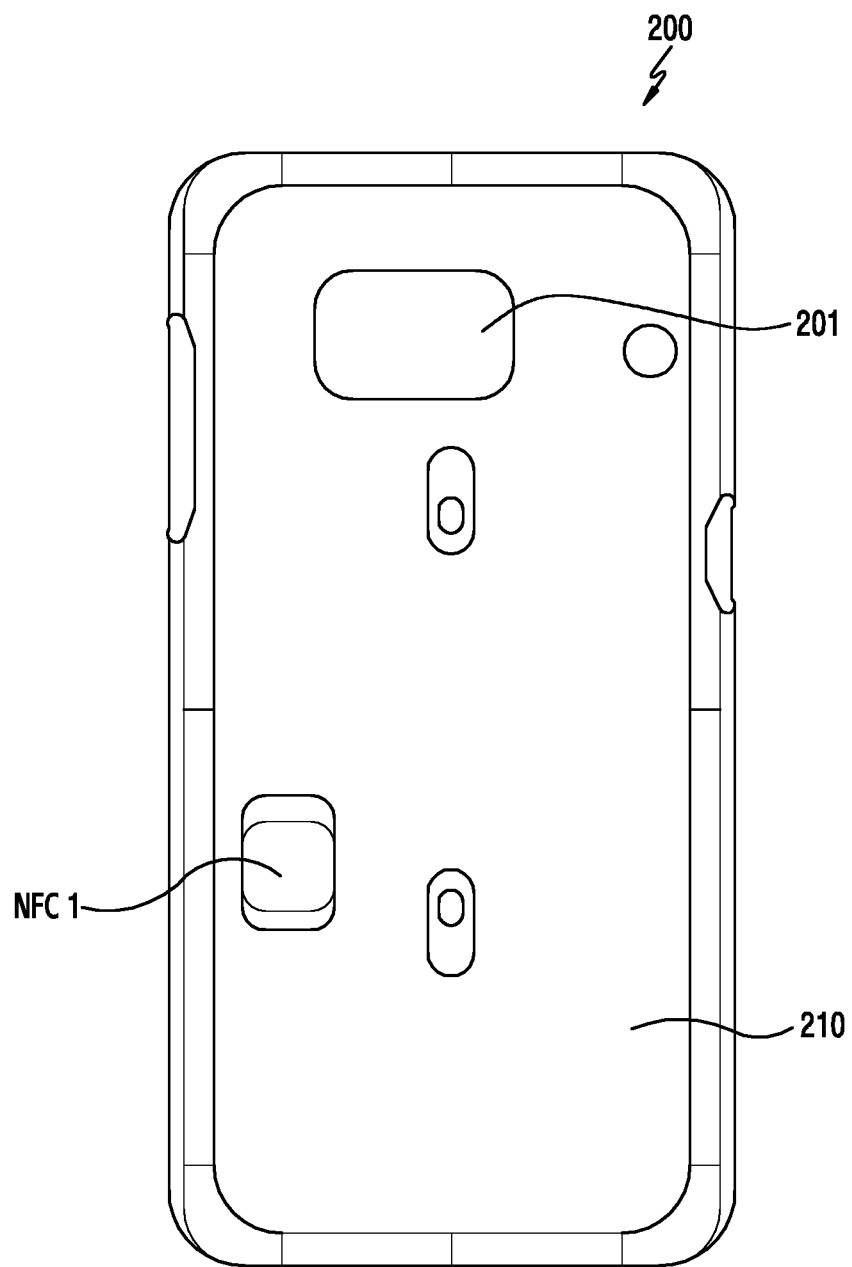
FIG. 2C is a front view illustrating a layered accessory case, according to an embodiment.

Referring to FIG. 2A to FIG. 2C, a layered accessory case 200 is a protective case detachable from a second side of the electronic device 100, such as a rear side (or a back cover) of the electronic device, and may operate as an auxiliary electronic device.

The layered accessory case 200 may be referred to as an external cover, a protective cover, a protective case, an accessory cover, an external case, an auxiliary cover, or an auxiliary case. The layered accessory case (hereinafter referred to as a case) may be constructed of a synthetic resin material, and may be constructed of a rigid material or a flexible material. In addition, the case 200 may be configured in a shape to protect the electronic device, and may function as an ornament by implementing various shapes and colors. The case 200 may have an opening 201 for a camera module disposed on the rear side of the electronic device.

The case 200 may consist of a first case 210 and a second case 220. The first case 210 is a basic case, and may be configured in a shape capable of being combined with the electronic device and capable of protecting the electronic device, and may be detached from the electronic device. The second case 220 may be integrally disposed on the first case 210, or may be an auxiliary case capable of being coupled detachably.

The first case 210 may be configured in a shape of covering at least a portion of a lateral side and second side of the electronic device, and the second case 220 may be coupled to a portion of the first case 210.

The second case 220 may be coupled to the first case 210 to be configured in the same layered shape as the first case 210, or may be configured in a shape of partially protruding from the first case 210. For example, the second case 220 may be configured in a circular shape in top view, and thus may be configured to be rotatable with respect to the first case 210.

The first case 210 may have a first communication chip (or a first functional communication unit), such as a first near-field communication chip (or NFC1) (e.g., a near-field communication antenna) mounted thereon. The NFC1 may be disposed on the front side or rear side of the first case 210.

The second case 220 according to various embodiments may have a second communication chip (e.g., a second functional communication unit), such as a second near-field communication chip (or NFC2) mounted thereon. The electronic device may use the second communication chip to apply an additional service. The NFC2 may be disposed on the front side or rear side of the second case 220. Alternatively, the near-field communication chip may be disposed on only any one of the first and second cases 210 and 220.

Hereinafter, the second case coupled to the first case will be described with reference to the accompanying drawings.

Figure 3A:
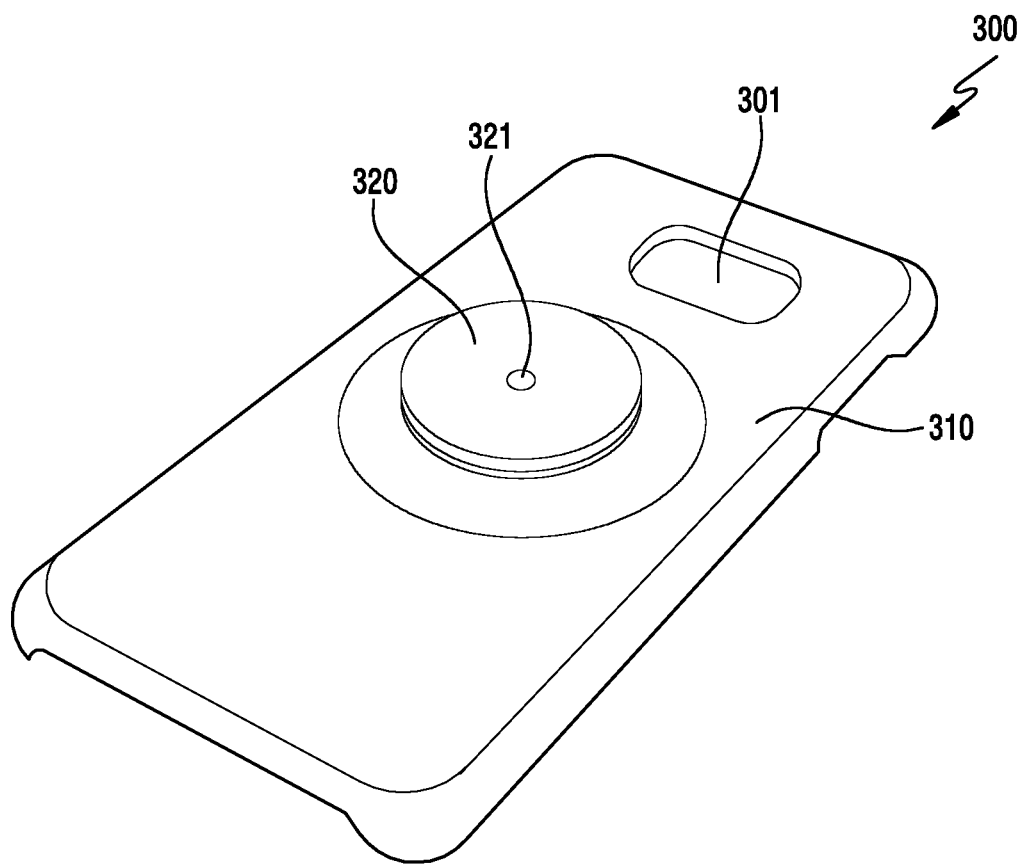
FIG. 3A is a perspective view illustrating a layered accessory case, according to an embodiment.
Figure 3B:
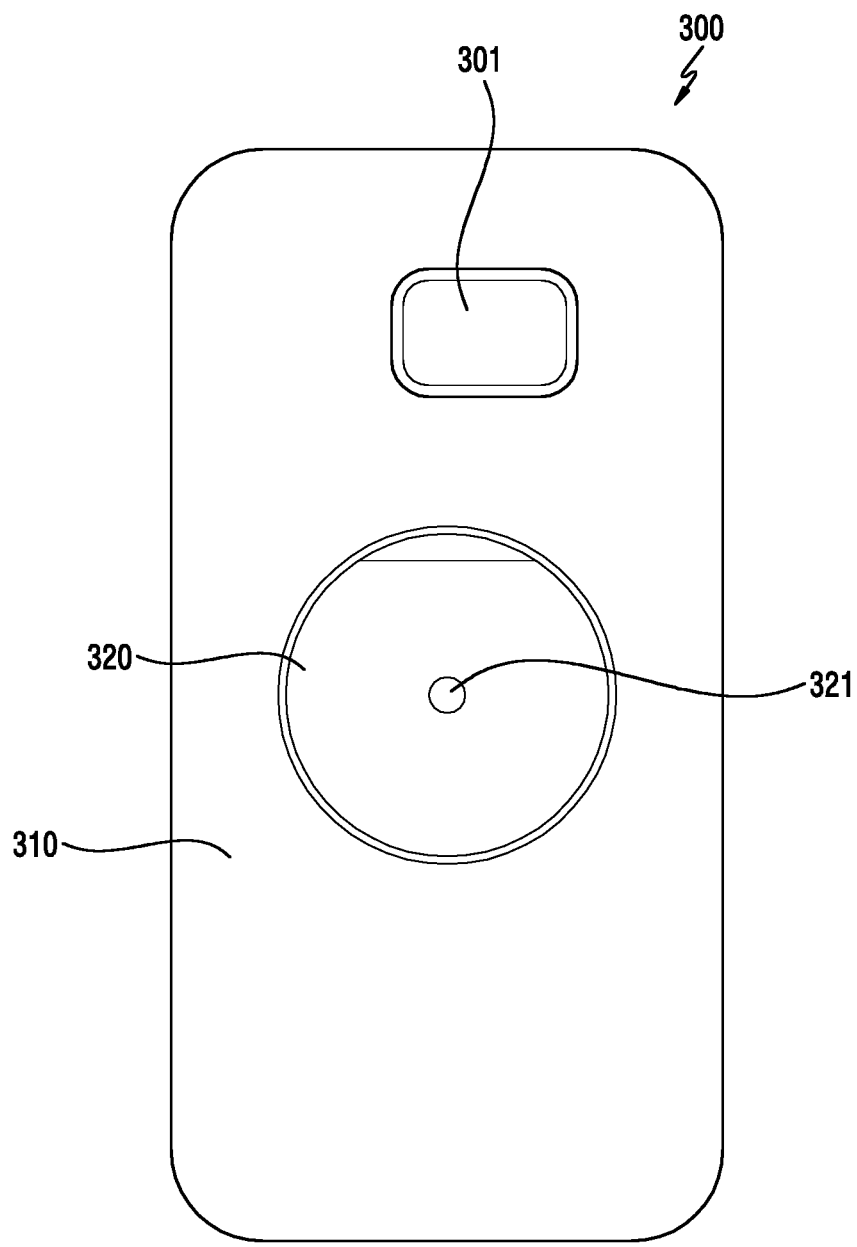
FIG. 3B is a rear view illustrating a layered accessory case, according to an embodiment.
Figure 3C:
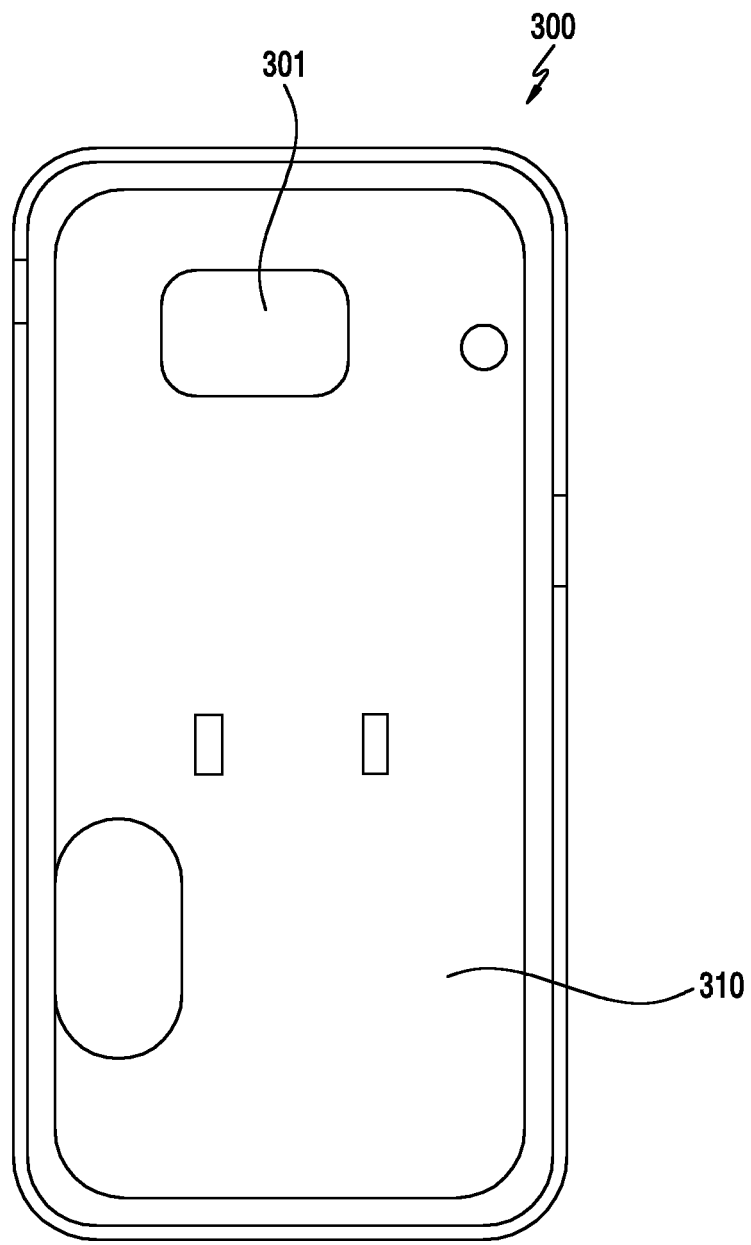
FIG. 3C is a front view illustrating a layered accessory case, according to an embodiment.

Referring to FIG. 3A to FIG. 3C, a case 300 may be configured at least partially or entirely identical to the case 200 of FIG. 2A. The case 300 may have a second case 320 provided with a button 321 and configured in a first case 310. The case may operate as an auxiliary electronic device when the button 321 provided in the second case 320 is pressed. The button 321 may be disposed in a shape slightly protruding from an outer side of the second case. An automatic switching structure using the button 321 will be described below and with reference to FIG. 28A and FIG. 28B.

Figure 3D:
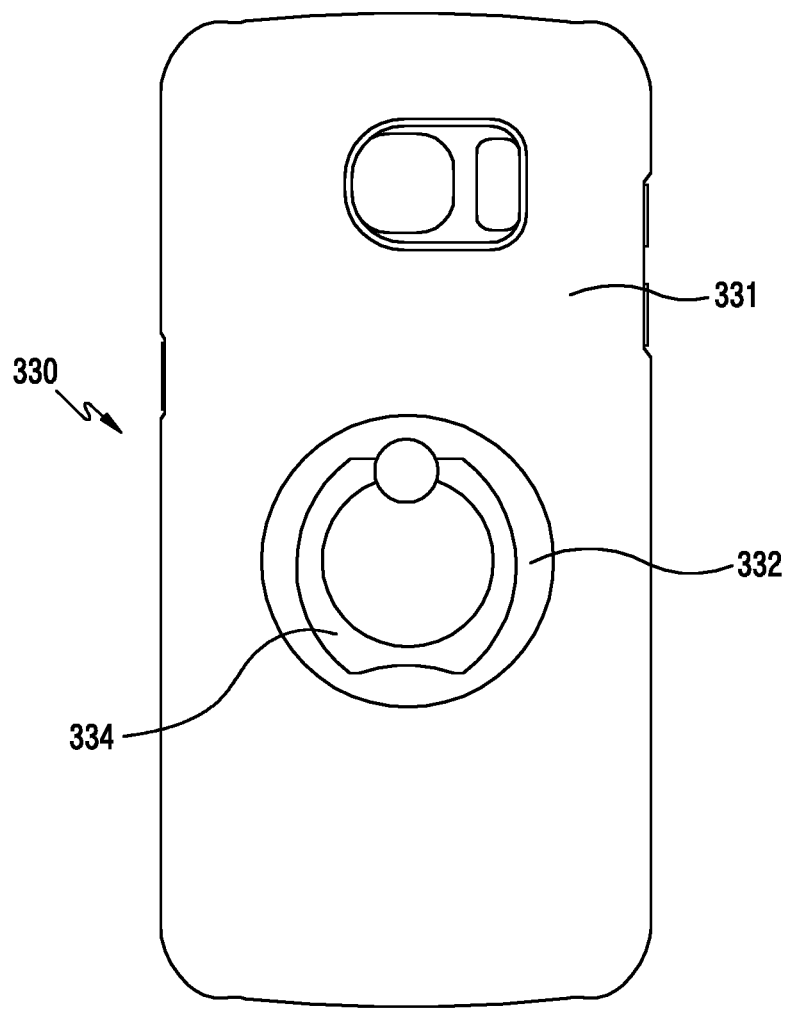
FIG. 3D to FIG. 3I are rear views illustrating a layered accessory case, according to embodiments.

Referring to FIG. 3D, a case 330 may be configured at least partially or entirely identical to the case 300 of FIG. 3A. The case 330 may have a second case 332 provided with a finger ring 334 and configured in a first case 331. Since the finger ring 334 is configured in the second case 332, the finger ring 334 may be utilized as a grip device of the electronic device. The finger ring is not necessarily limited to various ring shapes, and may be configured in a rotatable manner.

Figure 3E:
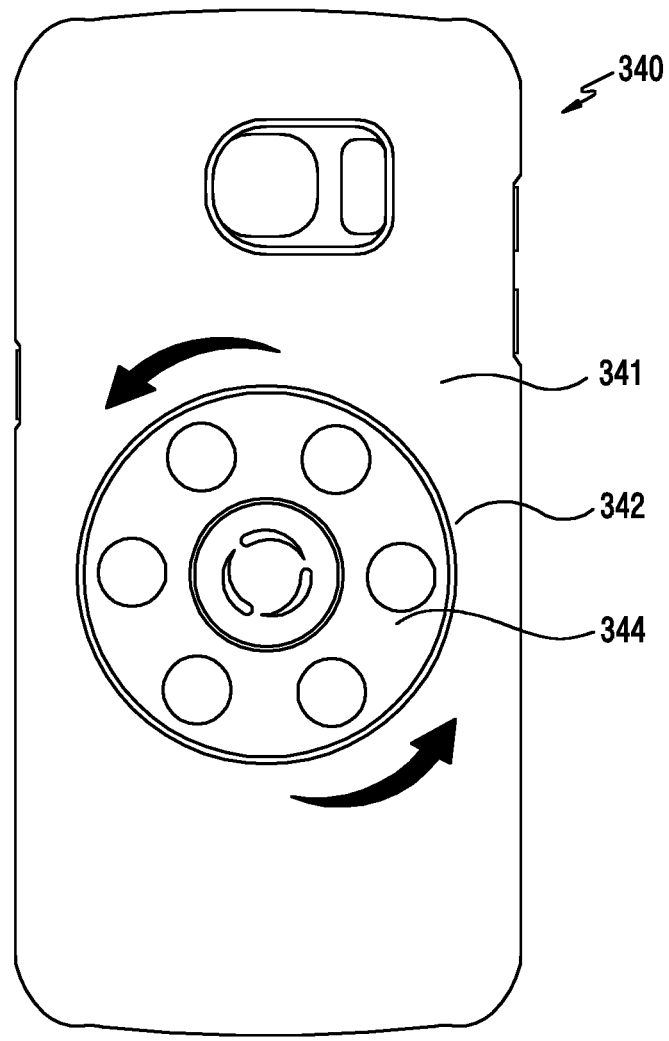

Referring to FIG. 3E, a case 340 may be configured at least partially or entirely identical to the case 300 of FIG. 3A. The case 340 may have a second case 342 provided with a dial button 344 in at least a portion thereof and configured in a first case 341. The dial button 344 disposed on the second case 342 may be coupled to the first case 341 and utilized as a data input device. The dial button 344 configured in the second case 342 may have a circular shape to input desired data by performing a pressing operation after rotating clockwise or counterclockwise. The dial button 344 may be disposed on the entirety or part of the second case 342. An embodiment of disposing the dial button 344 to the entirety of the second case is shown in FIG. 3E. The dial button 344 may be disposed in a state of being substantially coplanar with an outer surface of the first case 341 or in a state slightly protruding therefrom. In addition, the dial button 344 may be a portion of the first case 341.

Figure 3F:
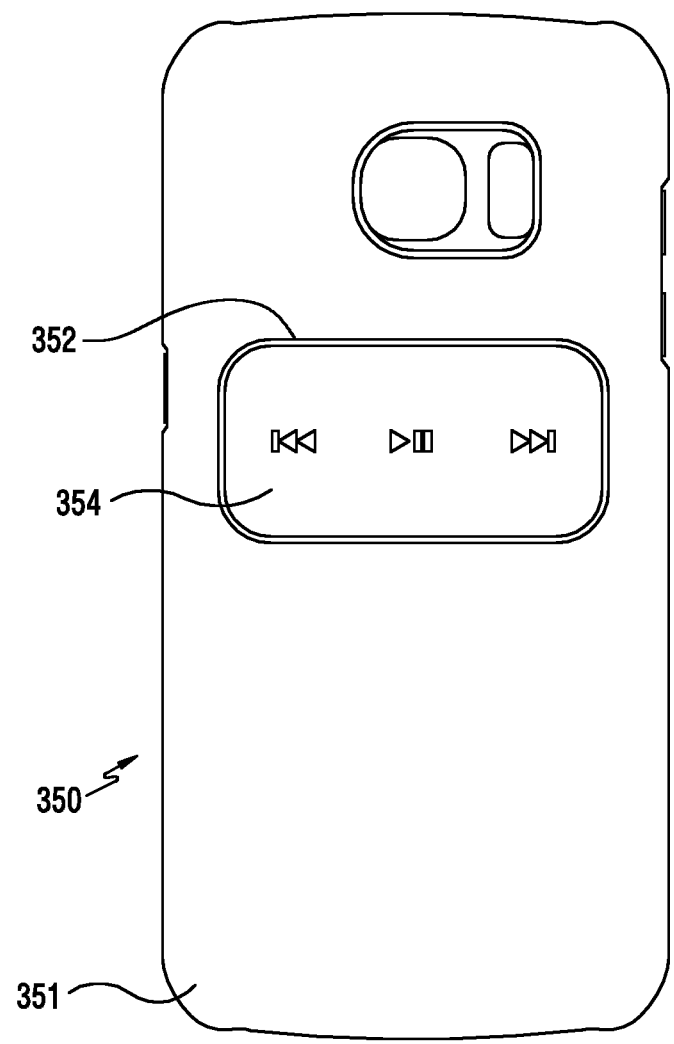

Referring to FIG. 3F, a case 350 may be configured at least partially identical to the case 300 of FIG. 3A. The case 350 may have a second case 352 provided with a touch pad 354 in at least a portion thereof and configured in a rear side of a first case 351. The second case 352 is provided with the touch pad 354, and the second case 352 to which the touch pad 354 is disposed may be a portion of the first case 351. The touch pad 354 may be coupled to the first case 351 so as to be utilized as a data input device. The touch pad 354 may include a touch sensitive panel for inputting data by performing a touch operation. The touch pad 354 may have a plurality of touch keys arranged thereon.

Figure 3G:
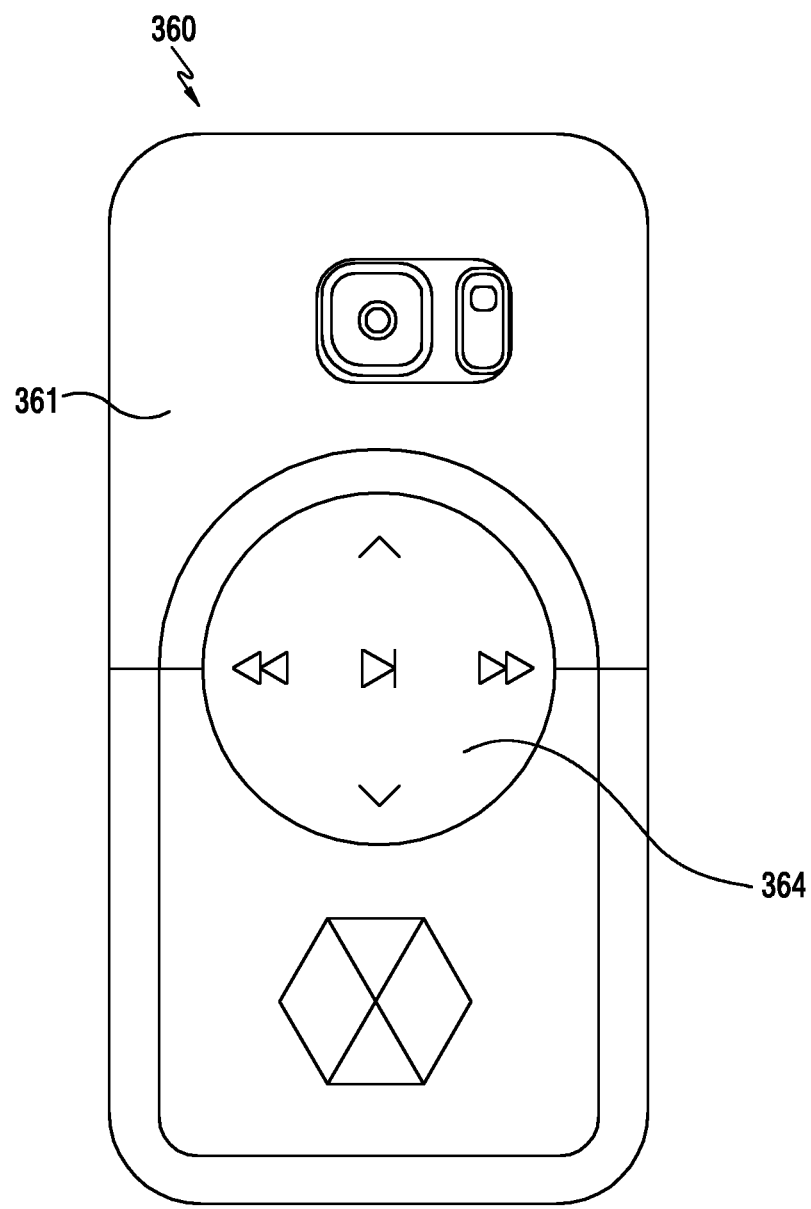

Referring to FIG. 3G, a case 360 may be configured at least partially identical to the case 300 of FIG. 3A. The case 360 may have a plurality of key buttons 364 configured in a rear side of a first case 361 in at least a portion thereof. The key buttons 364 may be equivalent to a portion of the first case 361. The key buttons 364 may be coupled to the first case 361 and utilized as a data input device. The key buttons 364 may be used to input data by a pressing operation.

Figure 3H:
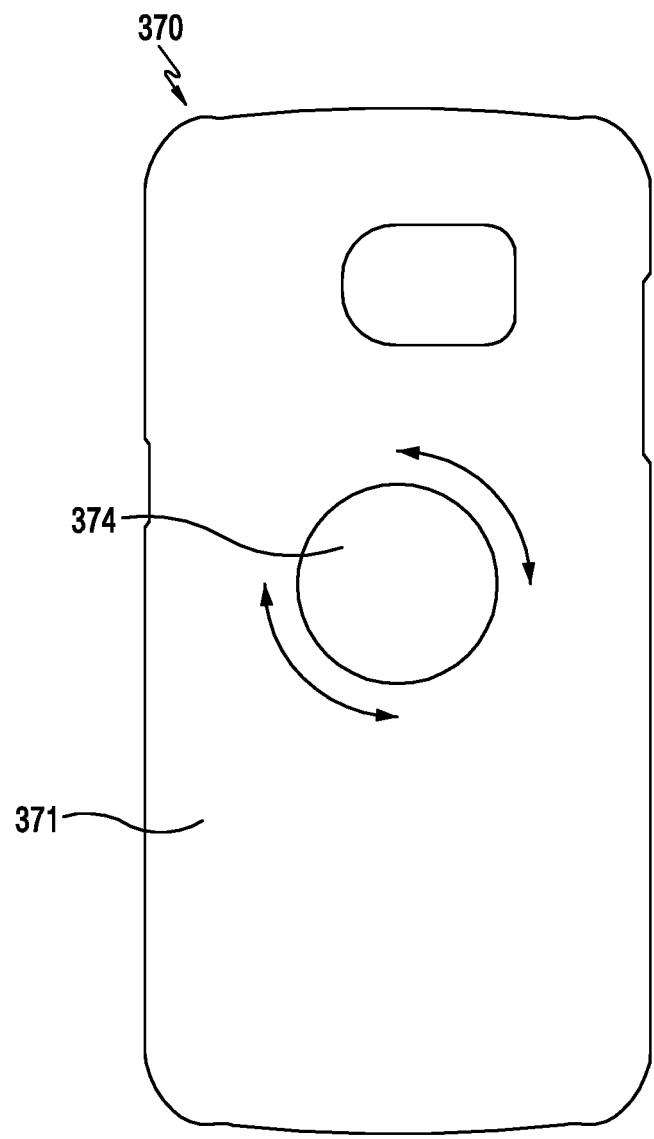
Figure 3I:
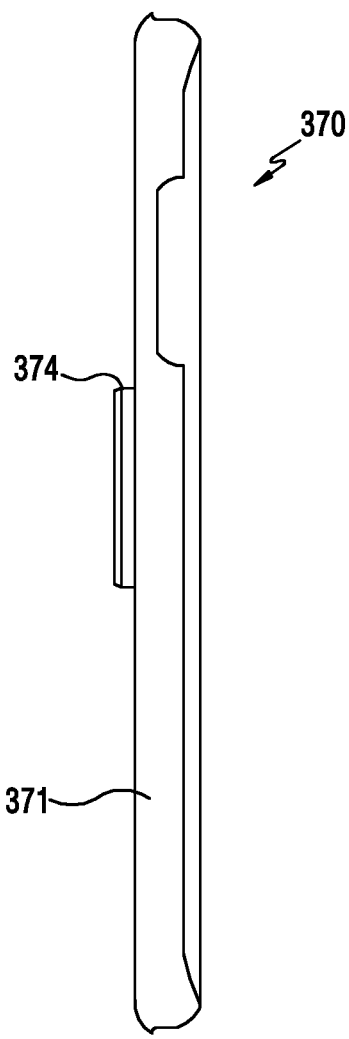

Referring to FIG. 3H and FIG. 3I, a case 370 may be configured at least partially identical to the case of FIG. 3A. The case 370 may have a jog dial 374 configured in the first case 371. The jog dial 374 may be manipulated by a pressing operation after a rotating operation, and in particular, may be placed in a vehicle so as to be used as a controller during driving.

Figure 4A:
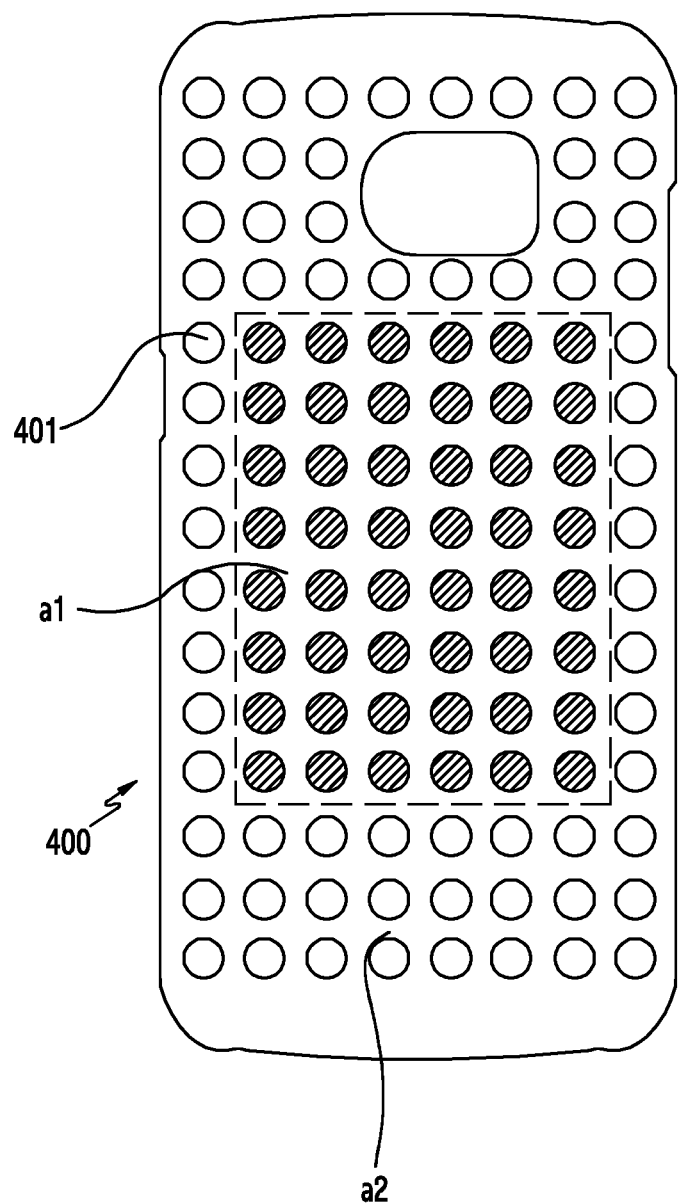
FIG. 4A is a front view illustrating a layered accessory case, according to an embodiment.
Figure 4B:
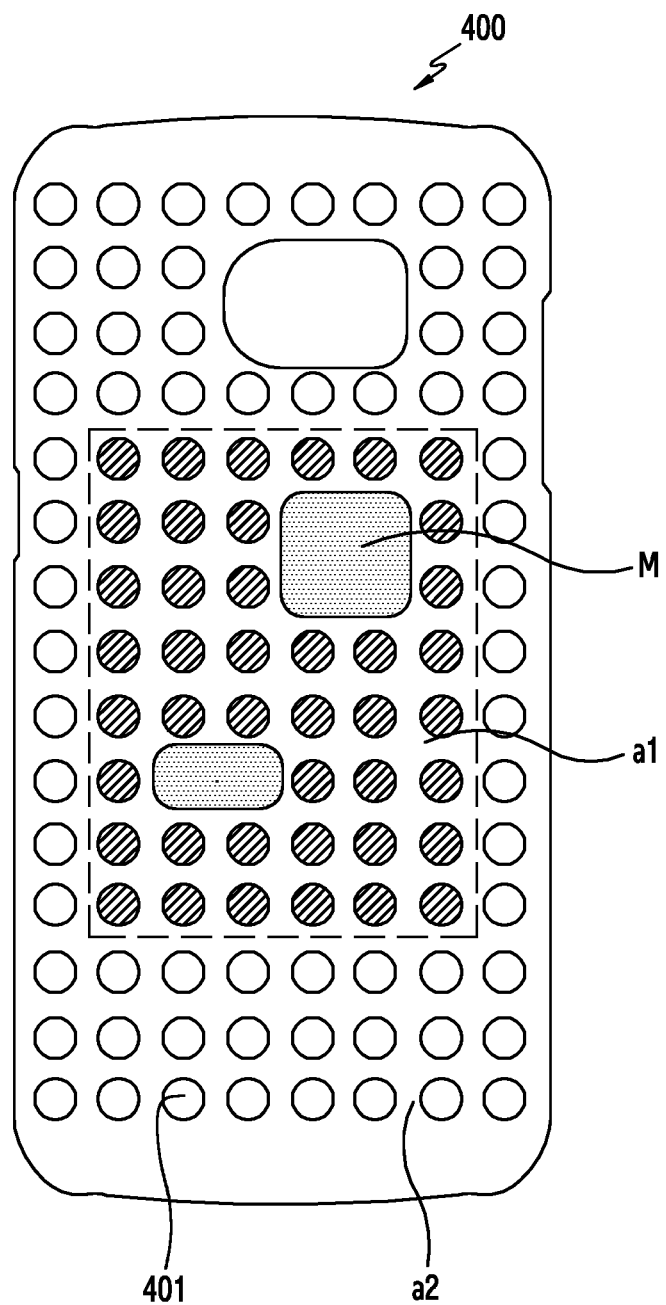
FIG. 4B is a front view illustrating a state where a communication module is coupled to a layered accessory case, according to an embodiment.
Figure 4C:
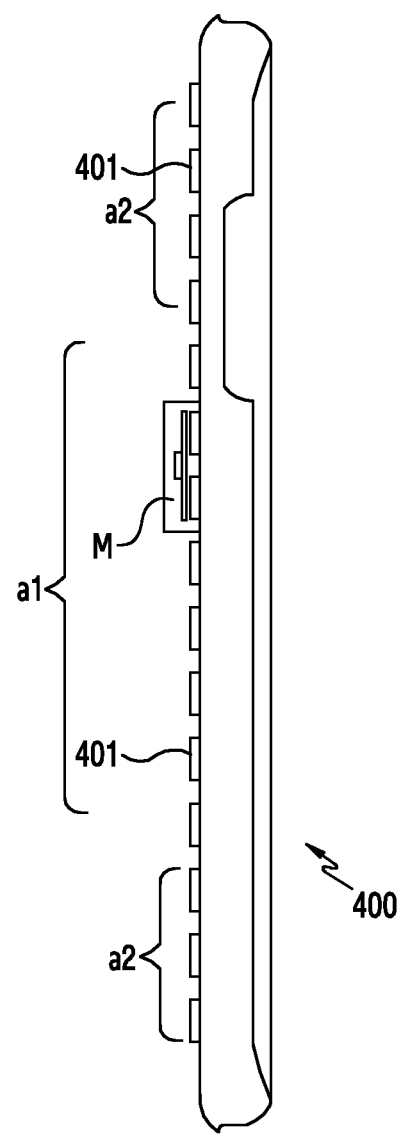
FIG. 4C is a lateral view illustrating a state where a communication module is coupled to a layered accessory case, according to an embodiment.

Referring to FIG. 4A to FIG. 4C, a case 400 may be entirely constructed of protrusions 401 having a coupling structure similar to a block toy (e.g., LEGO™) on a rear side. For example, the protrusions 401 may be regularly arranged at even intervals in widthwise and lengthwise directions on the rear side of the case 400. In a top view, an upper end of the protrusions 401 is not necessarily limited to a circular shape, and thus may be configured in a polygonal shape or the like. The protrusions 401 may be partially or entirely disposed on the rear side of the case 400, and may be divided into two regions.

The rear side of the case 400 may be divided into a central region a1 and a peripheral region a2. The central region a1 and the peripheral region a2 may be distinguished by positions thereof, and may be distinguished according to whether a short-range communication module M is coupled thereto. For this, an upper end surface of each protrusion 401 in the central region a1 is subjected to a surface treatment processing so as to be visually distinguished from each protrusion 401 in the peripheral region a2. The rear side of the case 400 may be distinguished not only visually but also tactually. The central region a1 and the peripheral region a2 may be tactually distinguished by providing a groove at an upper side of each protrusion 401 in the central region a1 and by not providing the groove at an upper side of the protrusion 401 in the peripheral region a2.

In the case 400, each protrusion 401 in the central region a1 may be distinguished from each protrusion 401 in the peripheral region a2 by configuring the regions in different colors. The distinguishing of the regions of the rear side of the case 400 is not necessarily limited to the aforementioned embodiments, and thus the central region a1 and the peripheral region a2 may also be distinguished through various possible methods. The central region a1 may be a region in which a coupling module, such as the short-range communication module M, can be assembled to the protrusion 401 having an upper end surface subjected to the surface treatment process. The short-range communication module M coupled to the central region a1 disposed at the rear side of the case 400 may operate with a button. A coupling structure having a protrusion shape similar to a block toy may be configured in one side of the short-range communication module M. The communication module M having the coupling structure of the block toy may be coupled within the central region a1. For example, the coupling structure may consist of a protrusion and a groove.

The short-range communication module may include a button and a short-range communication chip.

Figure 4D:
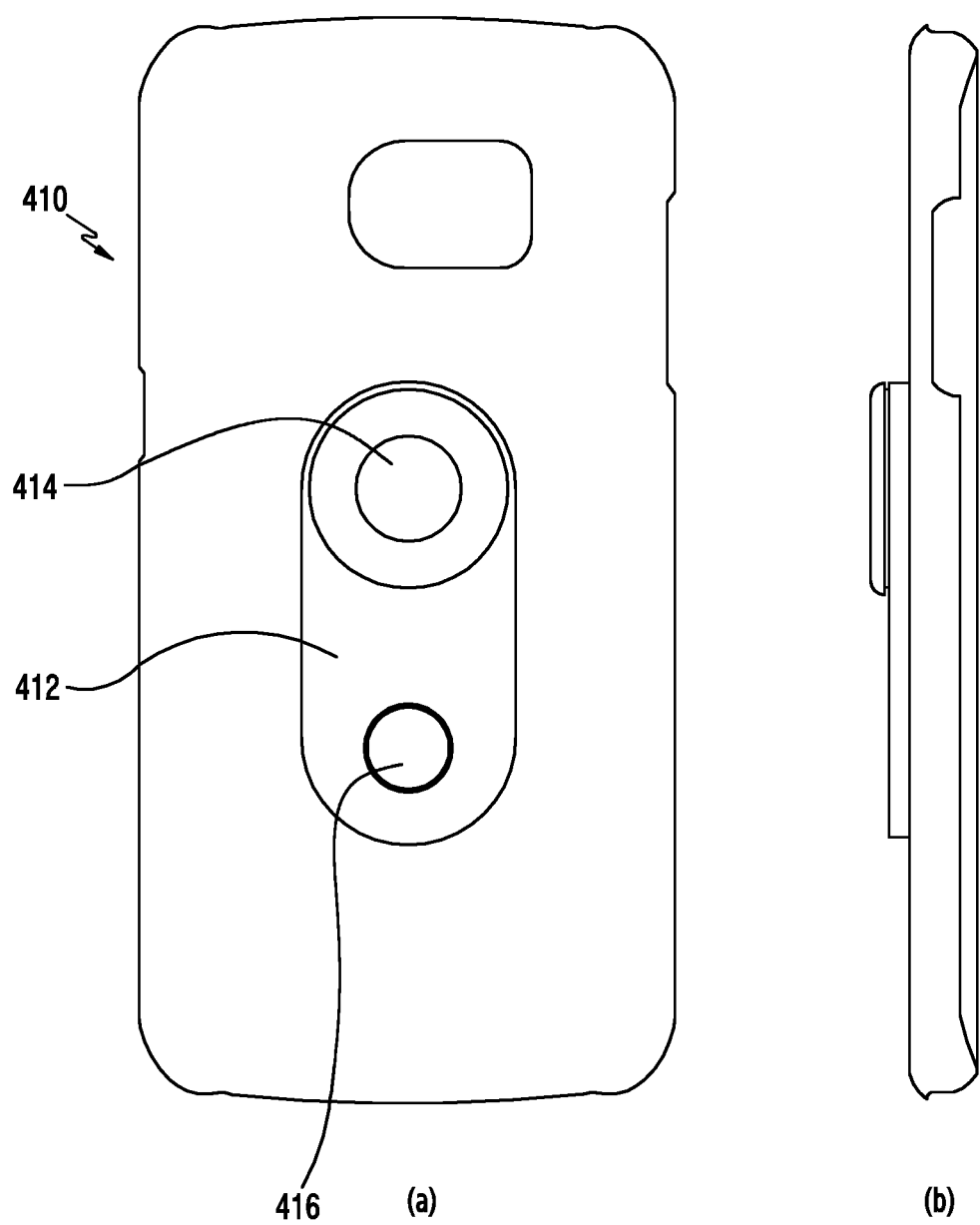
FIG. 4D and FIG. 4E are front views illustrating a front side (a) and a lateral side (b) of a layered accessory case, according to embodiments.

Referring to FIG. 4D, a case 410 may have a remote control part 412 detachably coupled to a rear side thereof. The remote control part 412 may include a four-directional key 414 and a short-range communication service activation key 416. The remote control part 412 may have the short-range communication service activation button 416 disposed in proximity to the four-directional key 412. When the remote control part 412 is separated from the case 410, the remote control part 412 may be used as an independent remote controller of an electronic device.

Figure 4E:
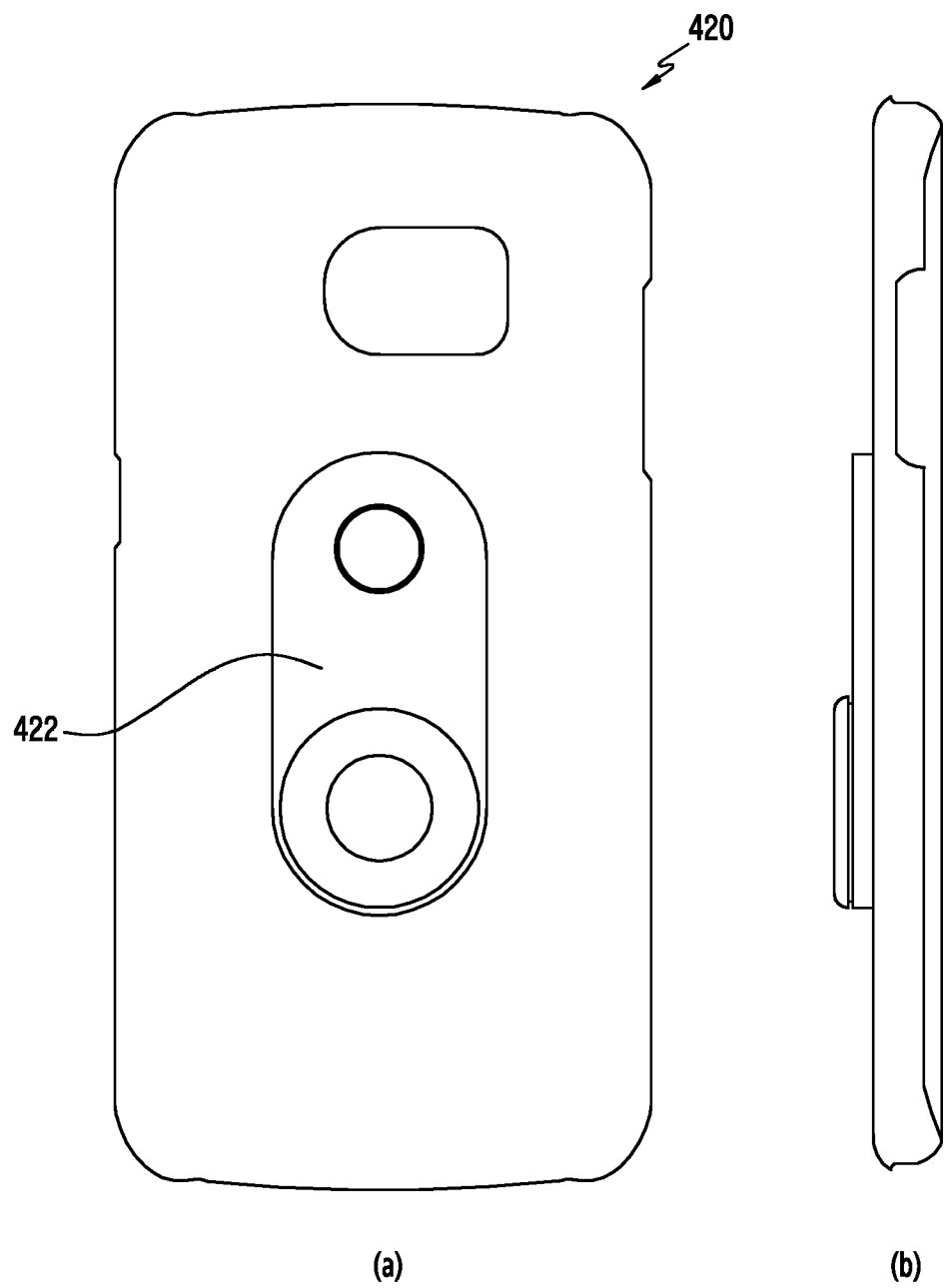

Referring to FIG. 4E, a remote control part 422 may be coupled to a case 420 in an opposite direction of arranging the remote control part 412 of FIG. 4D.

Hereinafter, a switching structure is described in which a short-range communication service is possible with a single motion even in a lock screen state of an electronic device. For example, the case may further include a switching structure for activating short-range communication with a single motion, and may use a contact switching structure and magnetic switching structure operating substantially simultaneously. The single motion may include any one operation selected from a one-touch operation, a single pressing operation, a single rotation operation, a single coupling or mounting operation, and a single sliding operation, or a combination of these operations. Hereinafter, the single motion may refer at least one or two associated aforementioned operations.

Figure 5A:
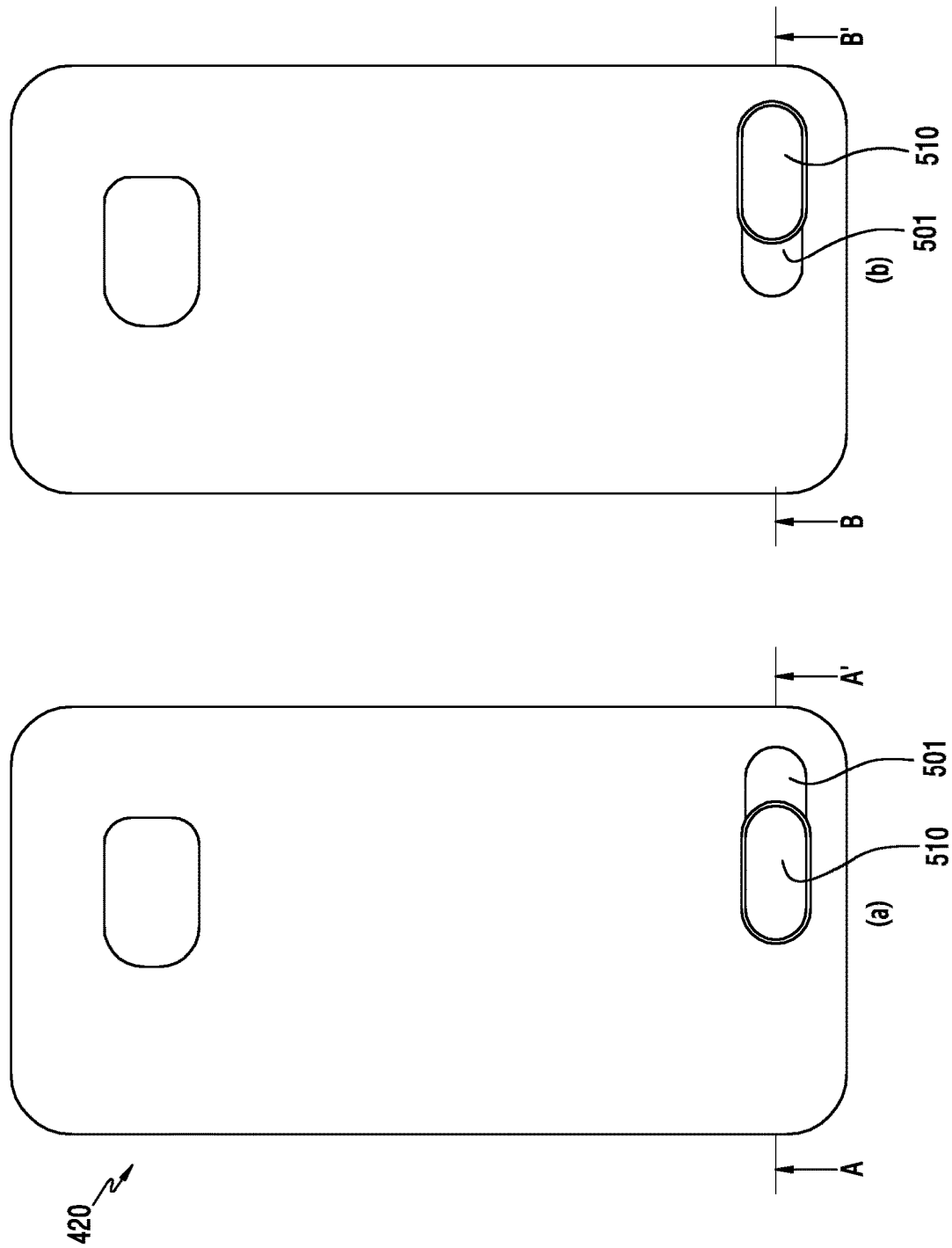
FIG. 5A illustrates a front side of a layered accessory case in a state (a) before the case moves and a state (b) after the case moves, according to an embodiment.
Figure 5B:
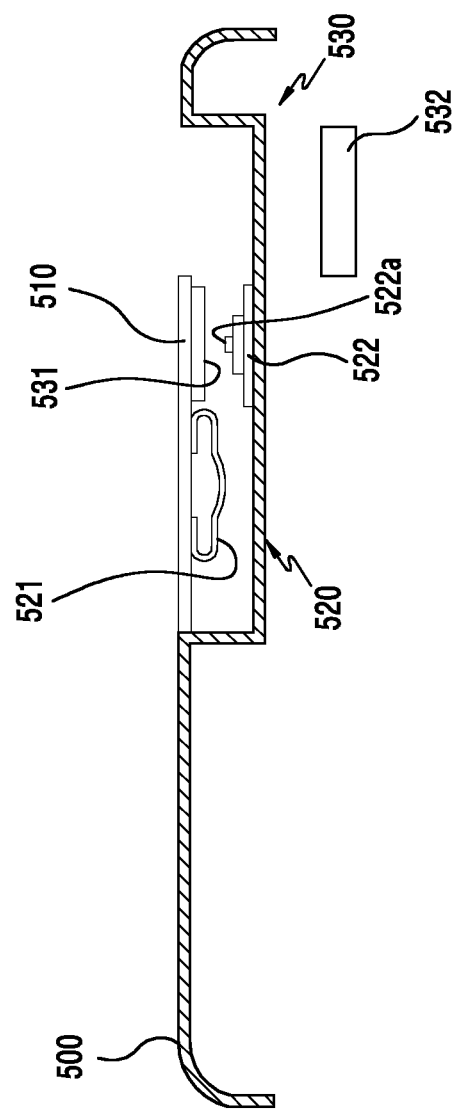
FIG. 5B is a cross-sectional view taken along the line A-A' of FIG. 5A (a) illustrating a state before a sliding key of a layered accessory case moves, according to an embodiment.
Figure 5C:
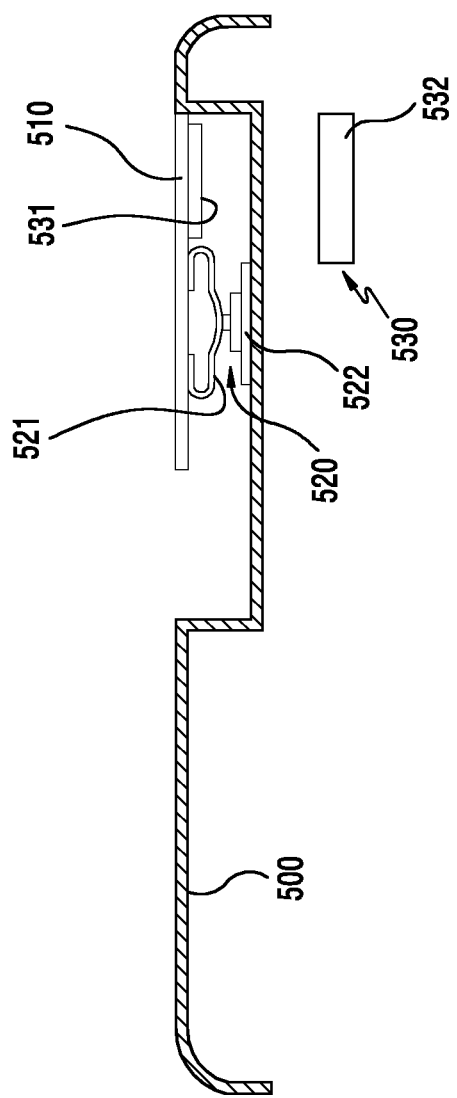
FIG. 5C is a cross-sectional view taken along the line B-B' of FIG. 5A (b) illustrating a state after a sliding key of a layered accessory case moves, according to an embodiment.

Referring to FIG. 5A to FIG. 5C, a case 500 may include a first side facing a first direction and a second side facing a direction opposite to the first direction. The first side of the case 500 is an inner side, and is an inner side facing a back cover of the electronic device. The second side may be an outer side of the case 500.

The case 500 may have at least one switching device operable on the second side. In particular, the switching device may be disposed in a region, such as a lower region, where a finger movement is convenient on the second side of the case 500. However, the switching device is not necessarily disposed only to a lower region of the case 500, and thus may be disposed in a region where a finger movement is easy on the second side. At least one switching device may be disposed in a layered type on the second side of the case 500.

The switching device may be turned on or off depending on whether a slide key 510 moves to the left or to the right. For example, when the slide key 510 moves to the left, as shown in FIG. 5B, the switching device may be turned off, and when it moves to the right, as shown in FIG. 5C, the switching device may be turned on. The left/right direction may imply a left/right direction with respect to a widthwise direction of the electronic device.

The switching device may include the slide key 510, a contact switch 520, and a magnetic switch 530.

The slide key 510 is a sliding member which is accommodated in a recess 501 disposed on the second side of the case 500 and which moves to the left and the right. A state of FIG. 5A (a) is a state where the switch is off, and a state of FIG. 5A (b) is a state where the switch is on. The sliding key 510 may include a first side facing a first direction and a second side facing a second direction opposite the first direction. The first side of the sliding key 510 is a side which is hidden inside, and may face the second side of the case 500. The second side of the sliding key 510 is an outer side exposed to the outside, and may be a side touched in a sliding operation.

The contact switch 520 may include a contact terminal 521 and a tact switch 522 arranged in an accommodation space disposed at the second side of the case.

The contact terminal 521 is provided in the second side of the sliding key 510, and each end thereof is bent and fixed to the sliding key 510. A middle portion of each end is a contact (pressing) portion, and may be configured in a shape of convexly bent in the direction of the tact switch 522. For example, the contact terminal 521 may be configured in an elastically changeable shape, and thus may change in shape depending on whether it is in contact with the tact switch 522. In another example, the contact terminal 521 may be configured in a vertically compressible or extendable shape to maintain a state of being in contact with the tact switch 522.

The tact switch 522 may be disposed in the accommodation space of the case 500 in a place adjacent to the contact terminal 521. For example, the tact switch 522 may be disposed at a bottom of the accommodation space at a location where the tact switch 522 is spaced apart from the contact terminal 521 when the sliding key 521 moves to the left and is in contact with the contact terminal 521 when the sliding key 510 moves to the right. The tact switch 522 may be provided with a button 522a, such as a manipulation protrusion (e.g., an actuator) to be pressed by the contact terminal 521, and the tact switch 522 may operate when the manipulation protrusion 522a is pressed. When the sliding key 510 moves to the left in a state of FIG. 5C, the contact switch 522 may be in a state of FIG. 5B.

The magnetic switch 530 may be disposed adjacent to the contact switch 520 and consist of a magnet 531 and a magnetic sensor 532. The magnet 531 may be disposed adjacent to (immediately next to) the contact terminal 521 on the second side of the sliding key 510. The magnet 531 may have a fragment shape, and may face a bottom side of a movement space. The magnetic sensor 532 may be disposed inside the case 500 in a place adjacent to the tact switch 522. In a state where the sliding key 510 is disposed on the left side, the magnetic sensor 532 does not operate since the magnet 531 and the magnetic sensor 532 are located spaced far apart from each other. In a state where the sliding key 510 is disposed on the right side, the magnetic sensor 532 may be turned on to output a sensed signal since the magnet 531 and the magnetic sensor 532 are disposed at a short distance while facing each other.

The magnetic switch 530 may operate almost simultaneously with the contact switch 520. The contact terminal 521 and the magnet 531 may be disposed to be spaced apart by a first distance on the second side of the sliding key 510. The tact switch 522 and the magnetic sensor 532 may be disposed to be spaced apart approximately by the first distance. When the switching device is viewed from a vertically upward direction of the second side, the tact switch 522 and the magnetic sensor 532 may be disposed to be spaced apart approximately by the first distance.

According to such an arrangement relation, when the sliding key 510 moves from the left to the right, the contact switch 520 and the magnetic switch 530 may operate approximately simultaneously. That is, the tact switch 522 and the magnetic sensor 532 may deliver signals approximately simultaneously. The switching device may wake up from a sleep state through sensing of the magnetic sensor 532 or release a lock screen state, and may activate a short-range communication service through a tact switch contact. According to such a switch structure, an electronic device in the lock screen state may instruct a call in an emergency situation by moving the sliding key 510 with a single motion, for example, by moving it only one time, in the emergency situation.

Figure 6A:
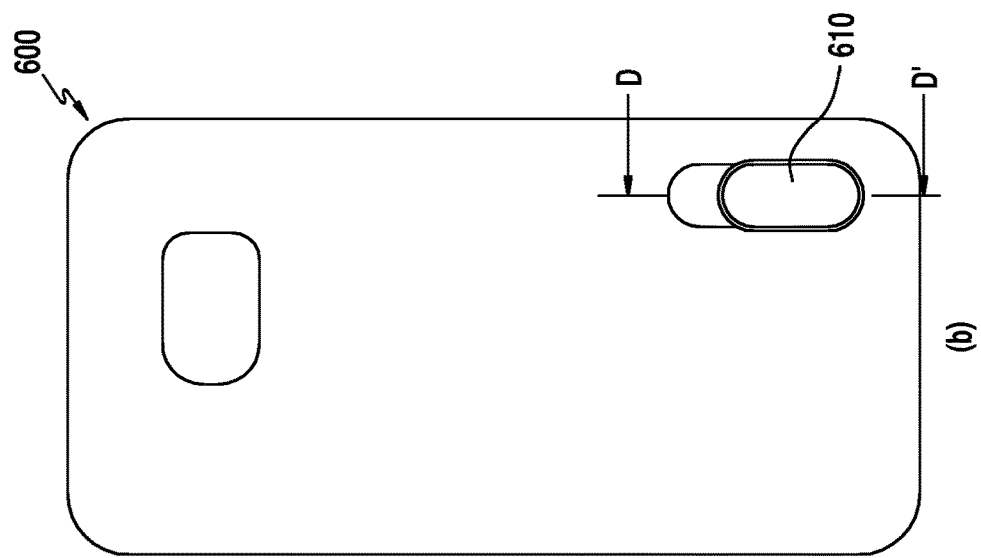
FIG. 6A illustrates a front side of a layered accessory case in a state (a) before the case moves and a state (b) after the case moves, according to an embodiment.
Figure 6A:
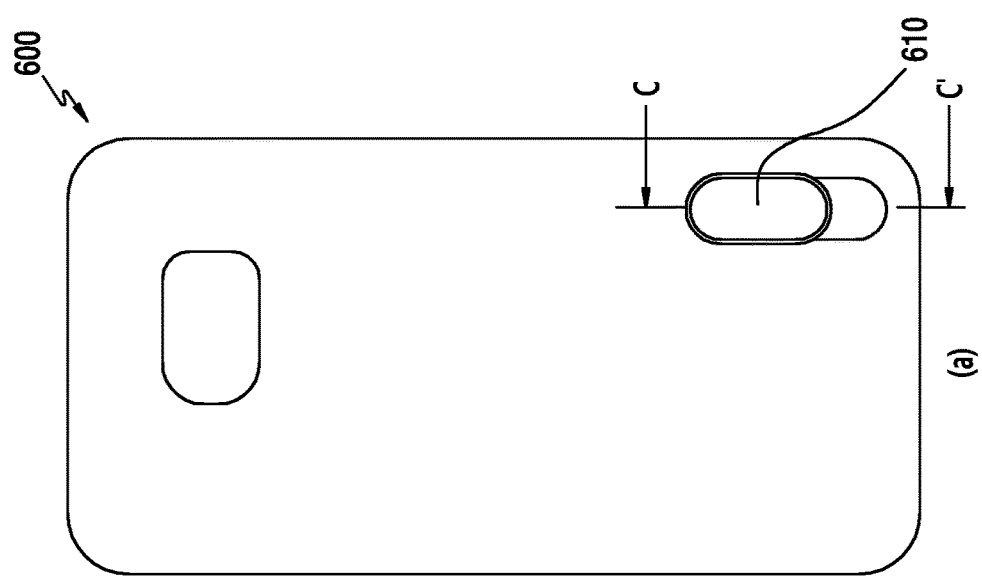
Figure 6B:
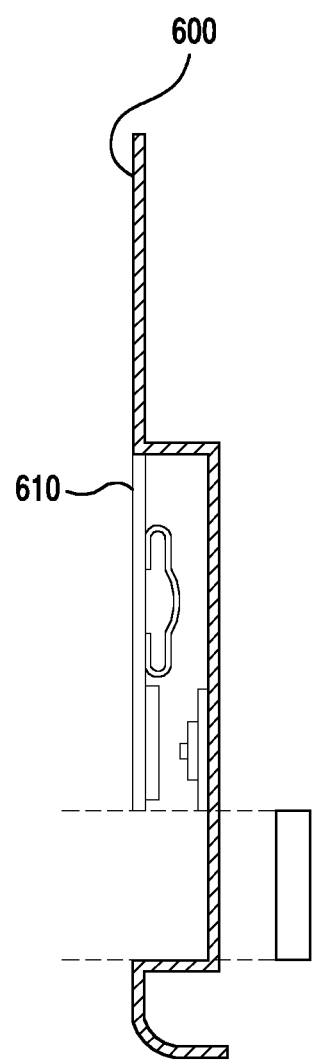
FIG. 6B is a cross-sectional view taken along the line C-C' of FIG. 6A (a) illustrating a state before a sliding key of a layered accessory case moves, according to an embodiment.
Figure 6C:
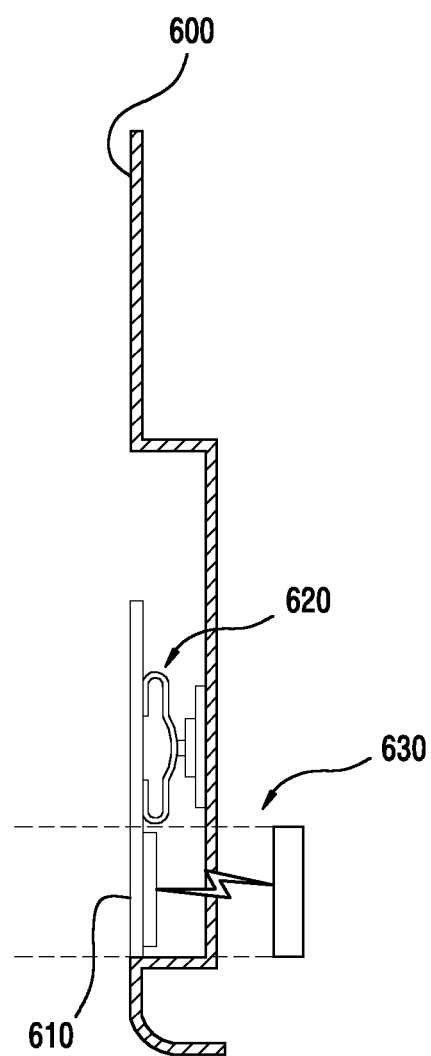
FIG. 6C is a cross-sectional view taken along the line D-D' of FIG. 6A (b) illustrating a state after a sliding key of a layered accessory case moves, according to an embodiment.

Referring to FIG. 6A to FIG. 6C, a case is described in comparison with the case 500 of FIG. 5A to FIG. 5C, and only a difference thereof is described while omitting the remaining identical configurations to avoid redundancy. A switching device mounted to a case 600 may be disposed along a lengthwise direction of an electronic device.

The switching device may include a sliding key 610 movably disposed in a lengthwise direction (or an X-axis direction) of the case 600, a contact switch 620, and a magnetic switch 630.

The sliding key 610 moves in the lengthwise direction of the case 600 in a sliding manner. Since the structure of the switching device consisting of the contact switch 620 and magnetic switch 630, which are accommodated in a movement space between a second side of the sliding key 610 and a second side of the case 600, is already described above in detail in FIG. 5B and FIG. 5C, a description thereof will be omitted.

Figure 7A:
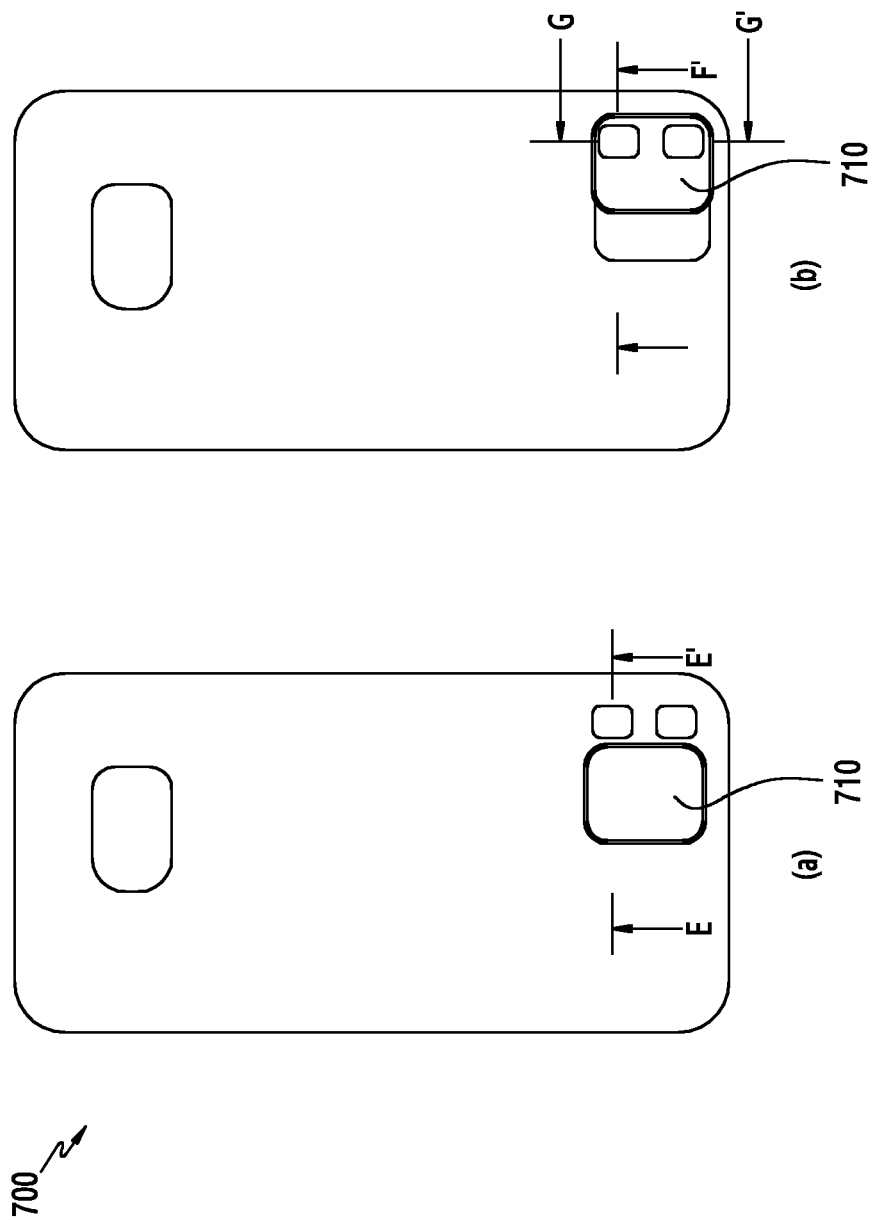
FIG. 7A illustrates a front side of a layered accessory case in a state (a) before the case moves and a state (b) after the case moves, according to an embodiment.
Figure 7B:
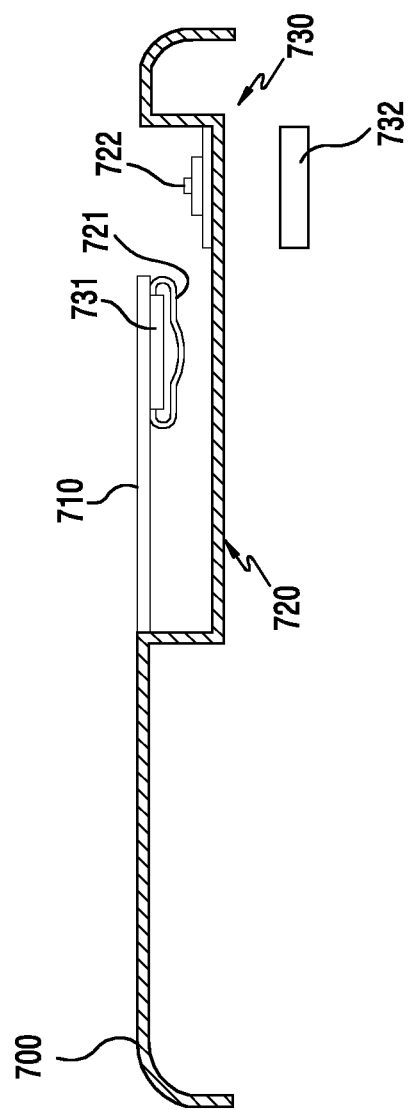
FIG. 7B is a cross-sectional view taken along the line E-E' of FIG. 7A (a) illustrating a state before a sliding key of a layered accessory case moves, according to an embodiment.
Figure 7C:
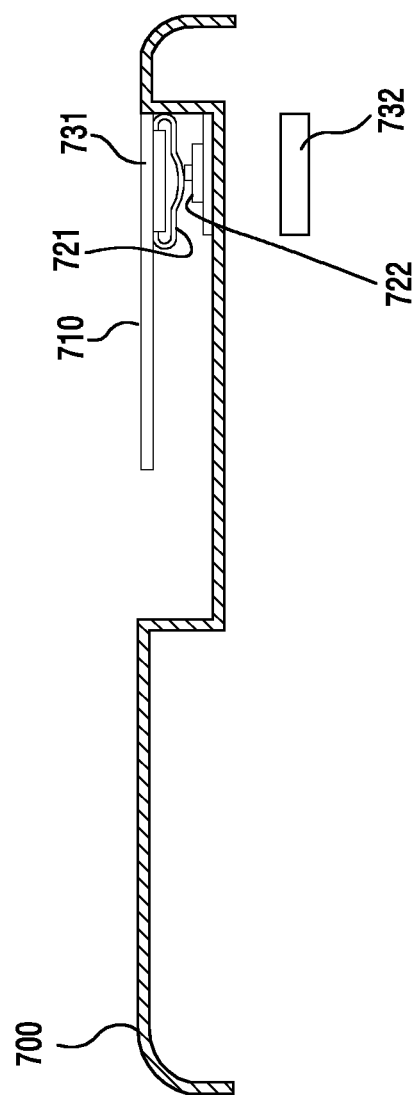
FIG. 7C is a cross-sectional view taken along the line F-F' of FIG. 7A (b) illustrating a state after a sliding key of a layered accessory case moves, according to an embodiment.
Figure 7D:
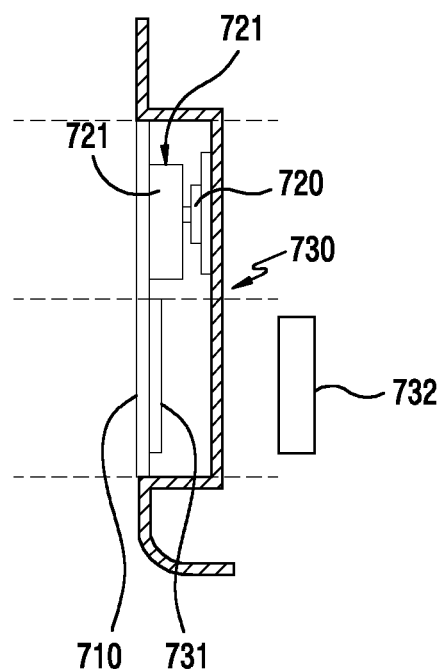
FIG. 7D is a cross-sectional view taken along the line G-G' of FIG. 7A (b) illustrating a state after a sliding key of a layered accessory case moves, according to an embodiment.

Referring to FIG. 7A to FIG. 7C, a case 700 is described in comparison with the case 500 of FIG. 5A to FIG. 5C, and only a difference thereof is described while omitting the remaining identical configurations to avoid redundancy.

The switching device may consist of a sliding key 710 disposed movably in a widthwise direction (or a Y-axis direction) of the case 700, a contact switch 720, and a magnetic switch 730. The magnetic switch 730 may include a magnet 731 and a magnetic sensor 732. The magnet 731 may be disposed not to overlap with a contact terminal 721, and the magnetic sensor 732 may be disposed not to overlap with a tact switch 722.

The magnet 731 may be disposed on a second side of the sliding key 710 so as not to overlap with the contact terminal 721, and may be disposed in parallel with the contact terminal 721 on the second side of the sliding key 710. The magnet 731 may further be disposed on the second side of the sliding key 710 at a place facing a lengthwise direction of the contact terminal 721.

The magnetic sensor 732 may be disposed inside the electronic device so as not to overlap with the tact switch 722 in a top view.

When the sliding key 710 is located to the left on the second side of the case 700, the contact terminal 721 and the tact switch 722 are spaced apart from each other, and the magnet 731 is spaced apart by a long distance from the magnetic sensor 732. Therefore, each of the contact switch 720 and the magnetic switch 730 may be in an off state. When the sliding key 710 is located to the right on the second side of the case 700, the contact terminal 721 and the tact switch 722 are in contact with each other, and the magnet 731 is spaced apart by a short distance from the magnetic sensor 732, such as in an overlapping state in a top view. Therefore, the contact switch 720 and the magnetic switch 730 may be in an on state, thereby being able to deliver respective signals.

Figure 8A:
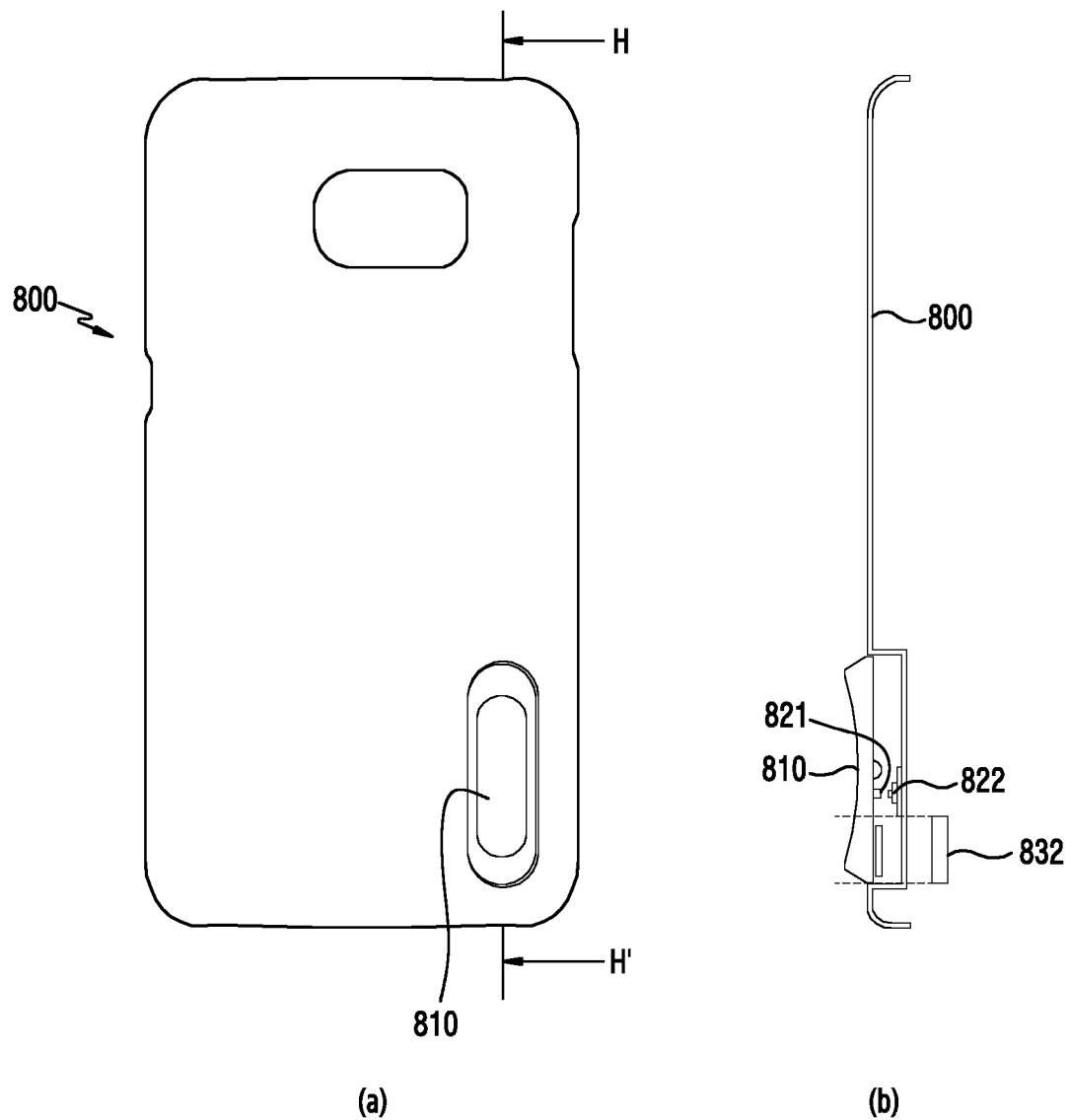
FIG. 8A is a front view (a) of a layered accessory case and a lateral cross-sectional view (b) taken along the line H-H' of the front view (a) of the layered accessory case, according to an embodiment.
Figure 8B:
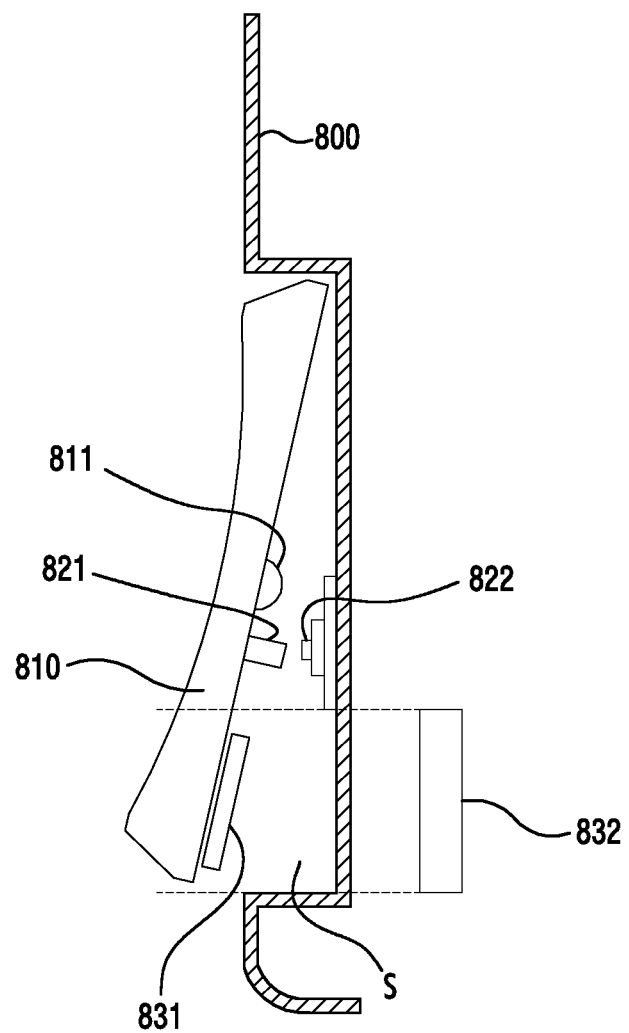
FIG. 8B illustrates a state before a seesaw key of a layered accessory case moves, according to an embodiment.
Figure 8C:
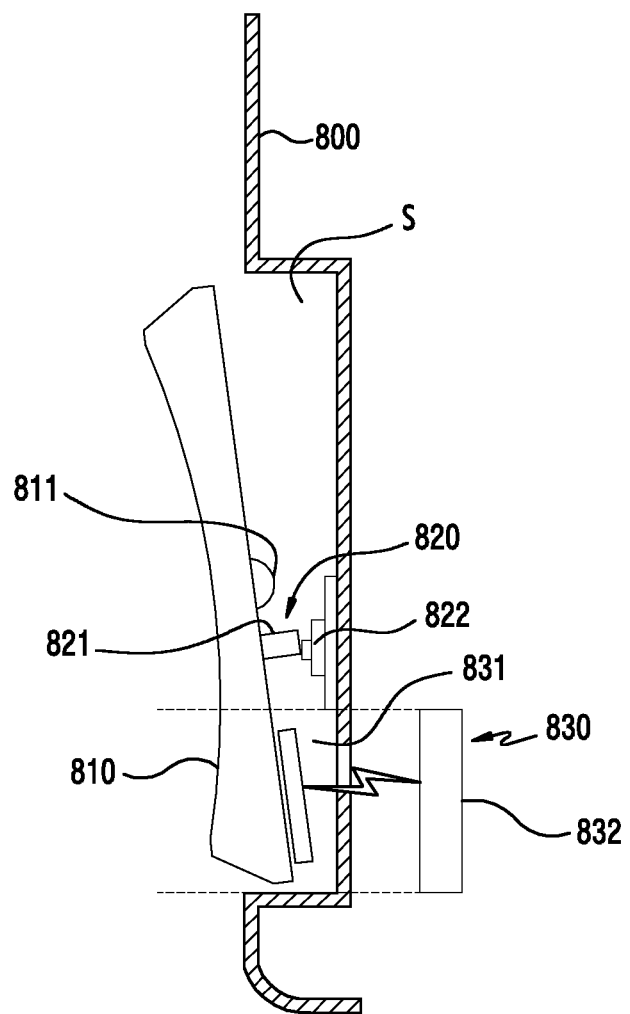
FIG. 8C illustrates a state after a seesaw key of a layered accessory case moves, according to an embodiment.

Referring to FIG. 8A to FIG. 8C, a switching device disposed in a case 800 may include a seesaw key 810, a contact switch 820, and a magnetic switch 830. The switching device may include the contact switch 820 and magnetic switch 830 which are simultaneously turned on or off depending on whether one end or the other end of the seesaw key 810 is pressed.

The seesaw key 810 has a hinge protrusion 811 at a center portion to perform a limited rotational operation about the hinge protrusion 811. The hinge protrusion 811 may protrude in a direction perpendicular to a pressing direction of the seesaw key 810. A hinge axis provided by the hinge protrusion 811 may face a vertical direction while being spaced apart from the pressing direction of the seesaw key 810. The seesaw key 810 may include a first side facing a first direction and a second side facing a second direction opposite the first direction. The first side of the seesaw key 810 may be a hidden surface, and may be a mounting side on which the contact terminal 821 and the magnet 831 can be disposed. The second side of the seesaw key 810 may be an outer surface, and may be a side touched by a pressing operation.

A movement space S is provided between the seesaw key 810 and the case 800, and the contact switch 820 and the magnetic switch 830 may be disposed in the movement space S.

The movement space S may be divided into first and second movement spaces by the seesaw key 810. The first movement space may be empty, and the contact switch 820 and the magnet 831 may be disposed in the second movement space. A contact terminal 821 and a magnet 831 may be disposed substantially in parallel without overlapping, on the second side of the seesaw key 810 in the second movement space. In addition, a tact switch 822 may be disposed at the bottom of the second moving space, and a magnetic sensor 832 may be disposed inside the case 800 at a position close to a position not overlapping with the tact switch 822. In a top view, the contact terminal 821 may be disposed such that at least a portion thereof overlaps with the tact switch 822, and the magnet 831 may be disposed such that at least a portion thereof overlaps with the magnetic sensor 832.

In a state of FIG. 8B, the contact terminal 821 may be spaced apart from the tact switch 822 to maintain an off state of the tact switch 822, and the magnet 831 may be located at a long distance from the magnetic sensor 832 to maintain an off state of the magnetic sensor 832. In a state of FIG. 8C, the contact terminal 821 may press the tact switch 822 to turn the tact switch 822 on, and the magnet 831 may be located at a short distance from magnetic sensor 832 to turn the magnetic sensor 832 on, thereby delivering a sensed signal.

Figure 9A:
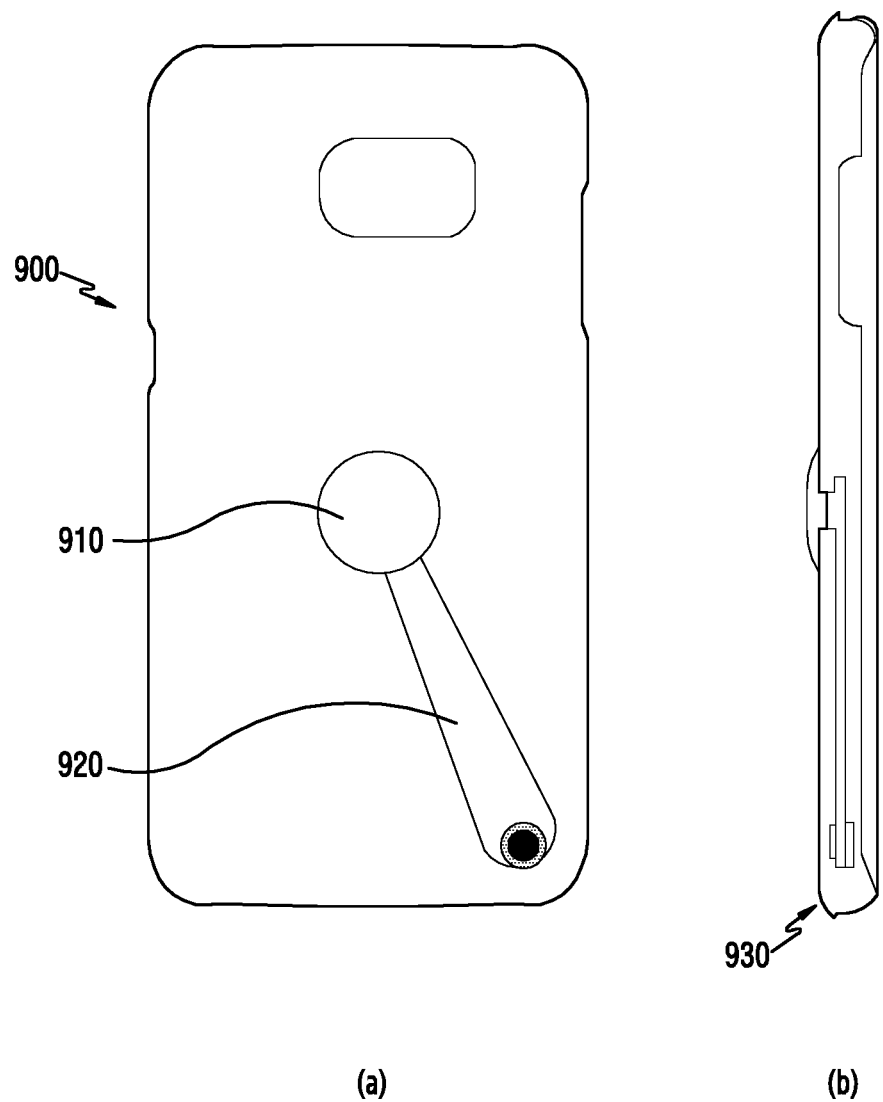
FIG. 9A illustrates a front side (a) and a lateral side (b) in a state before a rotational lever of a layered accessory case moves, according to an embodiment.
Figure 9B:
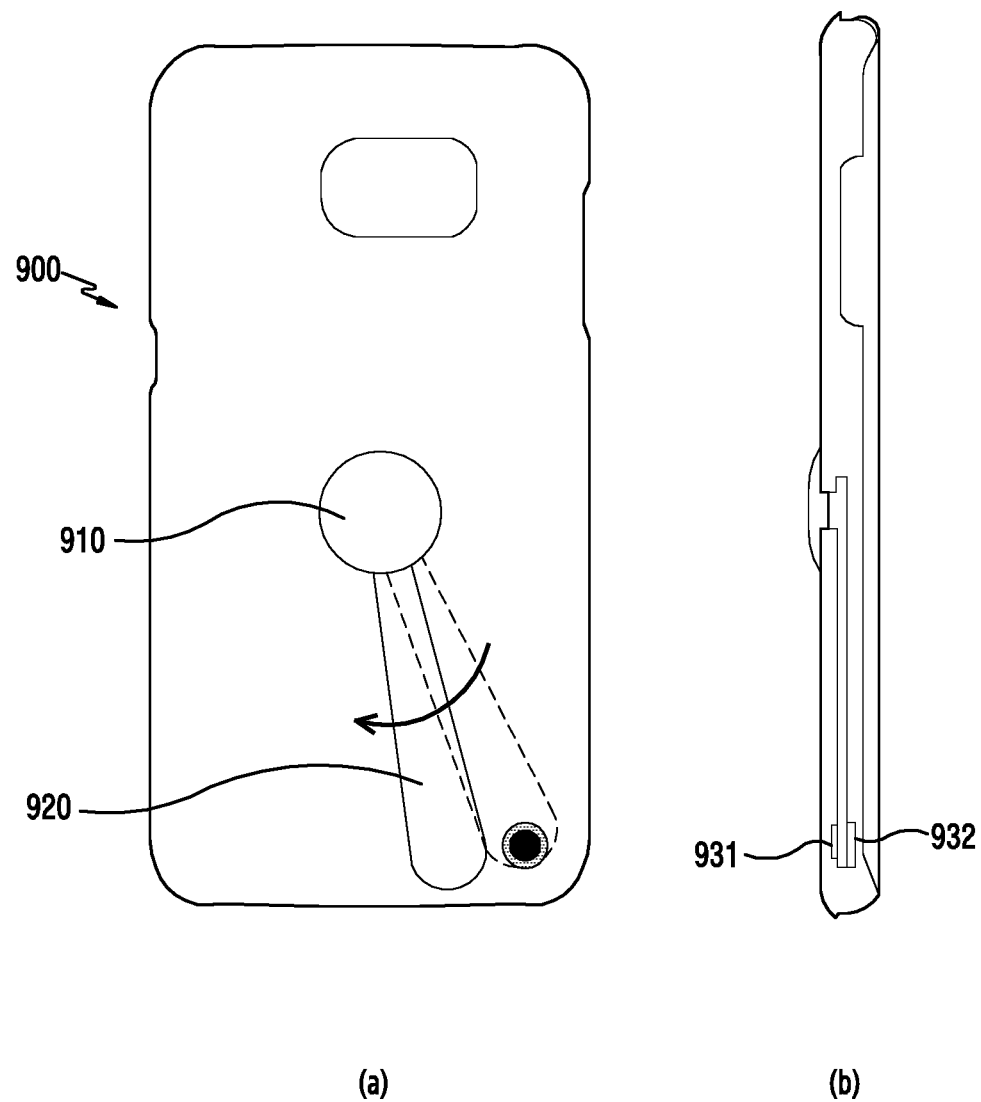
FIG. 9B illustrates a front side (a) and a lateral side (b) in a state after a rotational lever of a layered accessory case moves, according to an embodiment.

Referring to FIG. 9A and FIG. 9B, a case 900 may include a switching device which is turned on or off depending on whether a button 910 is pressed. When the button 910 is not pressed, the switching device may be turned off as shown in a state of FIG. 9A. When the button 910 is pressed, the switching device may be turned on as shown in a state of FIG. 9B.

The switching device may include the button 910, a shielding member 920, a magnetic switch 930, and an elastic body 940.

At least a portion of the buttons 910 is disposed in a projection shape on a second side of the case 900. Thus, the button 910 may be forcibly pressed or may return to an original position when the pressing force is removed.

The shielding member 920 is coupled to the button 910. Thus, the shielding member 920 may rotate about the button 910 when the button 910 is pressed, and may return to an original position by rotating in a reverse direction about the button 910 when the pressing force is removed. For example, the shielding member 920 may have a flat wing shape, and thus may rotate depending on whether the button 910 is pressed or may return to an original position in a rotated state. The magnetic switch 930 may be turned on or off by the rotation of the shielding member 920. In the state of FIG. 9A, the shielding member 920 is disposed between the magnet 931 and the magnetic sensor 932, and thus the magnetic sensor 932 is in an off state. In the state of FIG. 9B, the shielding member 920 is deviated in a space between the magnet 931 and the magnetic sensor 932, and thus the magnetic sensor 932 may be in an on state.

The magnetic switch 930 may include a magnet 931 and a magnetic sensor 932 disposed (in a top view) to overlap with the magnet 931. Each of the magnet 931 and the magnetic sensor 932 may be disposed in the case 900 in such a manner that the shielding member 920 is located therebetween, or may be spaced apart by a distance corresponding to a deviated distance.

Figure 9C:
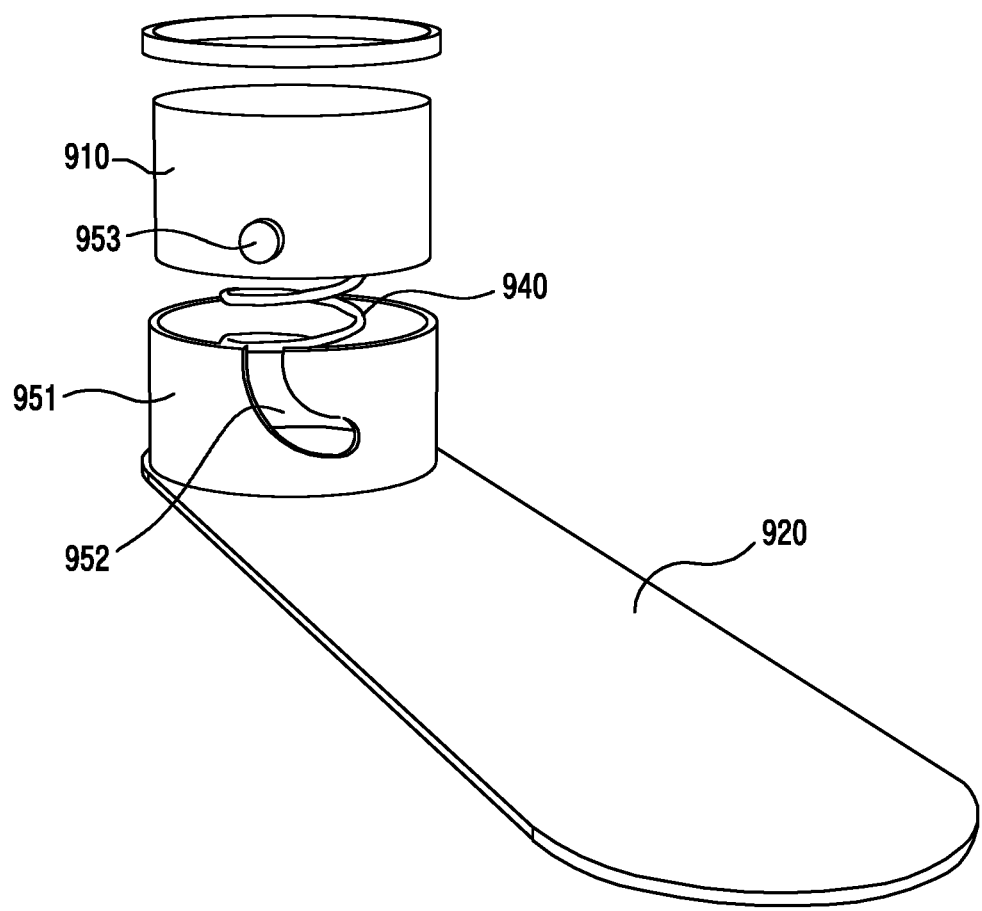
FIG. 9C is a perspective view illustrating a rotation mechanism configured in a layered accessory case, according to an embodiment.

Referring to FIG. 9C, the switching device may include the button 910, the shielding member 920, and a rotation mechanism. The shielding member 920 may rotate when the button 910 is pressed by the rotation mechanism, and may return to an original position by the elastic body 940.

The rotation mechanism includes a cylindrical portion 951 configured integrally with respect to the shielding member 920 and moving in a state where the button 910 is supported by the elastic body 940, a spiral opening 952 disposed on the cylindrical portion 951, and a coupling protrusion 953 disposed on an outer circumferential surface of the button 910 and coupled to the opening 952 to rotate the cylindrical portion 951 when the button 910 is pressed. For example, the elastic body 940 constituted of a compressible coil spring is disposed inside the cylindrical portion 951 between the button 910 and the shielding member 920 to provide a force for returning the button 910 to the original position. The elastic body 940 may provide an elastic force in a direction in which the button 910 moves away from the shielding member 920.

A coupling structure of the coupling protrusion 953 and the opening 952 may perform a function of converting a vertical movement of the button 910 to a rotation movement of the shielding member 920. The shielding member 920 may perform a rotation movement by the coupling structure when the button 910 is pressed, and thus a space between the magnet and the magnetic sensor may be opened or closed.

Figure 9D:
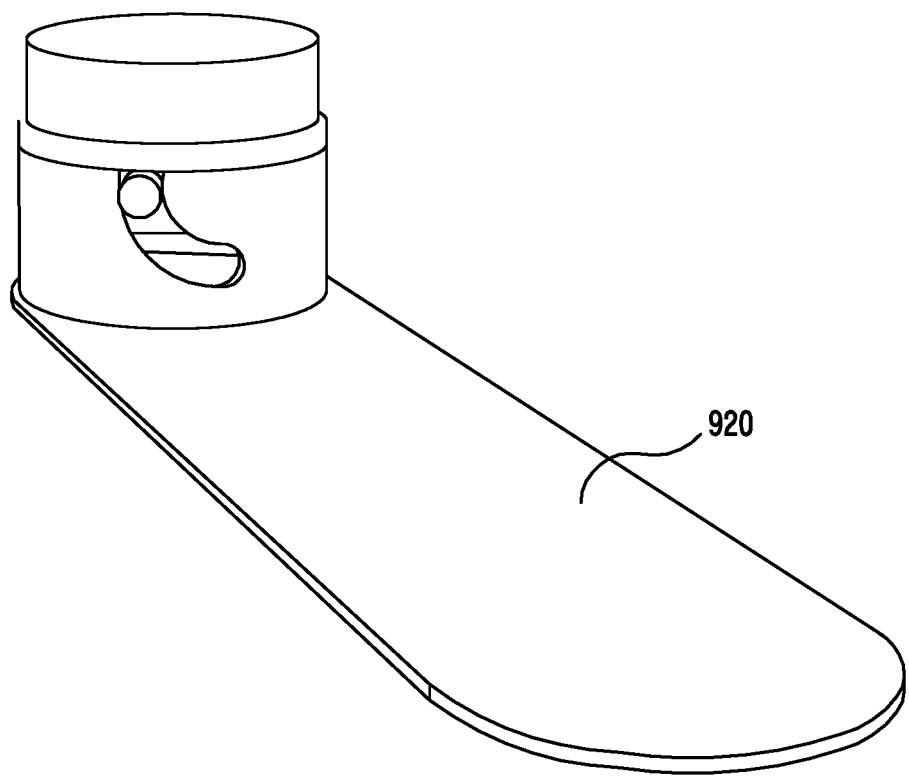
FIG. 9D to FIG. 9F are perspective views respectively illustrating states before, during, and after a rotational lever of a layered accessory case moves, according to embodiments.
Figure 9E:
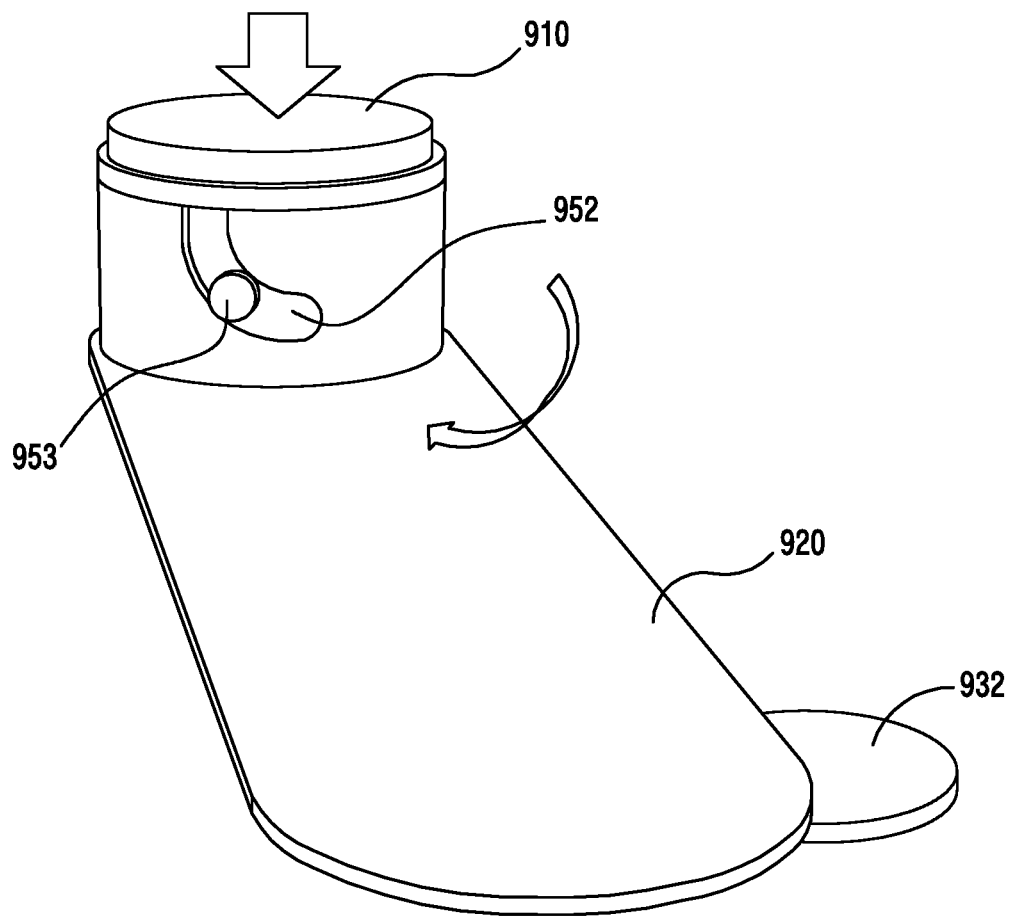
Figure 9F:
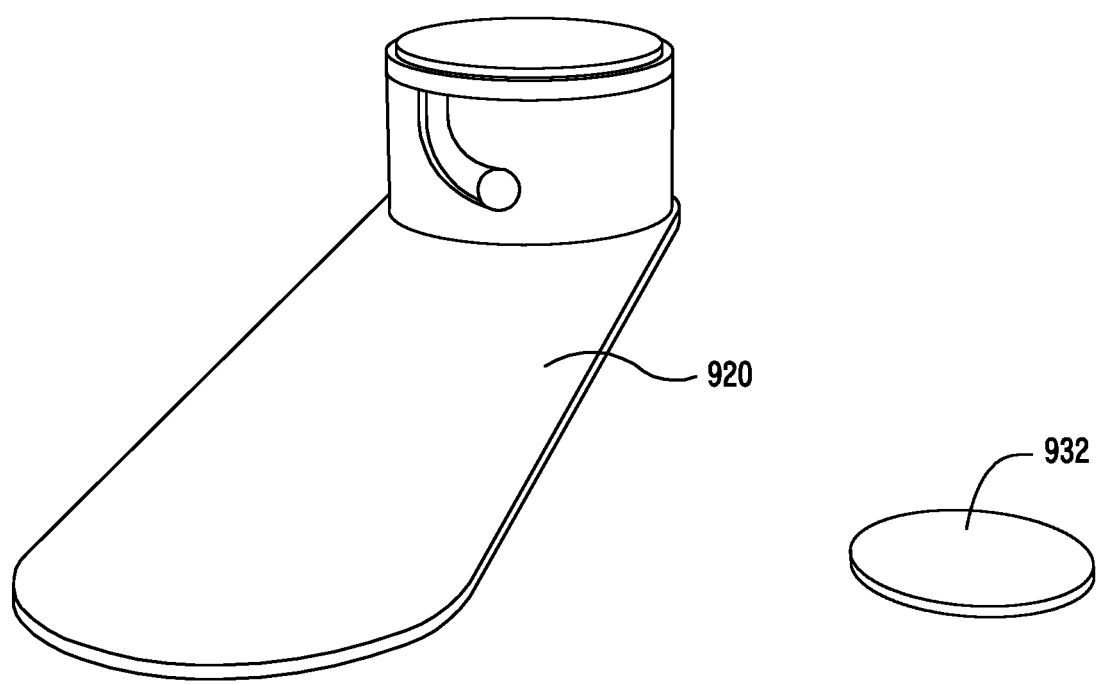
Figure 10A:
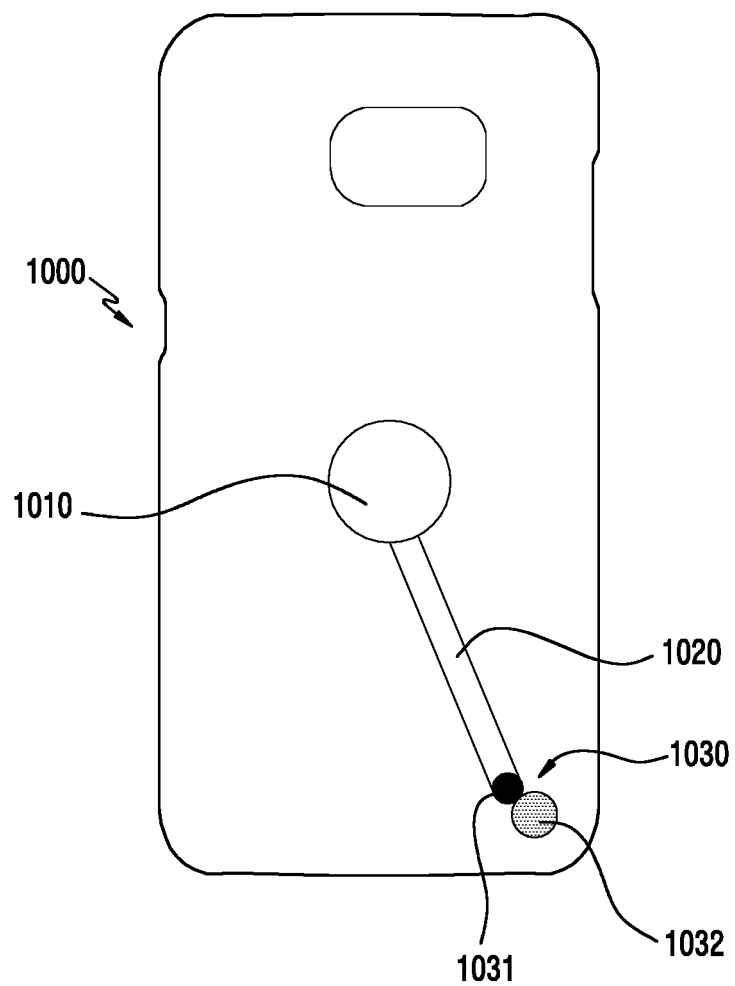
FIG. 10A illustrates a state before a coupling lever provided in a layered accessory case moves, according to an embodiment.
Figure 10B:
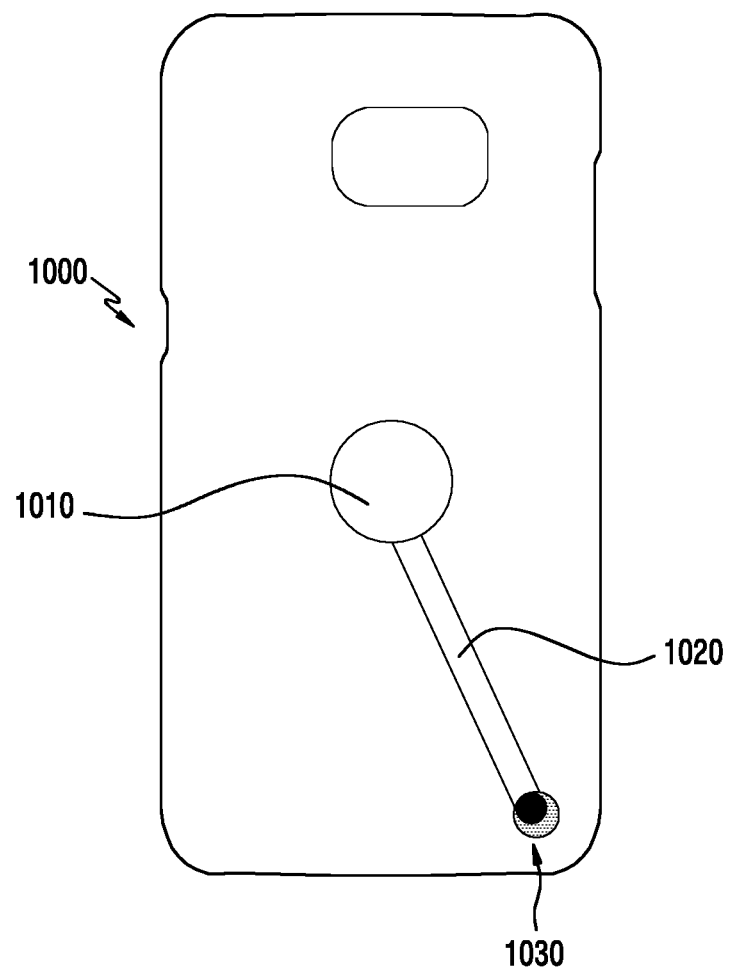
FIG. 10B illustrates a state after a coupling lever provided in a layered accessory case moves, according to an embodiment.
Figure 10C:
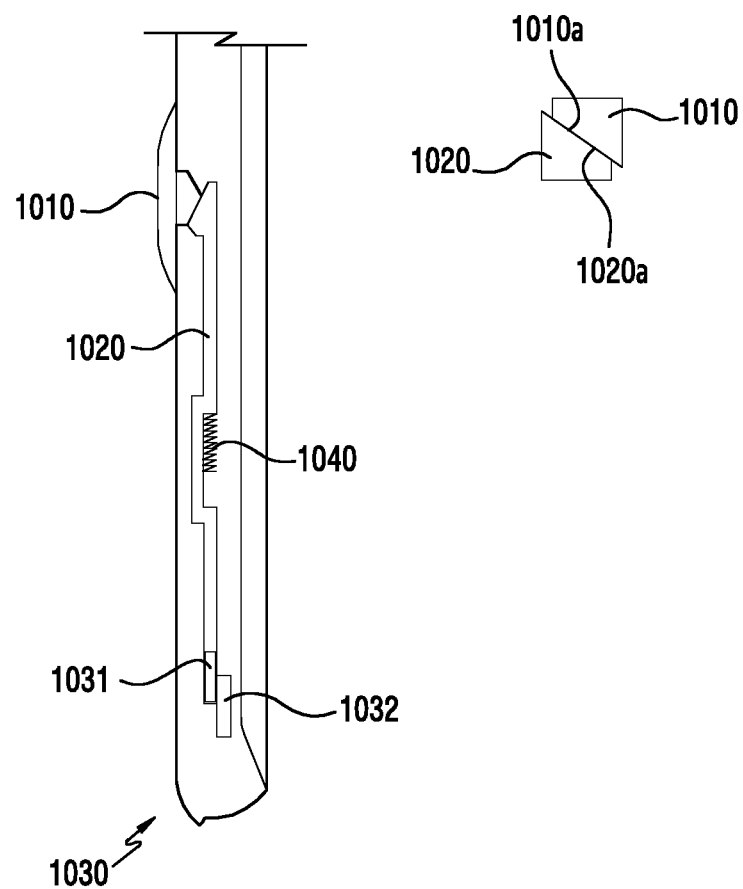
FIG. 10C illustrates a state before a coupling lever provided in a layered accessory case moves, according to an embodiment.
Figure 10D:
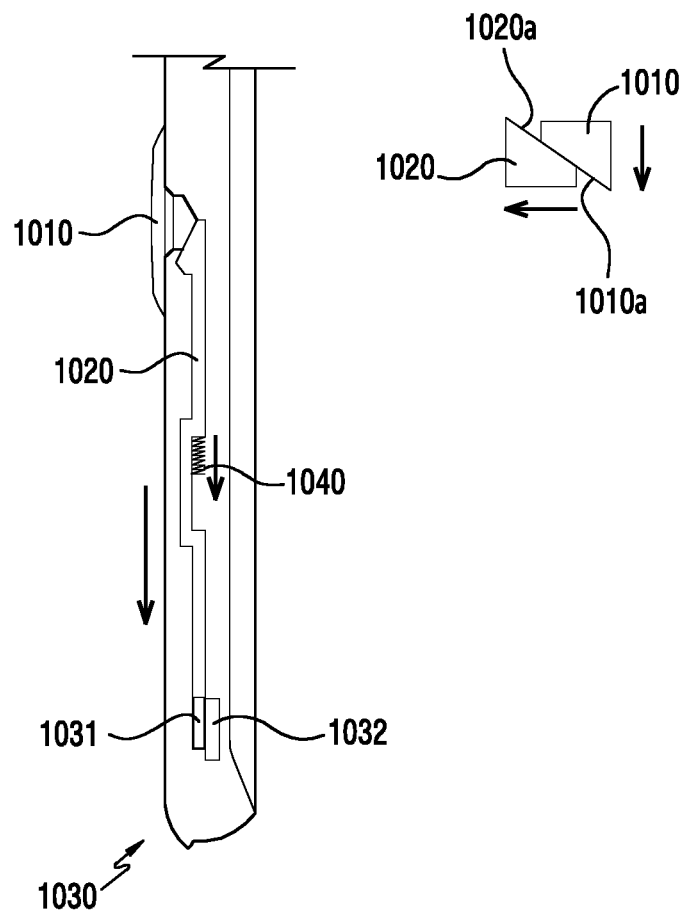
FIG. 10D illustrates a state after a coupling lever provided in a layered accessory case moves, according to an embodiment.
Figure 11A:
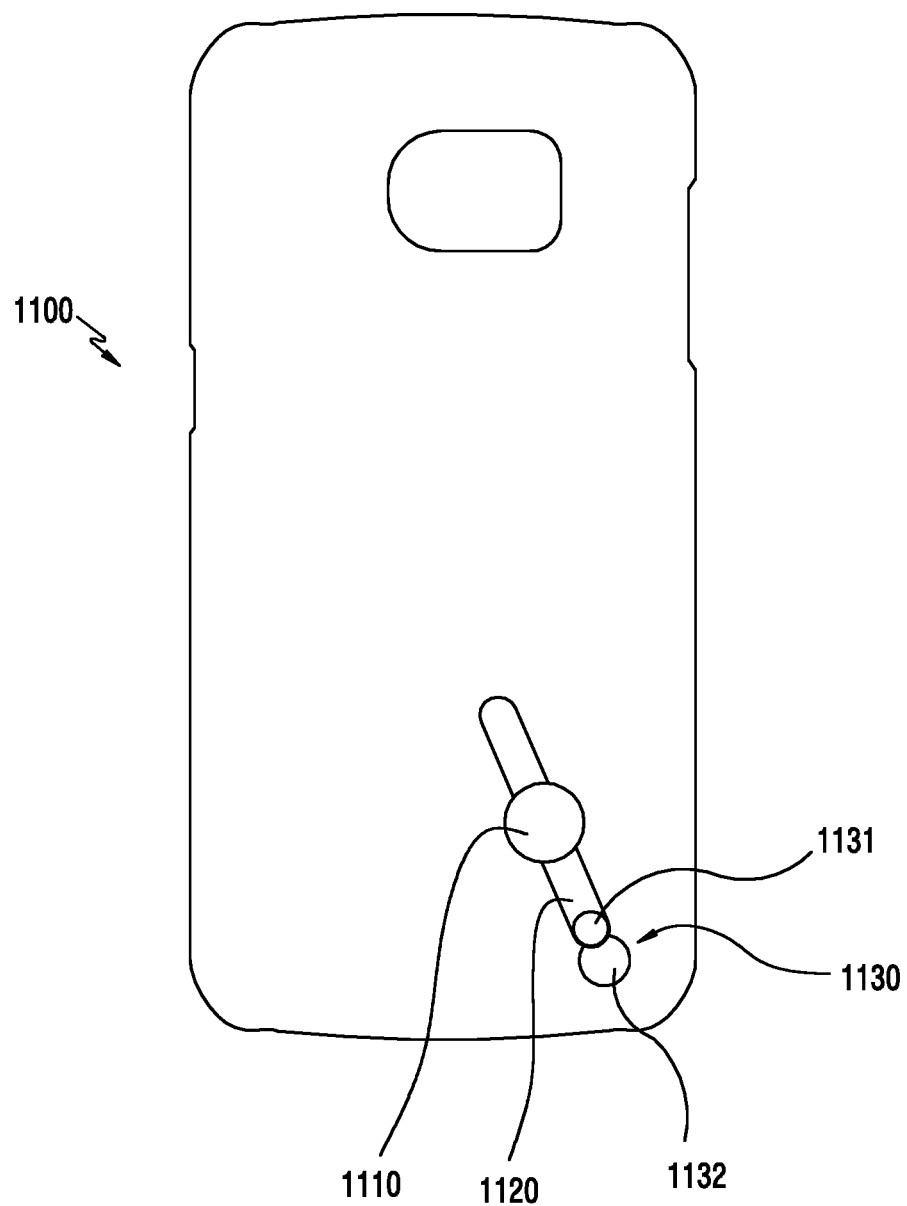
FIG. 11A illustrates a state before an extension provided in a layered accessory case is extended, according to an embodiment.
Figure 11B:
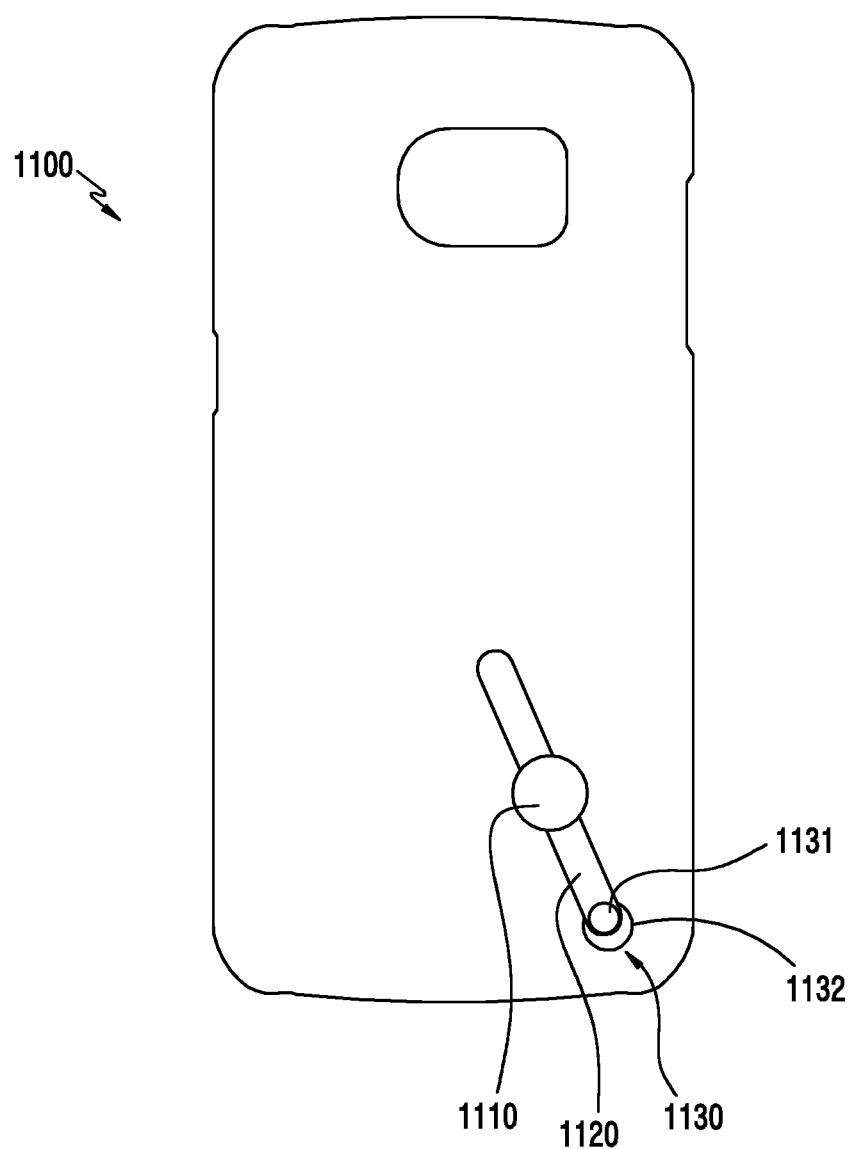
FIG. 11B illustrates a state after an extension provided in a layered accessory case is extended, according to an embodiment.
Figure 11C:
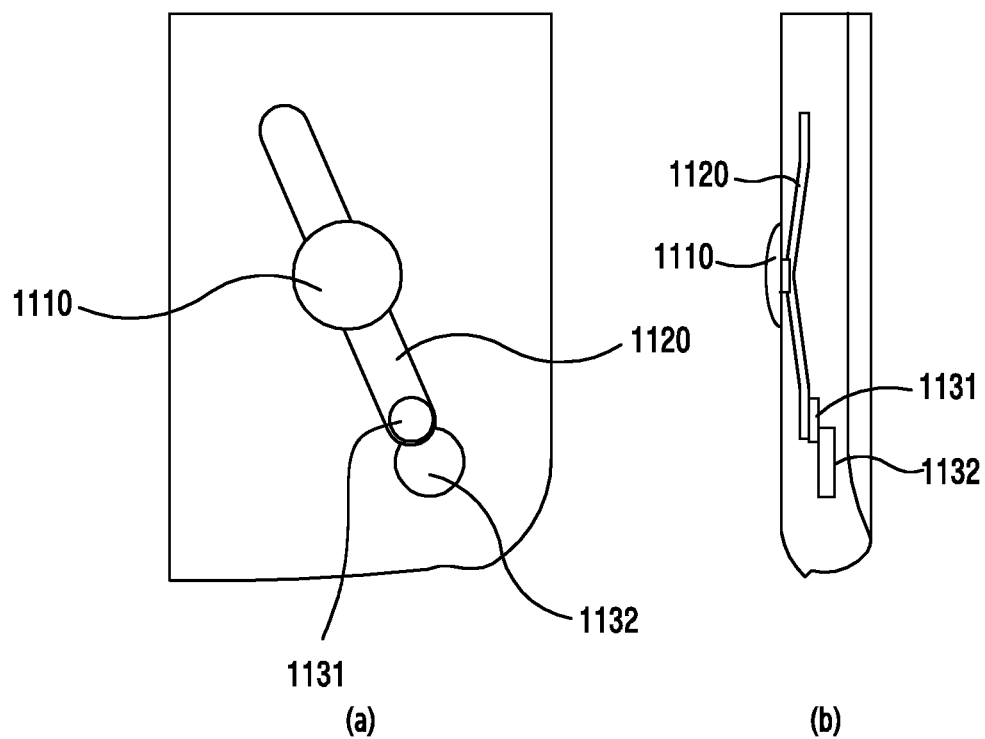
FIG. 11C is an enlarged view of a state (a) before an extension provided in a layered accessory case is extended and a cross-sectional view (b), according to an embodiment.
Figure 11D:
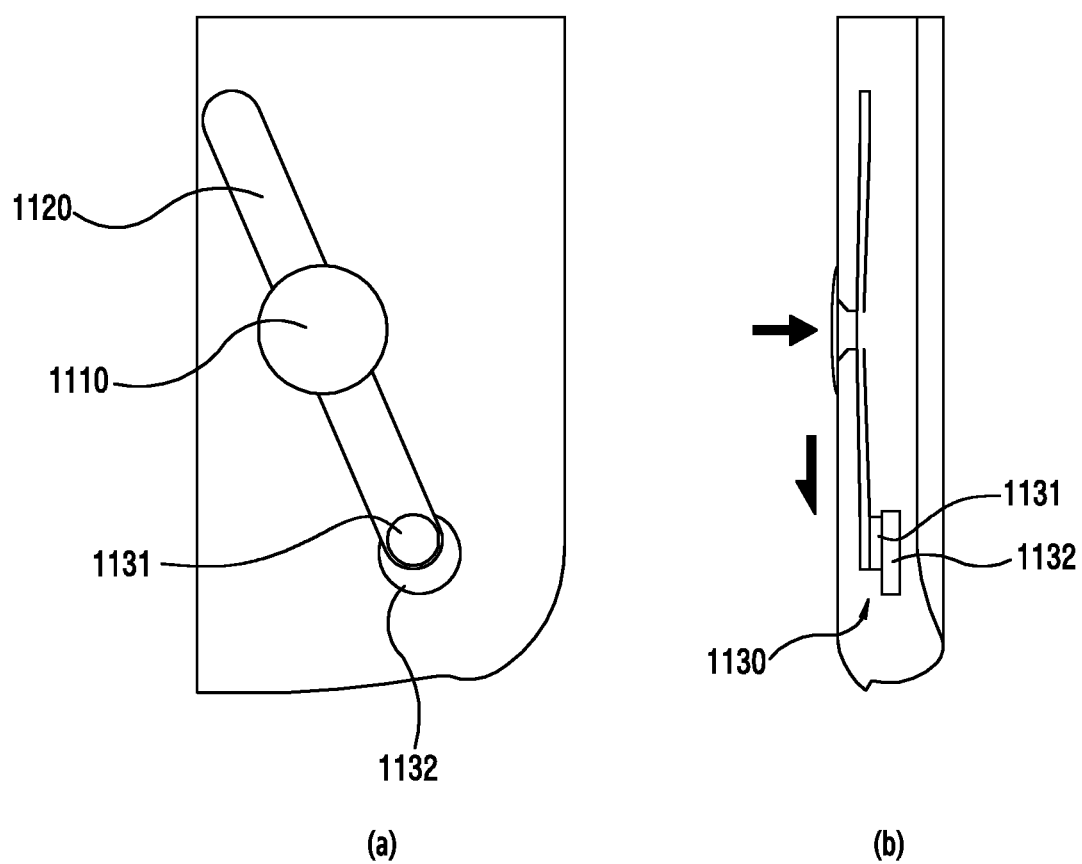
FIG. 11D is an enlarged view of a state (a) after an extension provided in a layered accessory case is extended and a cross-sectional view (b), according to an embodiment.

In a state of FIG. 9D, the shielding member 920 may be positioned between the magnet 931 and the magnetic sensor 932 to shield magnetism of the magnet 931, and thus the magnetic sensor 932 may be in an off state. Subsequently, when the button 910 is pressed, as shown in a state of FIG. 9E, the coupling protrusion 953 moves downward while being constrained by the opening 952, and the shielding member 920 performs a rotation operation. In a state of FIG. 9F, the shielding member 920 is deviated in a space between the magnet and the magnetic sensor 932, and thus the magnetic sensor 932 may be in an on state.

Referring to FIG. 10A to FIG. 10D, a switching device provided in a case 1000 may include a button 1010, a movement member 1020, an elastic body 1040, an inclination mechanism, and a magnetic switch 1030. The switching device may be configured such that the magnetic switch 1030 is turned on or off when the movement member 1020 moves by pressing the button 1010.

The button 1010 is disposed on a second side of the case 1000 to perform a pressing operation. When the button is pressed, a magnetic sensor 1032 is turned on as shown in a state of FIG. 10B. When a pressing force applied to the button 1010 is removed, the magnetic sensor 1032 may be turned off as shown in a state of FIG. 10A.

The movement member 1020 is disposed on the case 1000 to guide a direction of being moved by a guide. When the button 1010 is pressed, the movement member 1020 moves toward the magnetic switch 1030 by the inclination mechanism, and thus the magnetic sensor 1032 may be turned on since a magnet 1031 faces the magnetic sensor 1032. When the pressing force applied to the button 1010 is removed, the movement member 1020 moves to an original position toward the button 1010, and the magnet 1031 and the magnetic sensor 1032 are separated from each other. Therefore, the electronic device 1032 may be in an off state. Although the movement of the movement member 1020 is exemplified as a linear movement, the movement is not necessarily limited to the linear movement, and thus may also be configured as a curvilinear movement.

The inclination mechanism allows a vertical movement of the button 1010 to switch to a horizontal movement of the movement member 1020 on the basis of a sliding movement of each inclined surface. The inclination mechanism may consist of a first inclined surface 1010a disposed on the button 1010 and a second inclined surface 1020a disposed on one end of the movement member 1020 and sliding on the first inclined surface 1010a.

The first inclined surface 1010a may be disposed below the button 1010 to move together with the button 1010. The second inclined surface 1020a may be a driving surface disposed on one end of the movement member 1020, disposed to interwork with the first inclined surface 1010a, and at least partially slide in a surface contact manner with respect to the first inclination surface 1010a when the button 1010 is pressed. For example, the button 1010 may be constructed of a material having high elasticity.

The magnets 1031 may be disposed on the other end of the movement member 1020, and thus may be in a state of being spaced by a long distance from the magnetic sensor 1032. The magnet 1031 may be located to face the second inclined surface 1020a. When the button 1010 is pressed, the movement member 1020 may move the magnetic sensor 1032, and the magnet 1031 may be disposed to face the magnetic sensor 1032 in proximity thereto. Thus, the magnetic sensor 1032 may be turned on to deliver a signal. In a top view, the magnet 1031 may be disposed not to overlap with the magnetic senor 1032 when the magnetic sensor 1032 is in an off state, and the magnet 1031 may be disposed so as to at least partially overlap with the magnetic sensor 1032 when the magnetic sensor 1032 is in an on state.

The elastic body 1040 may be connected to the movement member 1020 at a specific position of the case 1000 to provide a force for allowing the movement member 1020 to return to an original position. For example, the elastic body 1040 may include a tension coil spring.

Referring to FIG. 11A to FIG. 11D, a switching device mounted to a case 1100 may include a button 1110, an extension 1120, and a magnetic switch 1130. When the button 1110 is pressed, a length of the switching device may be extended, thereby turning the magnetic switch 1130 on.

The button 1110 is disposed at a second side of the case 1100, and may extend the extension 1120 in a generally horizontal direction when the button 1110 is pressed. The button 1110 may be disposed at the second side of the case 1100 in a protruding or convex shape. When the button 1110 is pressed in a vertical direction, the extension 1120 may be extended in a horizontal direction, and a length of the extension 1120 in the horizontal direction may be configured variably.

The extension 1120 may be configured in pair in a plate shape extended substantially in the horizontal direction from the button 1110. The extension 1120 is constructed of a metal material, and may be configured in a bent shape. When the button 1110 is pressed, a vertical force acting on the button 1110 is delivered to the extension 1120, and the delivered vertical force causes a linear change of the bent extension 1120 substantially in the horizontal direction. Thus, the horizontal length of the extension 1120 may be extended.

The magnetic switch 1130 may consist of a magnet 1131 and a magnetic sensor 1132. The magnet 1131 may be disposed on an end of the extension 1120 extended toward the magnetic sensor 1132, and the magnetic sensor 1132 may be disposed in proximity to the end of the extension 1120. In a state of FIG. 11C, the magnet 1131 and the magnetic sensor 1132 may not substantially overlap with each other, and may be spaced by a relatively far distance. In a state of FIG. 11D, the magnet 1131 may be disposed so as to at least partially overlap with the magnetic sensor 1132. Thus, the magnetic sensor 1132 may be turned on by a magnetic force of the magnet 1131 to generate a signal.

Referring to FIG. 12A to FIG. 12D, a switching device mounted to a case 1200 may include a button 1210, a rotational lever 1220, an inclination mechanism, an elastic body 1240, and a magnetic switch 1230. In the switching device, a force vertically applied to the button 1210 may be converted to a horizontal rotation movement of the rotation level 1220 by the inclination mechanism.

The button 1210 is a portion to be pressed, and may be disposed at a second side of the case 1200 in a protruding or convex shape. When the button 1210 is pressed, one side of the rotational lever 1220 may rotate clockwise or counterclockwise in a horizontal state.

The rotational lever 1220 may be disposed horizontally to the case 1200, and may be disposed to be rotatable about a hinge axis h. The rotational lever 1220 may rotate about the hinge axis h while maintaining a horizontal state. The rotational lever 1220 may be disposed in such a manner that one end interworks with the button 1210 and the other end is in proximity to the magnetic sensor 1232. The hinge axis h is provided between one end and the other end of the rotational lever 1220. When one end of the rotational lever 1220 rotates counterclockwise, the other end may also rotate counterclockwise. The rotational lever 1220 may have one side or the other side located between one end and the other end. The button 1210 may be disposed to face one side of one end of the rotational lever 1220, and the magnetic sensor 1232 may be disposed in proximity to one side of the other end of the rotational lever 1220.

The inclination mechanism may be a structure in which a vertical movement of the button 1210 is converted to a horizontal rotation movement of the rotational lever 1220. The inclination mechanism may consist of a first inclined surface 1210a provided in the button 1210 and a second inclined surface 1220a provided in one side of the rotational lever 1220. The first inclined surface 1210a and the second inclined surface 1220a slide with respect to each other, and may perform a function for converting the vertical movement of the button 1210 to the horizontal rotation movement of the rotational lever 1220.

The elastic body 1240 may support the other end of the rotational lever 1220, and may provide a force of returning the rotation level 1220 to an original position when a pressing force of the button 1210 is removed. One end of the elastic body 1240 may be fixed to the case 1200, and the other end may be fixed to the other end of the rotational lever 1220. For example, the elastic body 1240 may include a compressible coil spring.

The magnetic switch 1230 may include a magnet 1231 disposed on the other end of the rotation mechanism 1220 and a magnetic sensor 1232 disposed on the case 1200 in proximity to the magnet 1231.

Figure 12A:
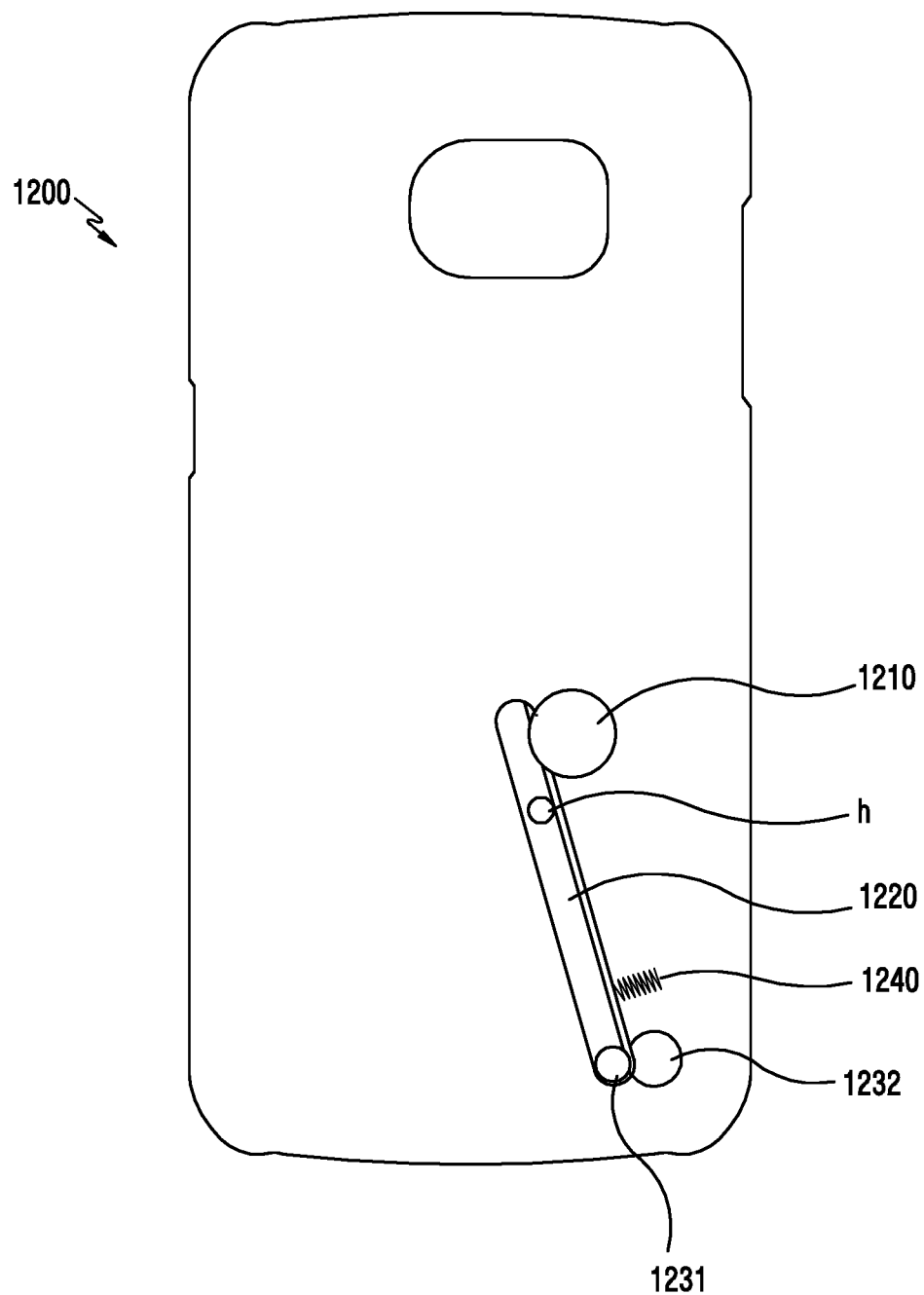
FIG. 12A illustrates a state before a rotational lever provided in a layered accessory case rotates, according to an embodiment.
Figure 12B:
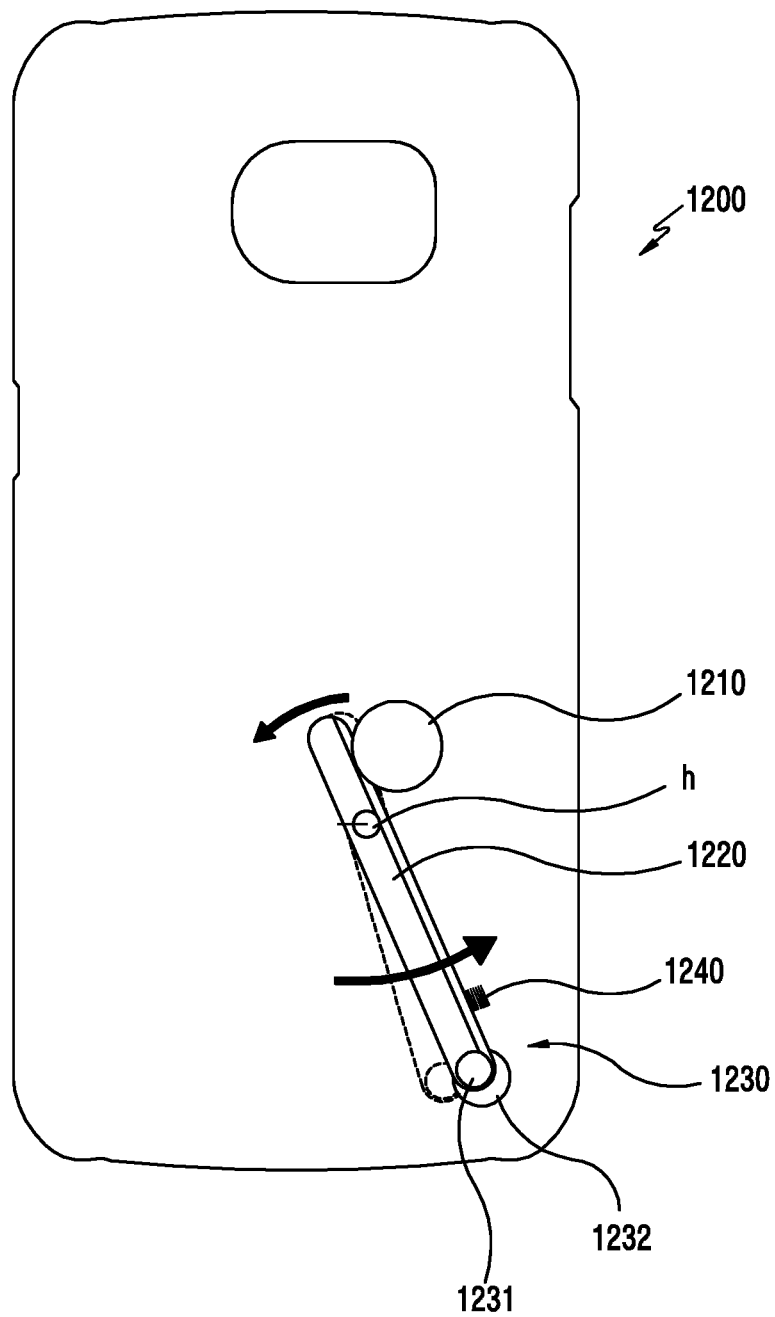
FIG. 12B illustrates a state after a rotational lever provided in a layered accessory case rotates, according to an embodiment.
Figure 12C:
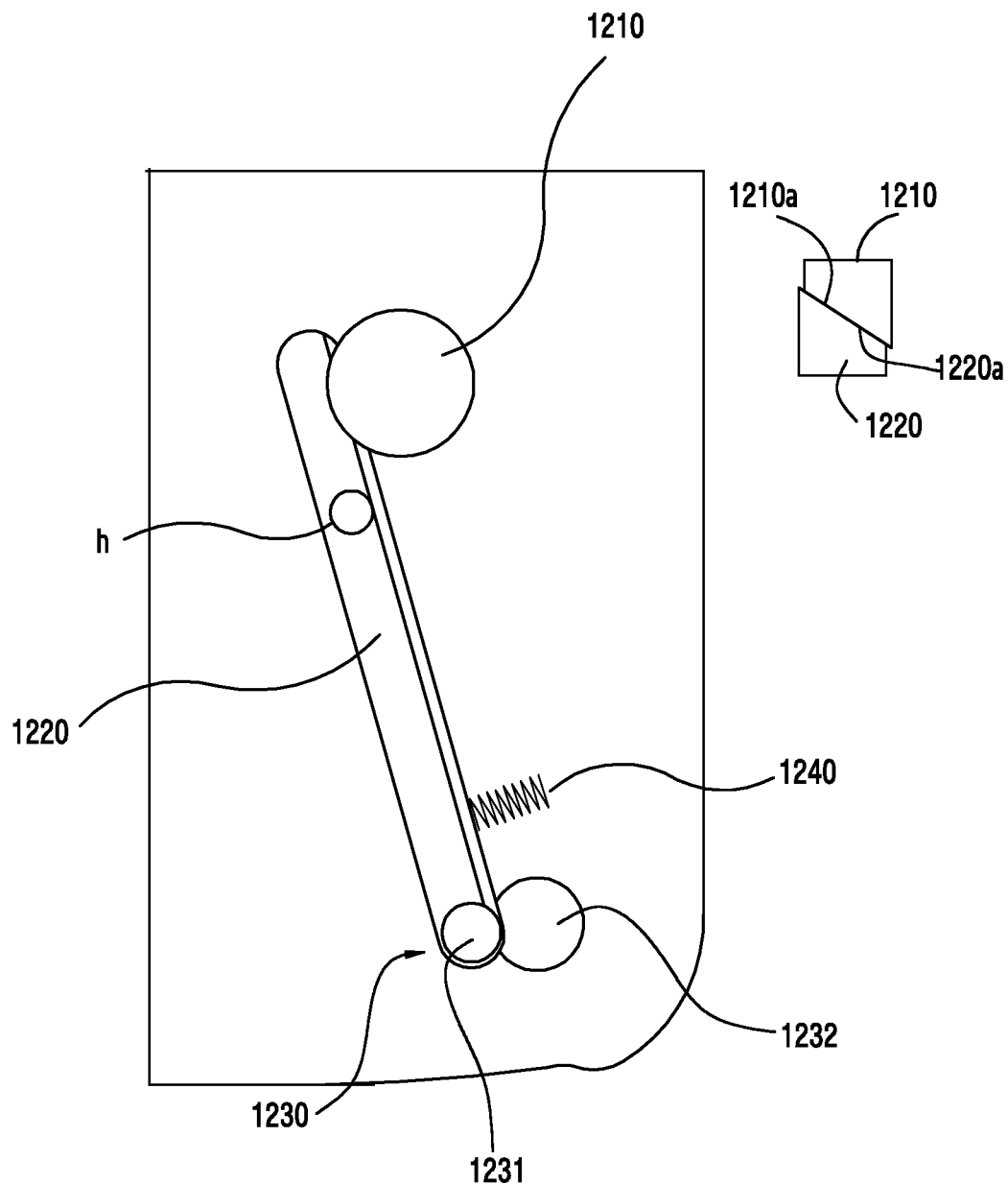
FIG. 12C is an enlarged view of a state before a rotational lever provided in a layered accessory case rotates, according to an embodiment.
Figure 12D:
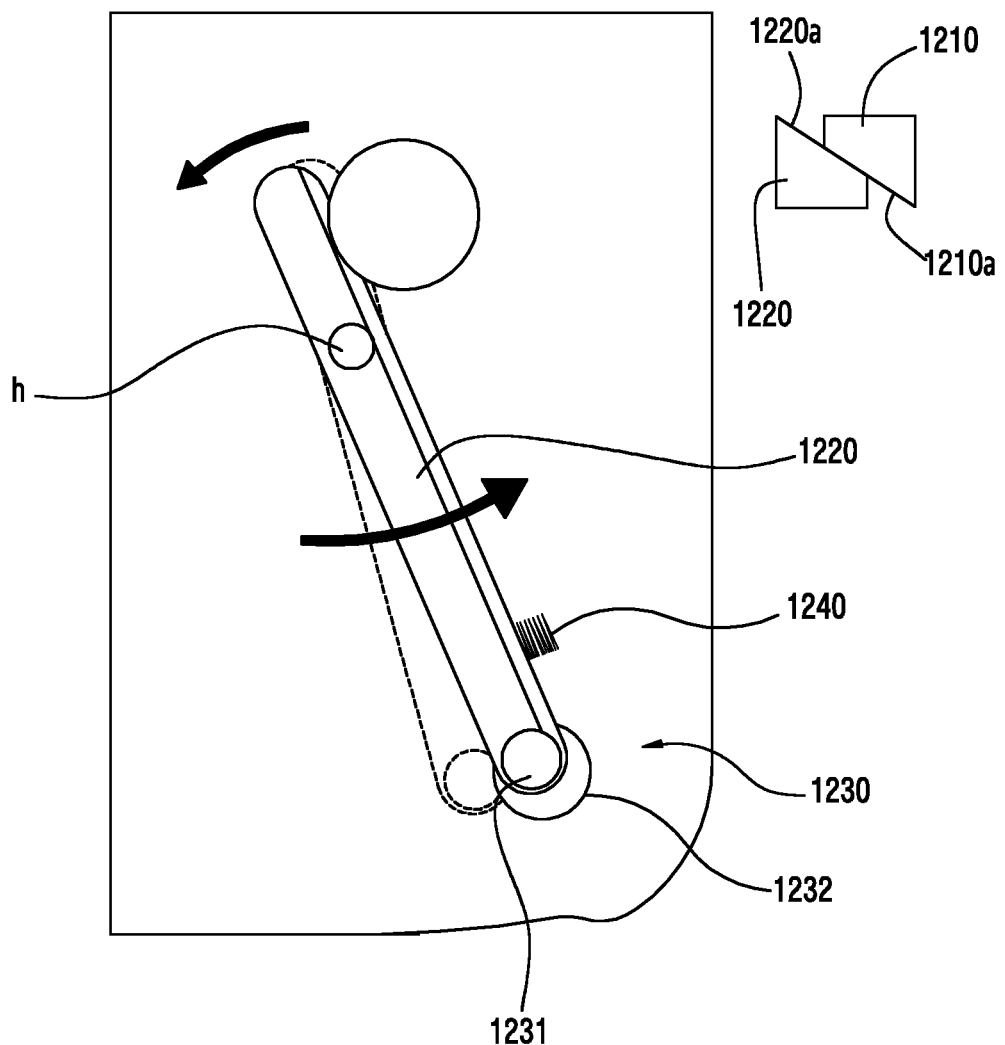
FIG. 12D is an enlarged view of a state after a rotational lever provided in a layered accessory case rotates, according to an embodiment.

In a state of FIG. 12C in which the button 1210 is not pressed, the magnet 1231 and the magnetic sensor 1232 are disposed not to overlap with each other, and thus the magnetic sensor 1232 may be in an off state. In this case, the elastic body 1240 may be in a tensile state. In a state of FIG. 12D in which the button 1210 is pressed, the rotation mechanism 1220 moves counterclockwise, and at least a portion of the magnet 1231 moves toward the magnetic sensor 1232 and then is disposed so as to overlap with the magnetic sensor 1232. Therefore, the magnetic sensor 1232 may be in an on state. In this case, the elastic body 1240 may be in a compressed state.

Referring to FIG. 13A to FIG. 13D, a switching device disposed on a case 1300 may include a button 1310, a rotation mechanism 1320, an elastic body 1340, and a magnetic switch 1330.

The button 1310 is a portion to be pressed, and may be disposed on a second side of the case 1300 in a protruding or convex shape. When the button 1310 is pressed, the ends of the rotation mechanism 1320 may rotate.

The rotational lever 1320 may be disposed horizontally to the case 1300, and may be disposed so as to be rotatable about a hinge axis h. The rotational lever 1320 may be disposed in such a manner that one end interworks with the button 1310 and the other end is in proximity to the magnetic sensor 1332. The hinge axis h is provided between one end and the other end of the rotational lever 1320. When one end of the rotational lever 1320 rotates counterclockwise, the other end may also rotate counterclockwise. The button 1310 may be disposed to face one side of one end of the rotational lever 1320, and the magnetic sensor 1332 may be disposed in proximity to one side of the other end.

The elastic body 1340 supports the rotation mechanism 1320, and may provide a force for allowing the rotation mechanism 1320 to return an original position when a pressing force of the button 1310 is removed. One end of the elastic body 1340 may be fixed to the case 1300, and the other end may be fixed to the rotation mechanism 1320. For example, the elastic body 1340 may include a compressible coil spring.

The magnetic switch 1330 may include a magnet 1331 disposed on the other end of the rotation mechanism 1320 and a magnetic sensor 1332 disposed on the case 1300 in proximity to the magnet 1331.

Figure 13A:
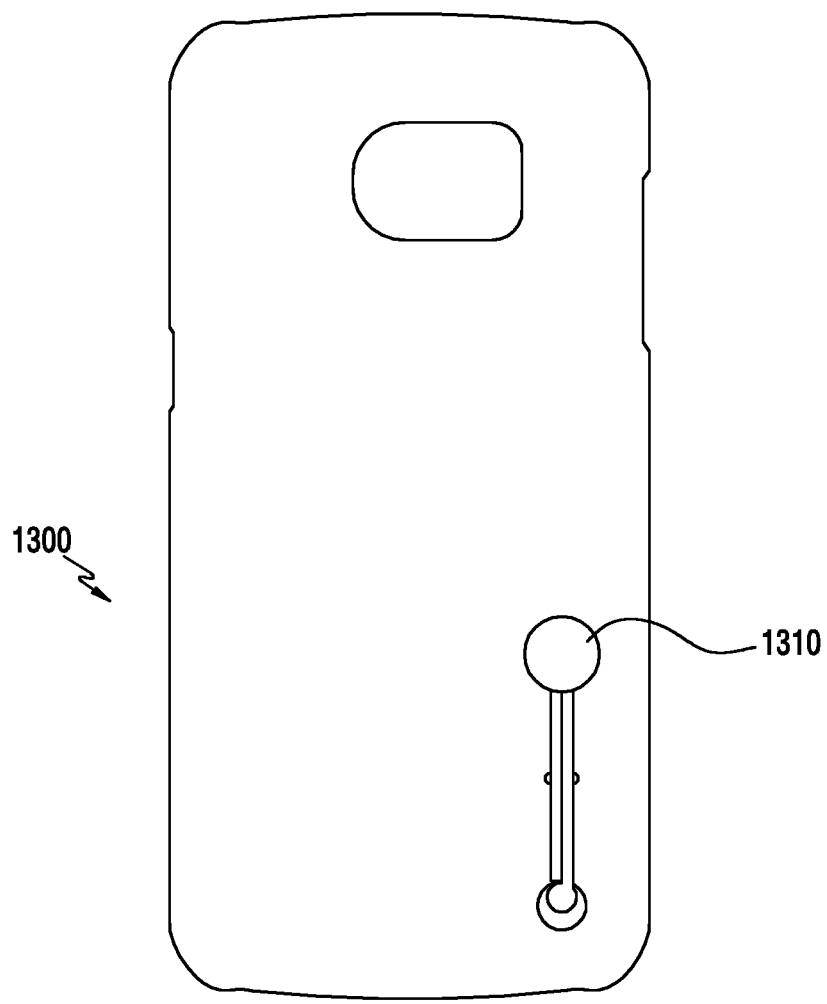
FIG. 13A illustrates a state before a rotation mechanism provided in a layered accessory case rotates, according to an embodiment.
Figure 13B:
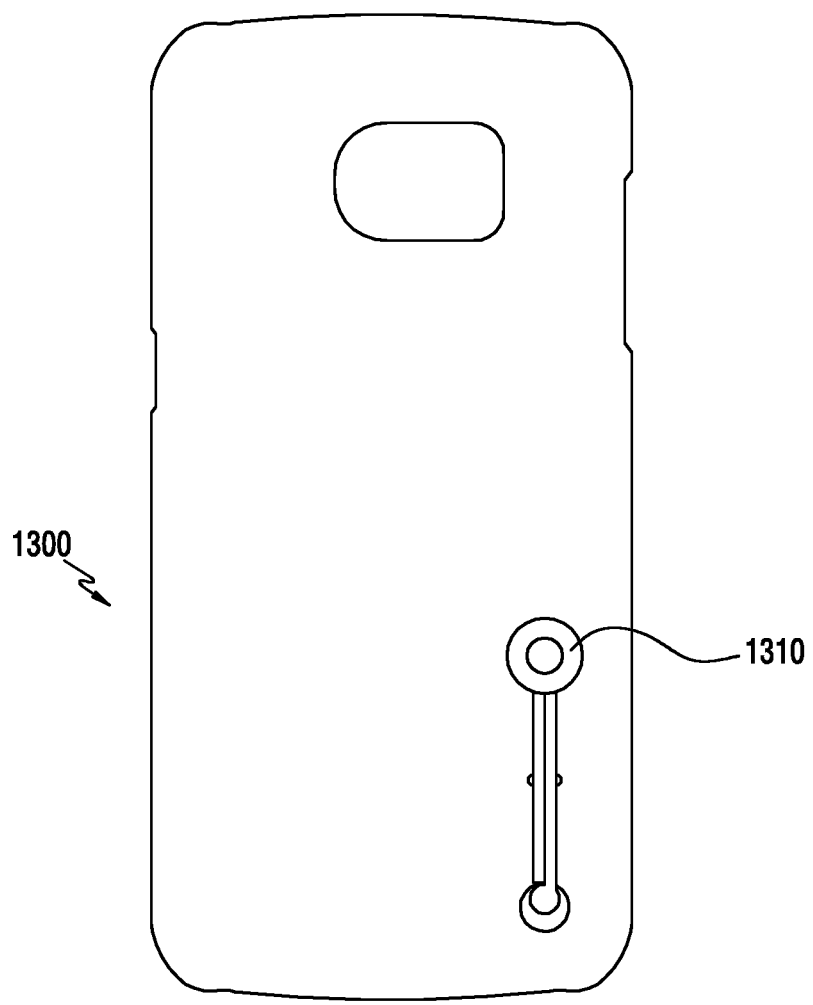
FIG. 13B illustrates a state after a rotation mechanism provided in a layered accessory case rotates, according to an embodiment.
Figure 13C:
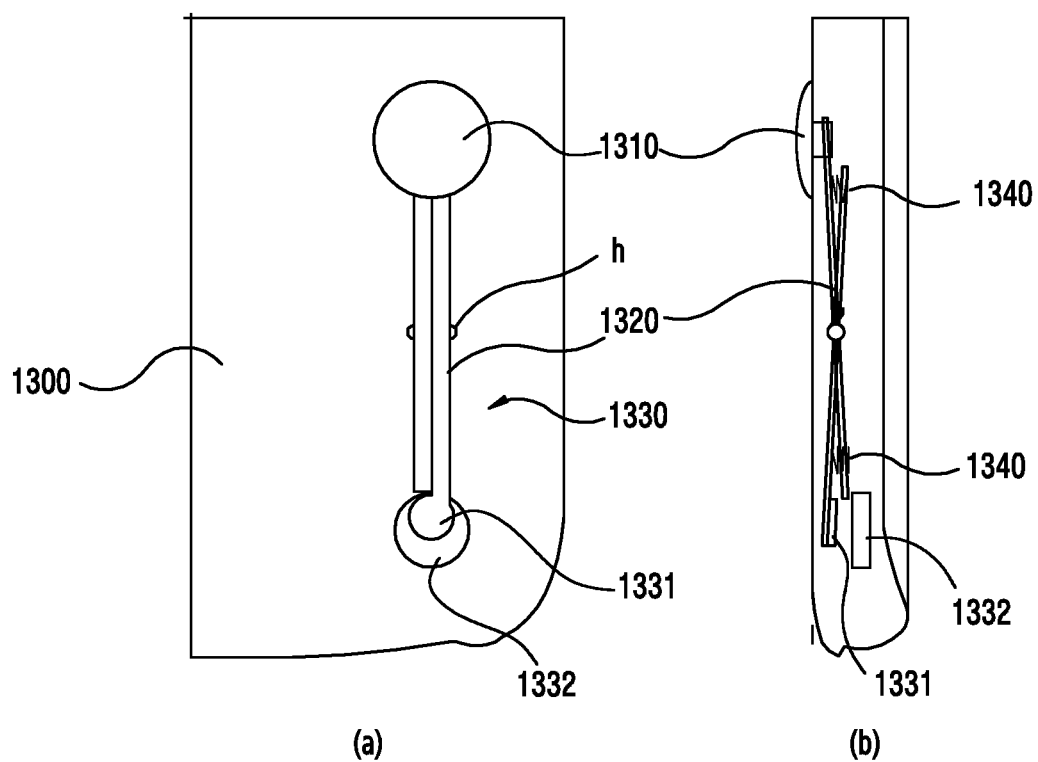
FIG. 13C is an enlarged view of a state (a) before a rotation mechanism provided in a layered accessory case rotates and a cross-sectional view (b), according to an embodiment.
Figure 13D:
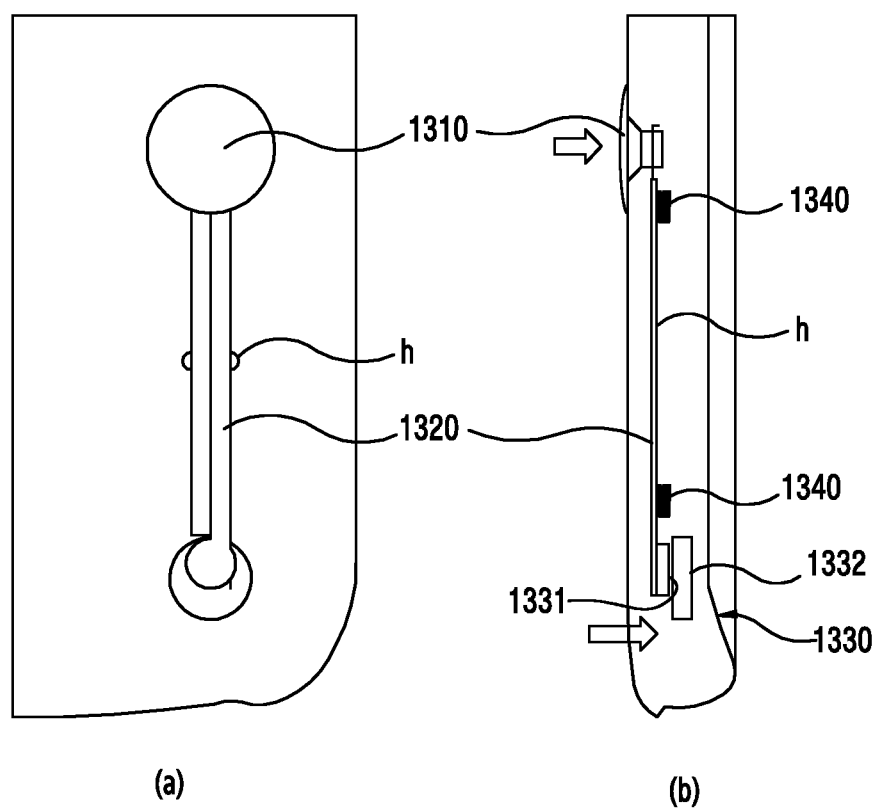
FIG. 13D is an enlarged view of a state (a) after a rotation mechanism provided in a layered accessory case rotates and a cross-sectional view (b), according to an embodiment.
Figure 14A:
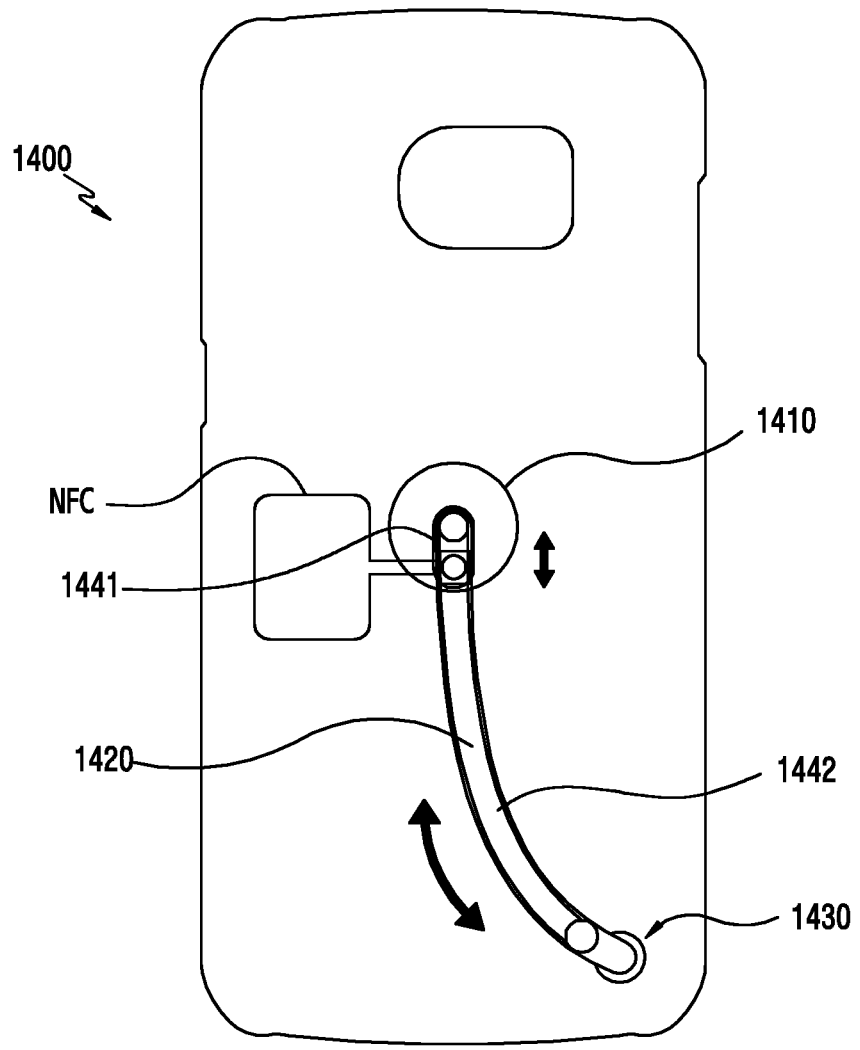
FIG. 14A illustrates a state before a flexible material portion provided in a layered accessory case moves, according to an embodiment.
Figure 14B:
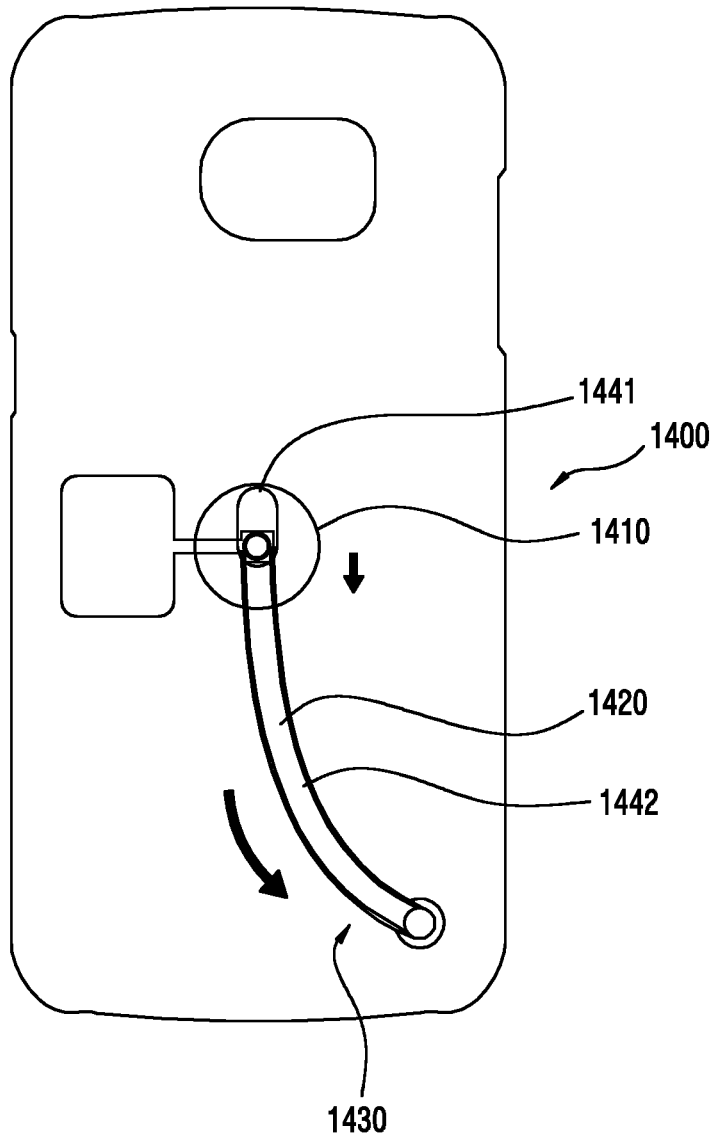
FIG. 14B illustrates a state after a flexible material portion provided in a layered accessory case moves, according to an embodiment.
Figure 14C:
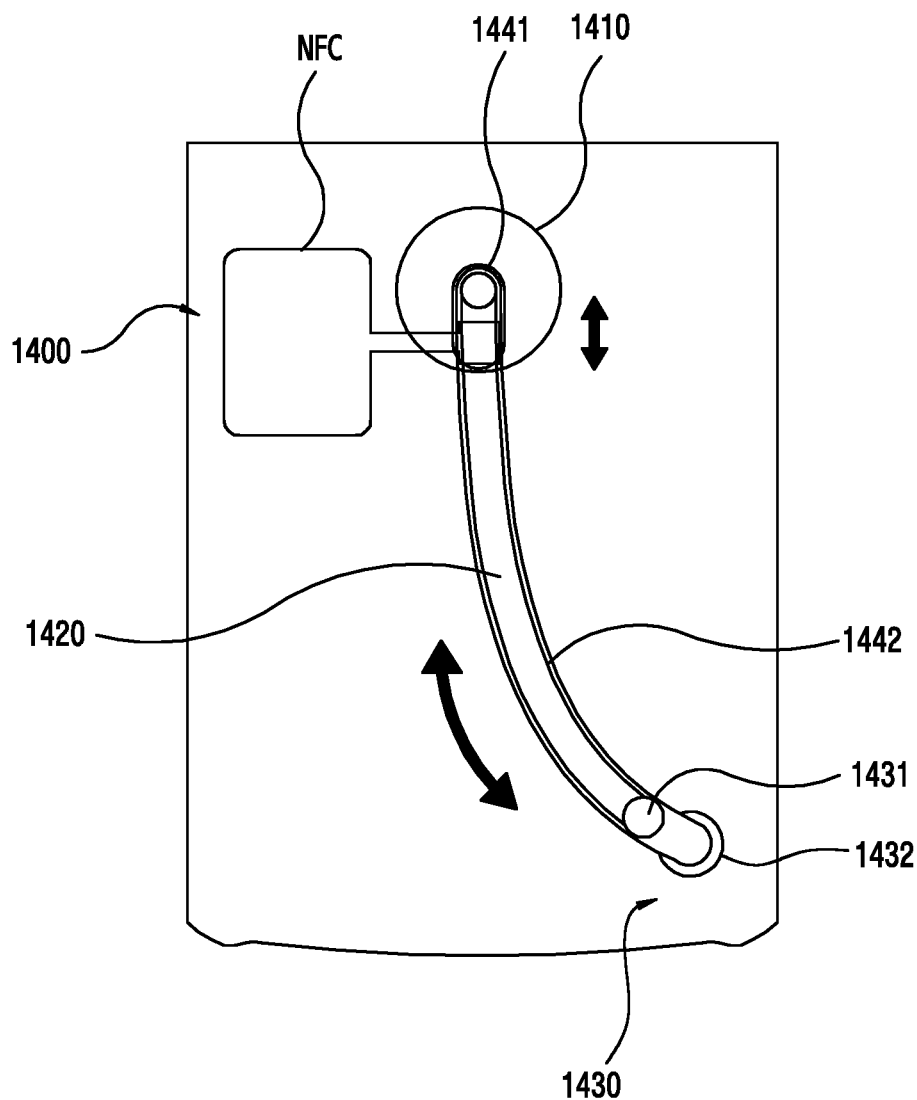
FIG. 14C is an enlarged view of a state before a flexible material portion provided in a layered accessory case moves, according to an embodiment.
Figure 14D:
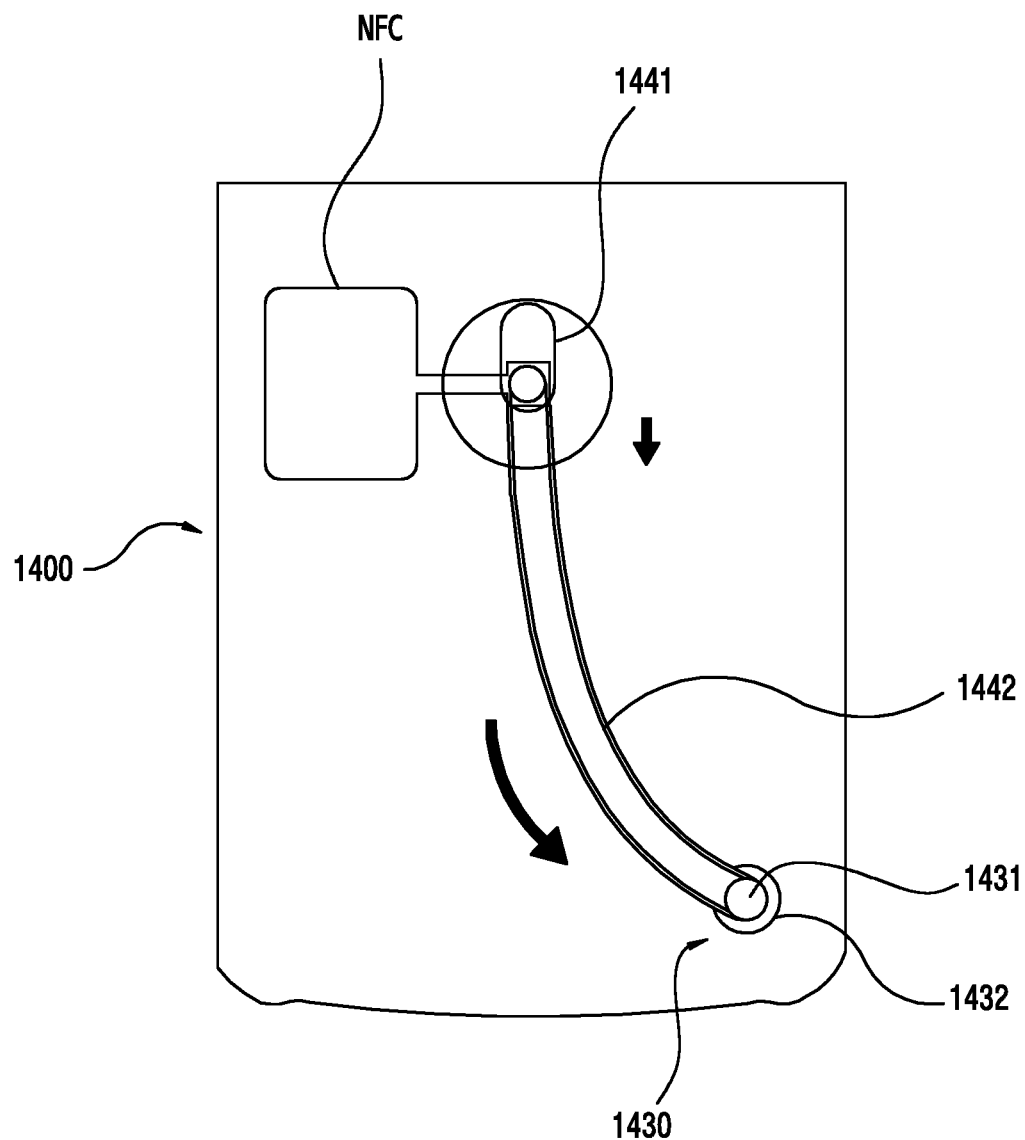
FIG. 14D is an enlarged view of a state after a flexible material portion provided in a layered accessory case rotates, according to an embodiment.

In a state of FIG. 13C in which the button 1310 is not pressed, the magnet 1331 and the magnetic sensor 1332 are disposed at a short distance from each other, and thus the magnetic sensor 1332 may be in an off state. In this case, the elastic body 1340 may be in a tensile state. In a state of FIG. 13D in which the button 1310 is pressed, the rotation mechanism 1320 moves counterclockwise, and at least a portion of the magnet 1331 moves toward the magnetic sensor 1332 and then is disposed in proximity to the magnetic sensor 1332. Therefore, the magnetic sensor 1232 may be in an on state. In this case, the elastic body 1340 may be in a compressed state.

Referring to FIG. 14A to FIG. 14D, a switching device mounted to a second side of a case 1400 may include a button 1410, guide structures 1441 and 1442, a flexible material portion 1420, and a magnetic switch 1430.

The case 1400 may have a guide rail 1441 for a horizontal sliding movement of the button 1410. The button 1410 may perform a limited sliding movement within the guide rail 1441. The guide rail 1441 may be configured in a groove or an opening shape, and may have a long shape extended in one direction in top view. The guide rail 1441 may be configured in a linear or curved shape.

The button 1410 may be a movement member which slides horizontally by means of the guide rail 1441 on the second side of the case 1400. The button 1410 may be integrally connected to the flexible material portion 1420. The button 1410 may be a portion exposed to the outside of the case 1400, and the flexible material portion 1420 may be a portion hidden inside the case.

The guide structure 1442 may be a structure which guides and supports the movement of the flexible material portion 1420 according to the sliding movement of the button 1410. For example, the guide structure 1442 may be configured in a groove shape, and may also be configured in a linear or curved shape. The guide structure 1442 having a curved shape is exemplified in FIG. 14A to FIG. 14D. One end portion of the guide structure 1442 may be coupled to the guide rail 1441, and the magnetic sensor 1432 may be disposed on the other end portion.

The flexible material portion 1420 may be a movement member which is accommodated in the guide structure 1441 to slide along the guide structure 1441. One end of the flexible material portion 1420 may be coupled to the button 1410, and the magnet 1431 may be disposed on the other end. For example, the flexible material portion 1420 may be constituted of a high density elastic polyurethane (PU) gel material or a flexible polycarbonate (PC) injection material as an injection material, and may include any one of rubber, silicone, and flexible plastic.

The magnetic switch 1430 may include a magnet 1431 disposed on the other end of the flexible material portion 1420 and a magnetic sensor 1432 disposed in proximity to the other end of the guide structure 1442. In a state of FIG. 14C, the magnet 1431 may be disposed not to overlap with the magnetic sensor 1432 in top view, and thus the magnetic sensor 1432 may be in an off state. In a state of FIG. 14D, the magnet 1431 may be disposed so as to overlap with (in contact with) the magnetic sensor 1432 in a top view, and thus the magnetic sensor 1432 may be in an on state, thereby being able to transmit a signal.

Figure 15A:
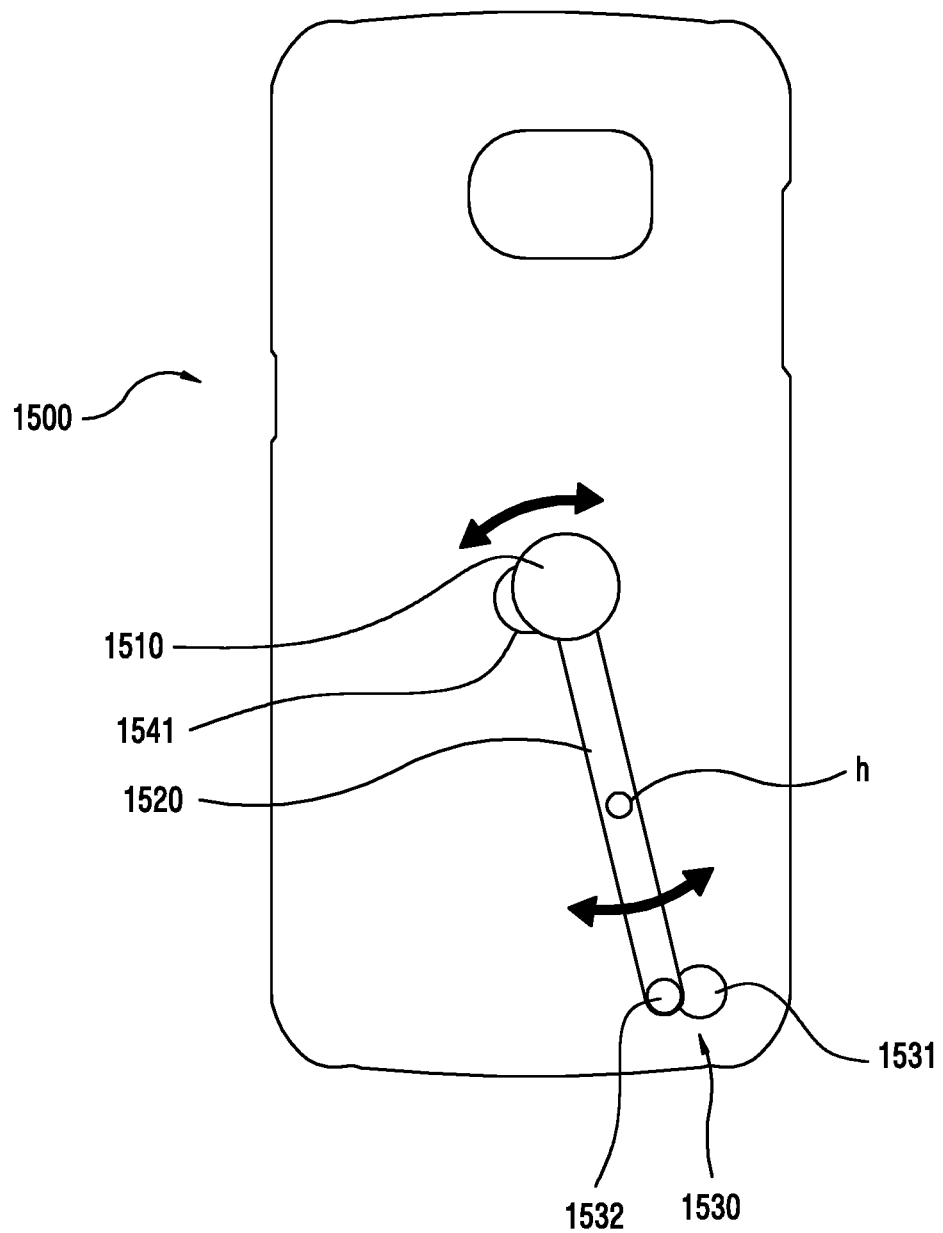
FIG. 15A illustrates a state before a rotational lever provided in a layered accessory case rotates, according to an embodiment.
Figure 15B:
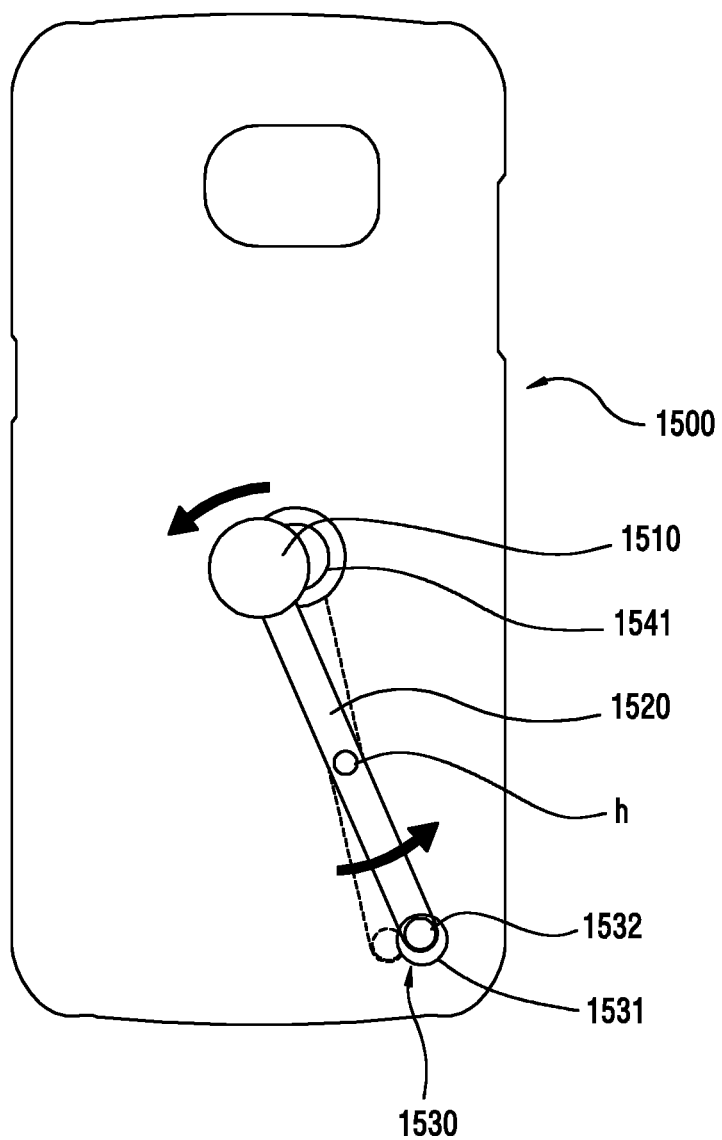
FIG. 15B illustrates a state after a rotational lever provided in a layered accessory case rotates, according to an embodiment.

Referring to FIG. 15A and FIG. 15B, a switching device disposed on a case 1500 may include a button 1510, a rotational lever 1520, and a magnetic switch 1530.

As a movement member which horizontally slides on a second side of the case 1500, the button 1510 may move along a guide opening 1541.

The rotational lever 1520 is disposed so as to be rotatable about a hinge axis h, and may move horizontally. One end of the rotational lever 1520 may be integrally coupled with the button 1510, and the other end may be integrally mounted with the magnet 1531. When one end of the rotational lever 1520 rotates counterclockwise, the other end may simultaneously rotate counterclockwise. The hinge axis h may be disposed between one end and the other end of the rotational lever 1520, and may face a vertical direction through the rotational lever 1520.

The magnetic switch 1530 may include a magnet 1531 disposed on the other end of the rotational lever 1520 and a magnetic sensor 1532 disposed in proximity to the other end of the rotational lever 1520.

In a state of FIG. 15A, the magnet 1531 is disposed not to overlap with the magnetic sensor 1532 in a top view, and thus the magnetic sensor 1532 is in an off state. In a state of FIG. 15B, the magnet 1531 is disposed so as to overlap with the magnetic sensor 1532, and thus the magnetic sensor 1532 is in an on state, thereby being able to deliver a generated signal. A short-range communication service may be activated by the delivered signal.

Figure 16A:
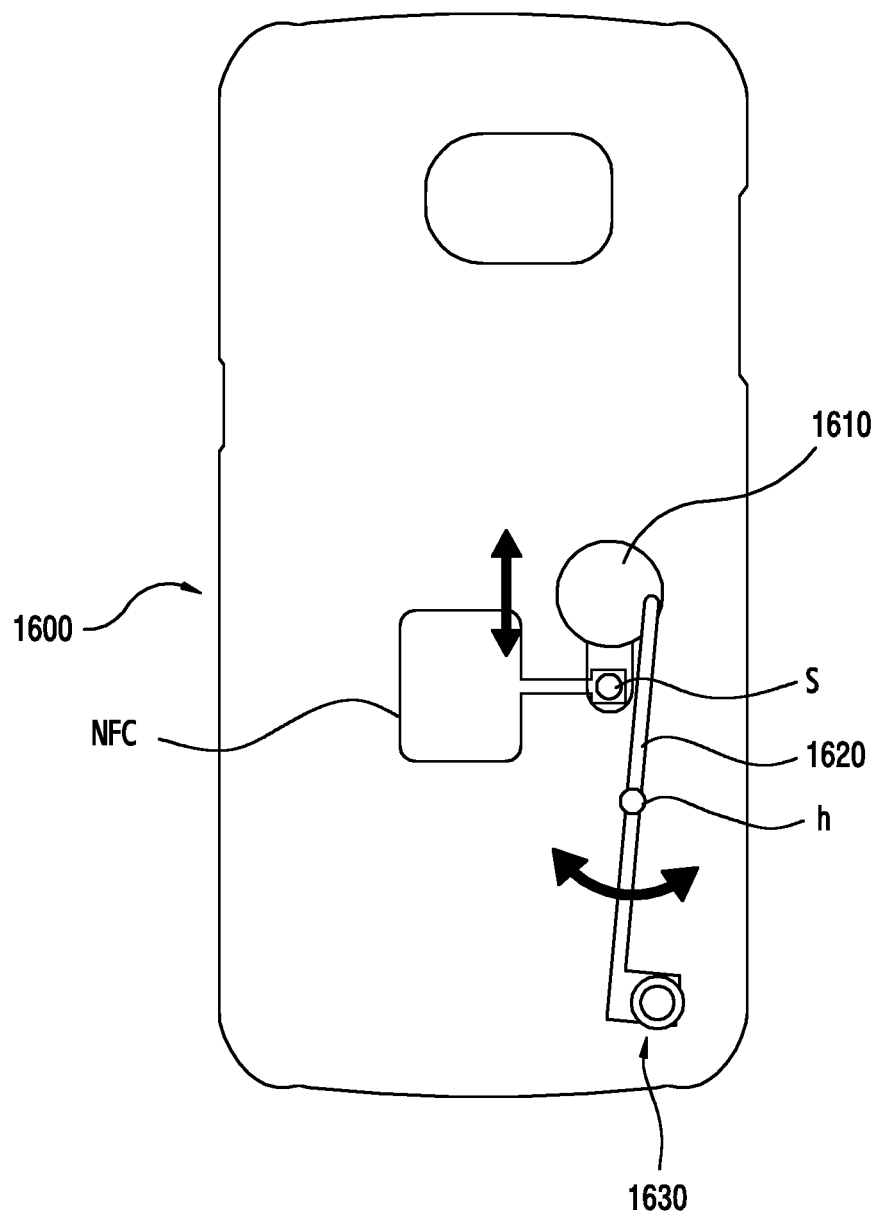
FIG. 16A illustrates a state before a coupling lever provided in a layered accessory case rotates, according to an embodiment.
Figure 16B:
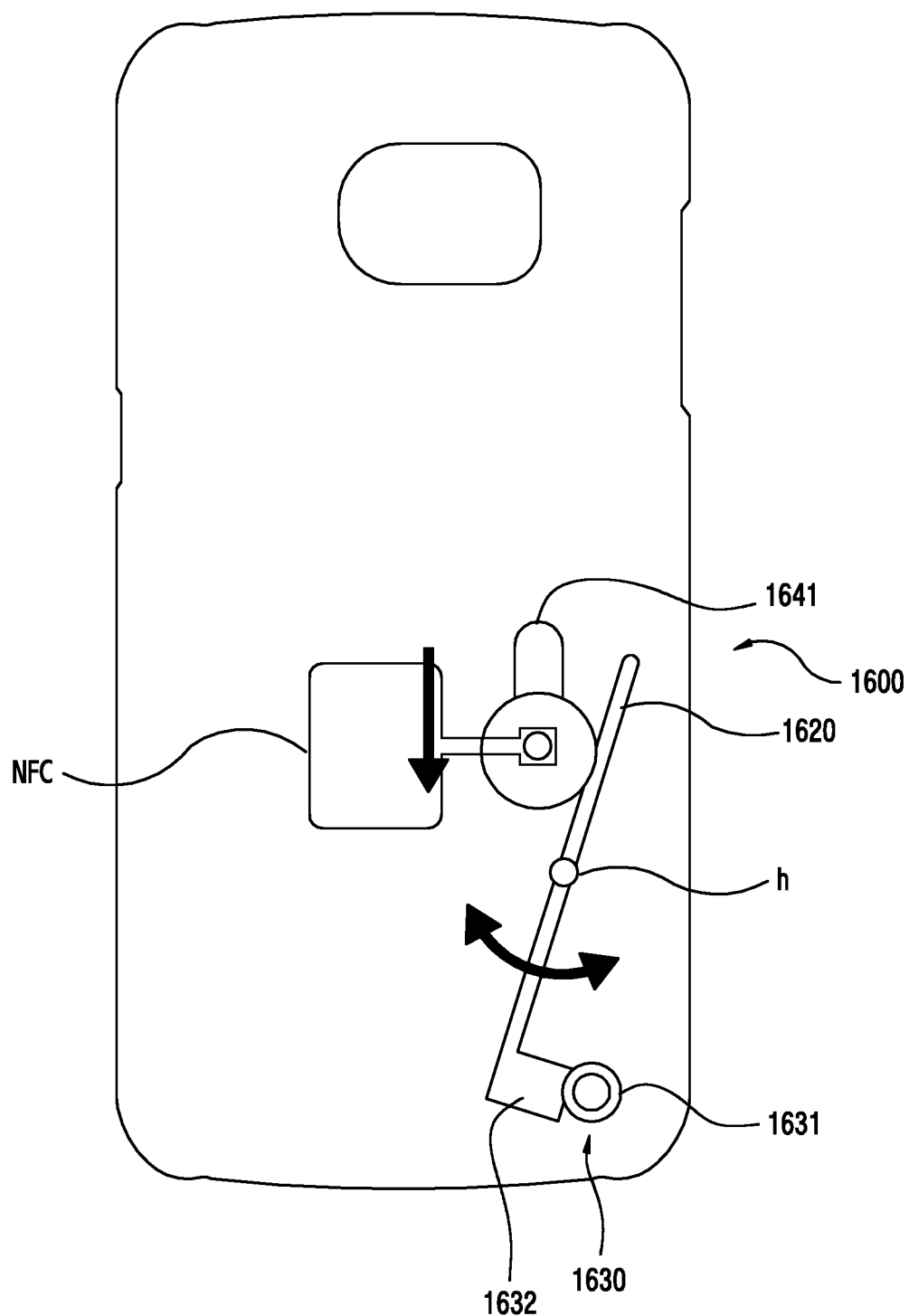
FIG. 16B illustrates a state after a coupling lever provided in a layered accessory case rotates, according to an embodiment.

Referring to FIG. 16A and FIG. 16B, a switching device mounted on a second side of a case 1600 may include a sliding button 1610, a rotational lever 1620, and a magnetic switch 1630.

The sliding button 1610 may horizontally slide on the second side of the case 1600. A guide opening 1641 for guiding the movement of the sliding button 1610 may be disposed on the second side of the case 1600. The guide opening 1641 may be configured in a linear or curved shape, and a coupling portion of the sliding button 1610 and the rotational lever 1620 is located to move the sliding button 1610 inside the guide opening 1641. For example, the sliding button 1610 may perform a sliding movement, and may be in contact with a tact switch S after sliding. Thus, the tact switch S is turned on, thereby operating a short-range communication module (i.e., an NFC module).

As a rotational member which rotates while maintaining a horizontal state by interworking with the sliding movement of the button 1610, the rotational lever 1620 may rotate about a hinge axis h either clockwise or counterclockwise. One end of the rotational lever 1620 may be a portion in contact with the sliding button 1610, and the other end may be a portion in which the magnetic sensor 1632 is open or closed. The hinge axis h is located approximately in a middle portion of the rotational lever 1620, and may face a vertical direction.

The magnetic switch 1630 may consist of a magnet 1631 and a magnetic sensor 1632. The magnet 1631 may be disposed on the other end of the rotational lever 1620, and thus the magnetic sensor 1632 may be turned on or off depending on a limited rotation operation of the rotational lever 1620.

When the sliding button 1610 moves from one end of the guide opening 1641 to the other end, a tact switch s is turned on simultaneously, and the rotational lever 1620 rotates clockwise to separate the magnet 1631 from the magnetic sensor 1632. In a top view, the magnet 1631 may be disposed not to overlap with the magnetic sensor 1632. When the sliding button 1610 moves from the other end of the guide opening 1641 to one end, the rotational lever 1620 rotates counterclockwise simultaneously, and thus the magnet 1631 may be in contact with or face the magnetic sensor 1632. In a top view, the magnet 1631 may be disposed so as to at least partially overlap with the magnetic sensor 1632.

Figure 17A:
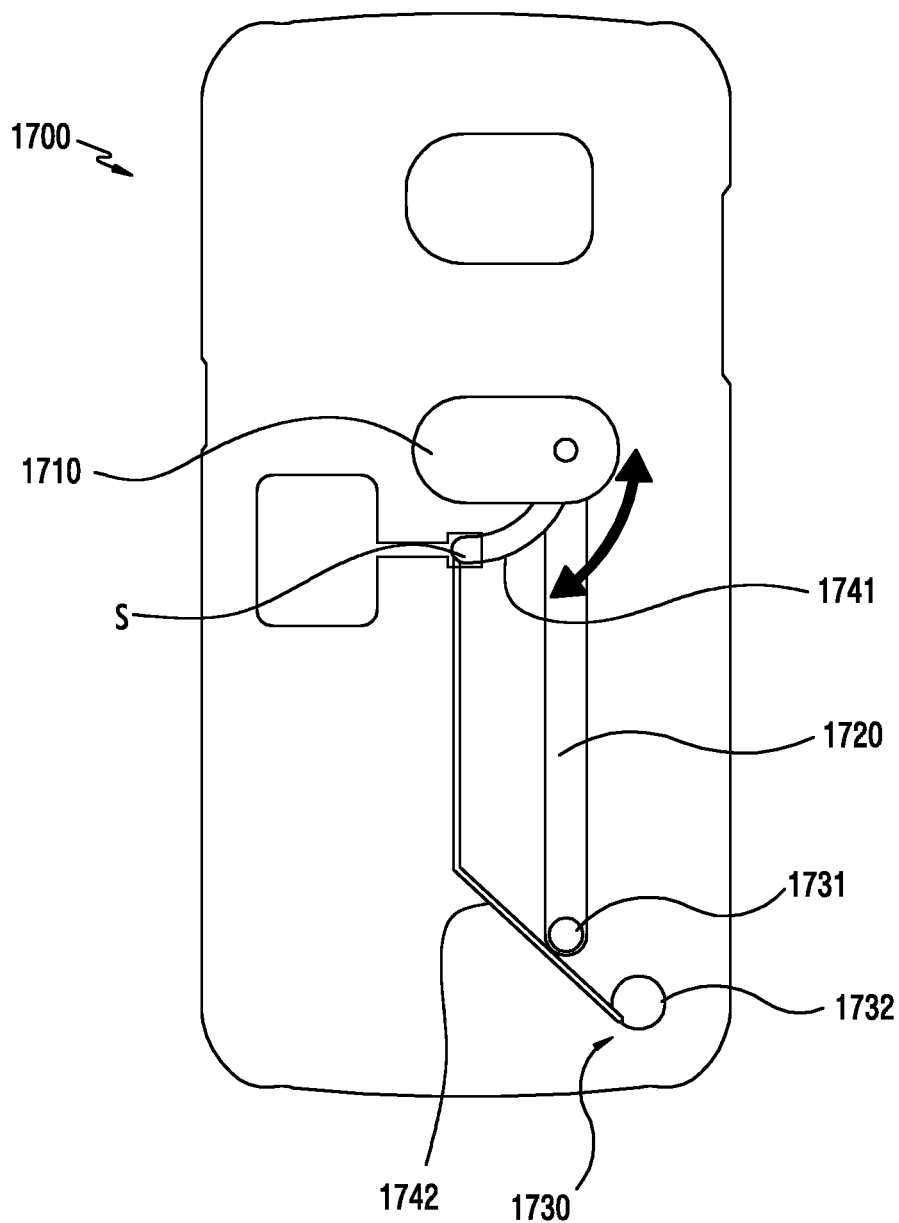
FIG. 17A illustrates a state before a coupling lever provided in a layered accessory case rotates, according to an embodiment.
Figure 17B:
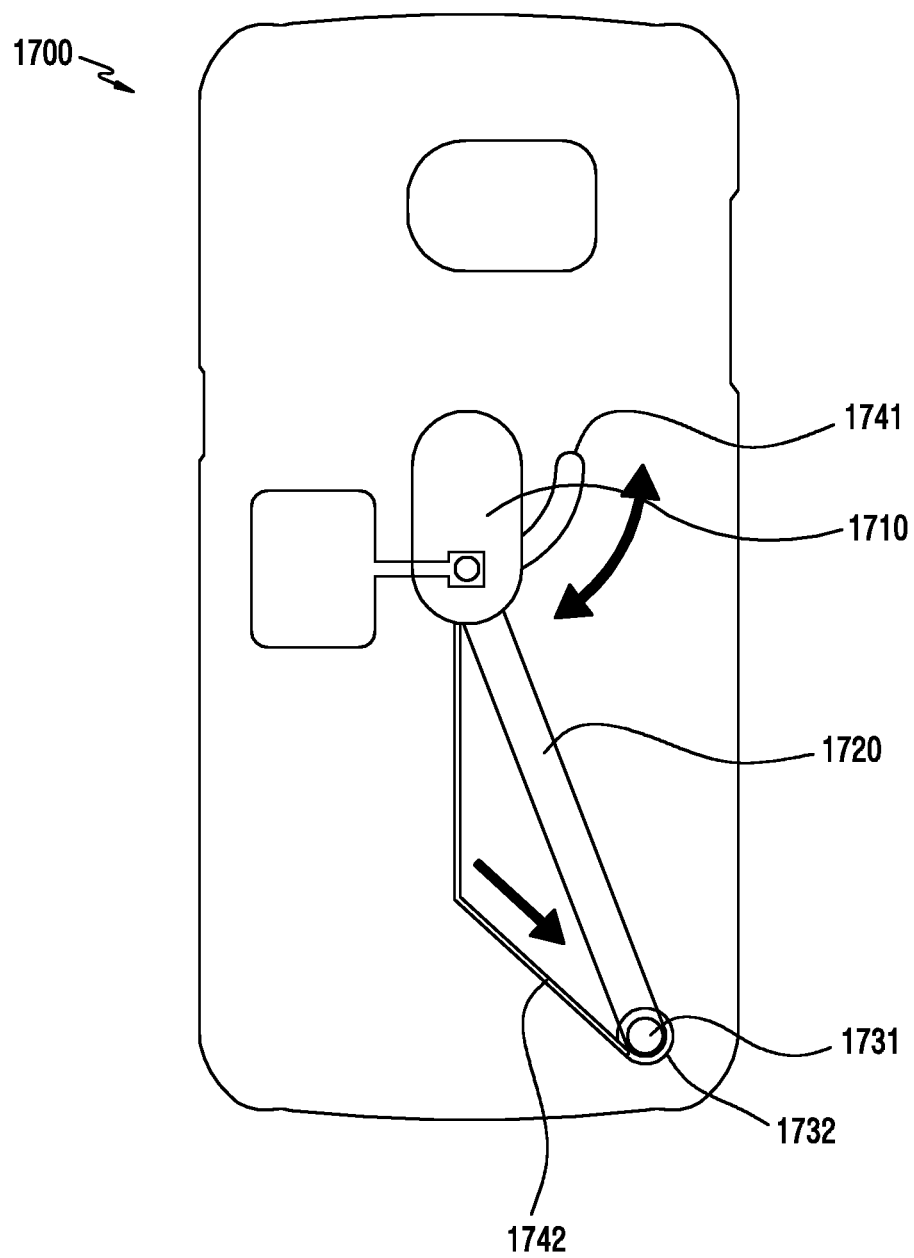
FIG. 17B illustrates a state after a coupling lever provided in a layered accessory case rotates, according to an embodiment.

Referring to FIG. 17A and FIG. 17B, a switching device disposed at a second side of a case 1700 may include a rotation button 1710, a guide opening 1741, a coupling lever 1720, a guide surface 1742, and a magnetic switch 1730.

The rotation button 1710 may be disposed so as to be rotatable about a hinge axis on the second side of the case 1700. The rotary button 1710 may have one end on which the hinge axis is located and the other end on which the coupling lever 1720 is coupled. The other end of the rotational lever 1720 may move along the guide opening 1741.

The guide opening 1741 may be a movement path on which the other end of the rotation button 1710 moves in a constrained state and one end of the rotational lever 1720 moves in the constrained state. The guide opening 1741 may be configured to have a curvature. A tact switch S may be disposed at the other end of the guide opening 1741.

The coupling lever 1720 may move in a constant trajectory while maintaining a horizontal state. One end of the coupling lever 1720 is coupled to the other end of the rotation button 1710 in a rotatable manner and thus is movable along the guide opening 1741. The other end of the coupling lever 1720 is a portion to which the magnet 1731 is mounted, and may move along the guide surface 1742 and thus may be disposed so as to overlap or not to overlap with the magnetic sensor 1732. The coupling lever 1720 may be variously referred to as a coupling bar, a sliding rotation bar, or a coupling link.

The magnetic switch 1730 may consist of a magnet 1731 and a magnetic sensor 1732. The magnet 1731 may be disposed at the other end of the coupling lever 1720, and the magnetic sensor 1732 may be disposed in proximity to the magnet 1731 in the case 1700.

In a state of FIG. 17A, since the magnet 1731 is spaced apart from the magnetic sensor 1732, the magnetic sensor 1732 is in an off state. When the rotation button 1710 of FIG. 17B rotates, the coupling lever 1720 moves in a constant trajectory, and the magnet 1731 disposed at an end thereof may be disposed such that at least one portion thereof overlaps on the magnetic sensor 1732 after moving along the guide surface 1742. The magnet 1731 may be disposed so as to overlap with the magnetic sensor 1732, and thus the magnetic sensor 1732 may be turned on to deliver a signal. Simultaneously, the tact switch S may also be turned on to deliver a signal.

Figure 18A:
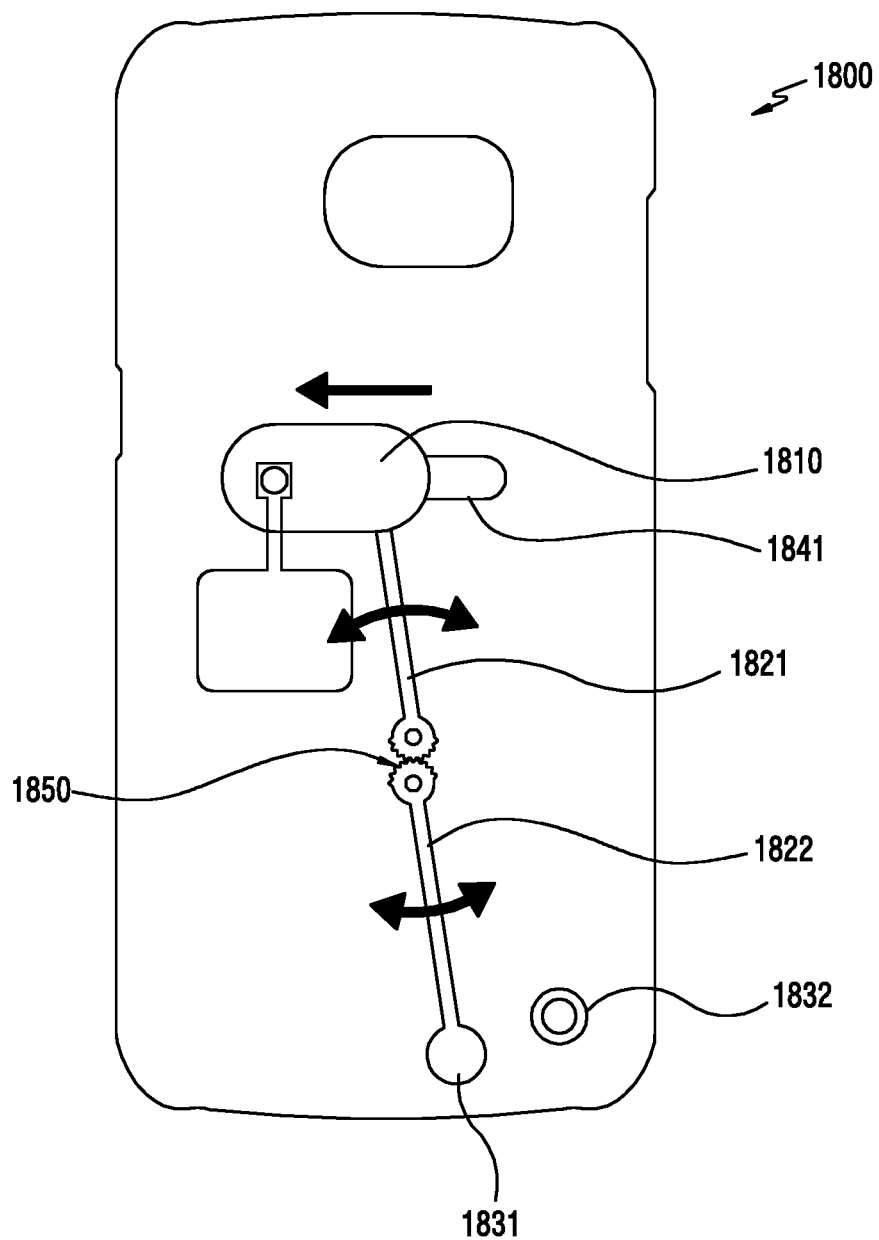
FIG. 18A illustrates a state before a coupling lever provided in a layered accessory case rotates, according to an embodiment.
Figure 18B:
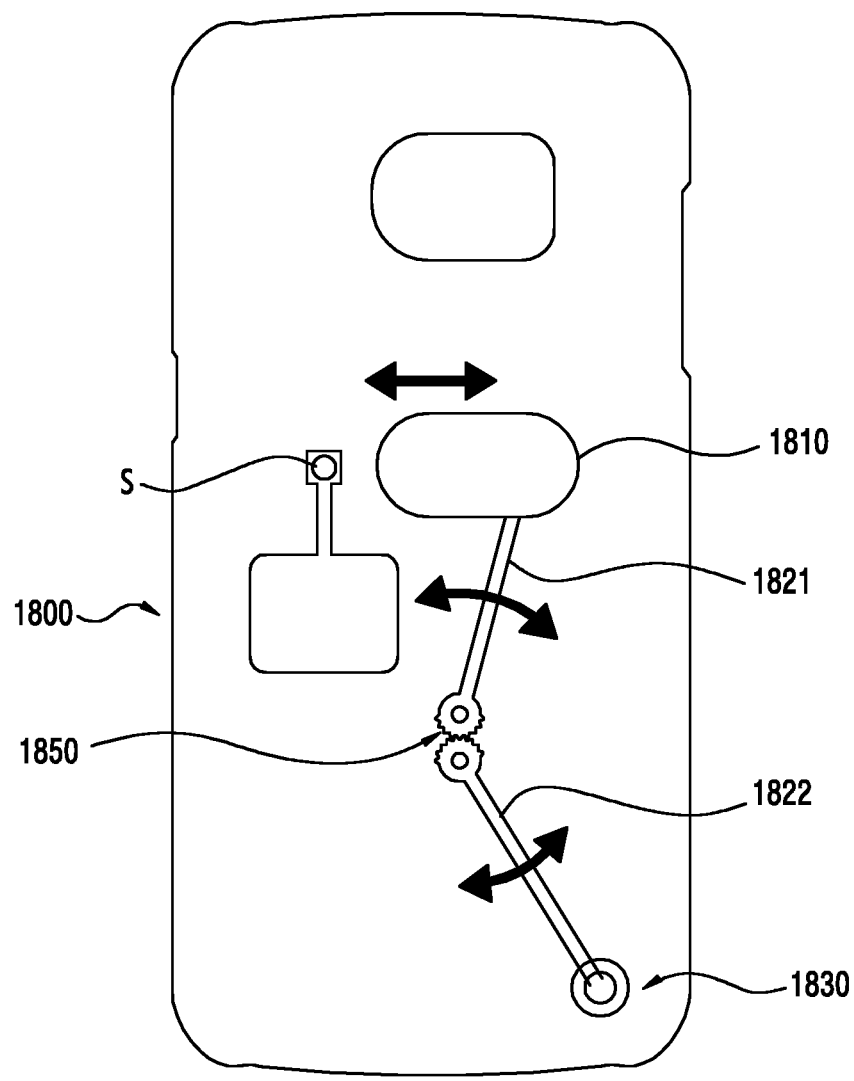
FIG. 18B illustrates a state after a coupling lever provided in a layered accessory case rotates, according to an embodiment.

Referring to FIG. 18A and FIG. 18B, a switching device disposed at a second side of a case 1800 may include a sliding button 1810, at least two coupling levers 1821 and 1822, a gear mechanism 1850, and a magnetic switch 1830.

The sliding button 1810 may move along the guide opening 1841 disposed on a second side of the case 1800, and may move on the second side of the case 1800 while maintaining a horizontal state. The sliding button 1810 may turn the magnetic switch 1830 on with a sliding movement, and may simultaneously turn on the tact switch S. The sliding button 1810 may move in a linear or curved shape.

At least one coupling lever may consist of the first and second coupling levers 1821 and 1822, and may be configured in an interworking structure in such a manner that the gear mechanism 1850 is disposed between the first and second coupling levers 1821 and 1822. The gear mechanism 1850 may include a first gear provided in the first coupling lever 1821 and a second gear provided in the second coupling lever 1822.

One end of the first coupling lever 1821 may be coupled to one end portion of the sliding button 1810 in a rotatable manner, and the other end may be coupled to the gear mechanism 1850. The other end of the first coupling lever 1821 may be provided with a first gear. The second coupling lever 1822 may be disposed in proximity to the magnetic sensor 1832 in a state where the magnet 1831 is disposed at one end, and the other end may be coupled to the gear mechanism 1850. The other end of the second coupling lever 1822 may be provided with a second gear engaged with the first gear. Each of the first and second coupling levers 1821 and 1822 may move with a trajectory while maintaining a horizontal state due to the movement of the sliding button 1810 and the engagement of the first and second gears. When the magnet 1831 is disposed so as to overlap with the magnetic sensor 1832, the magnetic sensor 1832 may be turned on to deliver a sensed signal. The magnetic switch 1830 may include a magnet 1831 disposed on the other end of the second coupling lever 1822 and a magnetic sensor 1832 disposed in proximity to the magnet 1831.

Figure 19A:
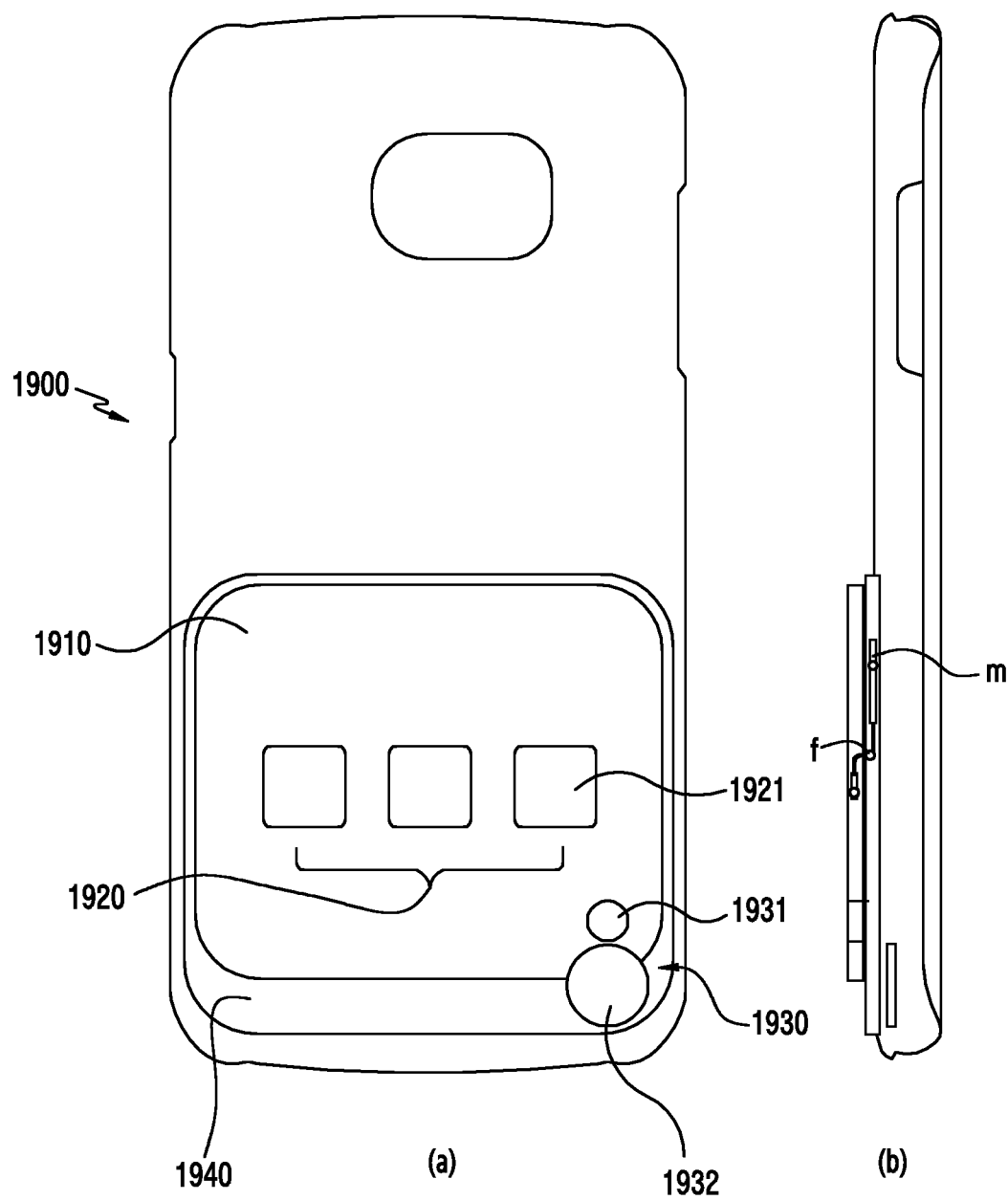
FIG. 19A illustrates a front side (a) and a lateral cross-sectional view (b) of a state before a sliding key of a layered accessory case moves, according to an embodiment.
Figure 19B:
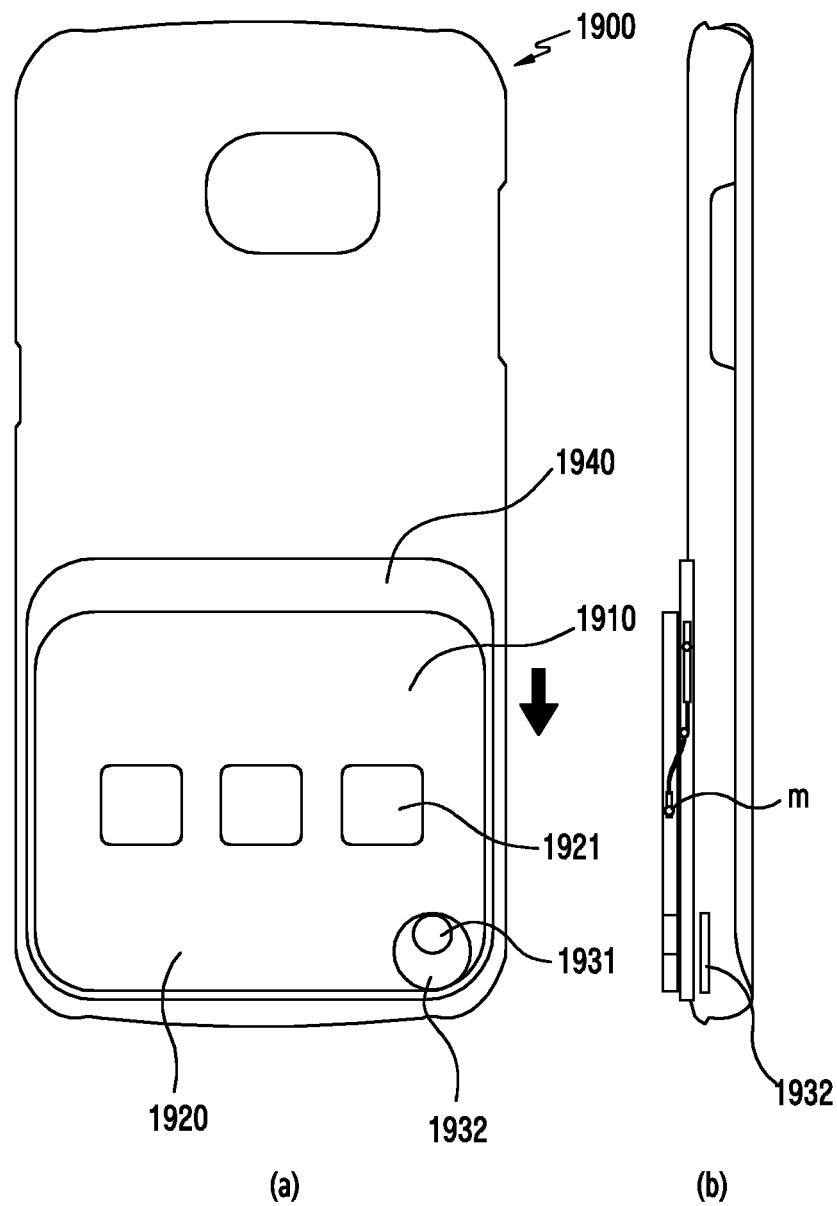
FIG. 19B illustrates a front side (a) and a lateral cross-sectional view (b) of a state after a sliding key of a layered accessory case moves, according to an embodiment.

Referring to FIG. 19A and FIG. 19B, a switching device mounted to a case 1900 may include a sliding button 1910, a circuit portion 1920, a communication module m, a flexible circuit portion f, and a magnetic switch 1930.

The sliding buttons 1910 may be configured slidably in a horizontal direction on a second side of the case 1900. The case 1900 may have a guide groove 1940 on the second side, and a limited sliding movement of the sliding button 1910 may be possible in the guide groove 1940.

The circuit portion 1920 may be provided in the sliding button 1910, and may include at least two button portions 1921. The circuit portion 1920 may include a magnet 1931 at one corner. The button portion 1921 may always be electrically coupled to the short-range communication module m by the flexible circuit f. A signal may be generated when the button portion 1921 is pressed.

Figure 19C:
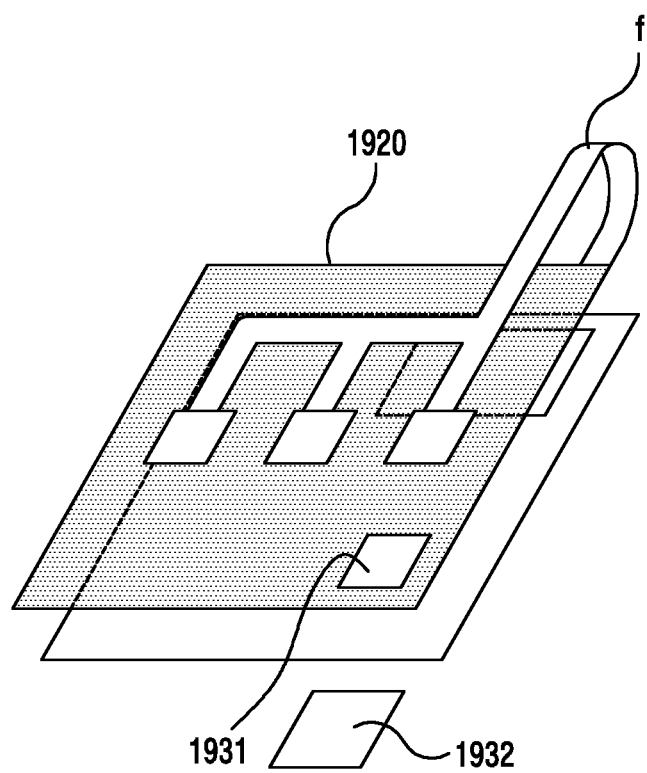
FIG. 19C illustrates an example of a state where a magnetic switch is off, in a state before a sliding key of a layered accessory case moves, according to an embodiment.
Figure 19D:
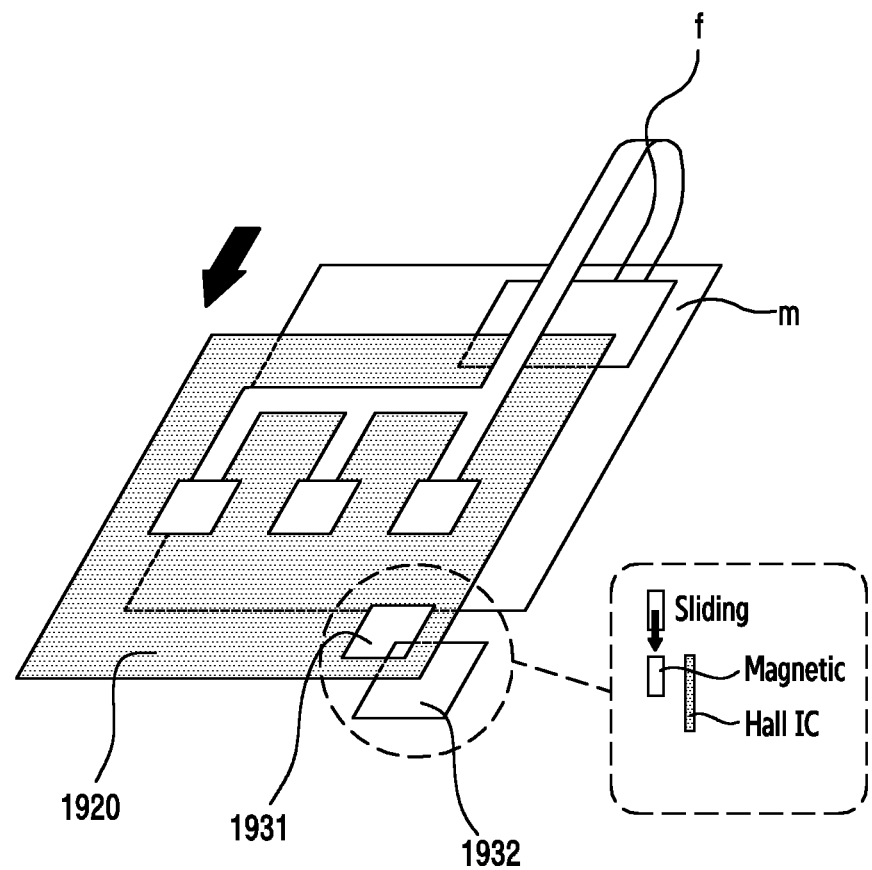
FIG. 19D illustrates an example of a state where a magnetic switch is on, in a state after a sliding key of a layered accessory case moves, according to an embodiment.

The magnetic switch 1930 mounted to the case 1900 may include a magnet 1931 provided in the sliding button 1910 and a magnetic sensor 1932 disposed inside the case 1900. The magnetic sensor 1932 may be turned on or off when the sliding button 1910 moves. For example, in a top view, when the magnet 1932 is disposed at a position not overlapping with the magnetic sensor 1932, the magnetic sensor 1932 may be in an off state. When the magnet 1931 is disposed at a position overlapping with the magnetic sensor 1932, the magnetic sensor 1932 may be turned on to deliver a sensed signal. A state where the magnet 1931 is disposed not to overlap with the magnetic sensor 1932 is shown in FIG. 19C, and a state where the magnet 1931 is disposed so as to overlap with the magnetic sensor 1932 is shown in FIG. 19D.

Figure 20A:
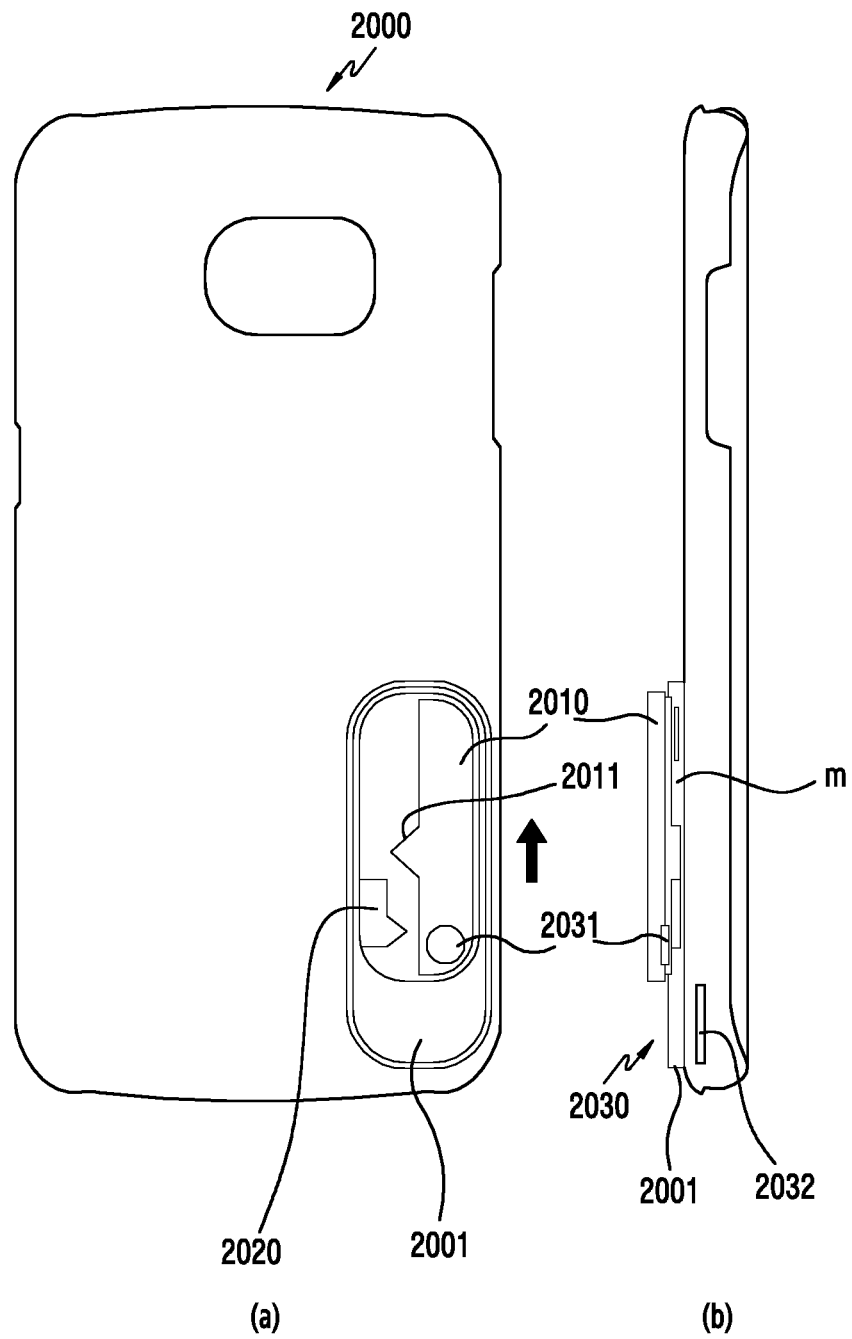
FIG. 20A illustrates a front side (a) and a lateral cross-sectional view (b) of a state before a sliding key of a layered accessory case moves, according to an embodiment.
Figure 20B:
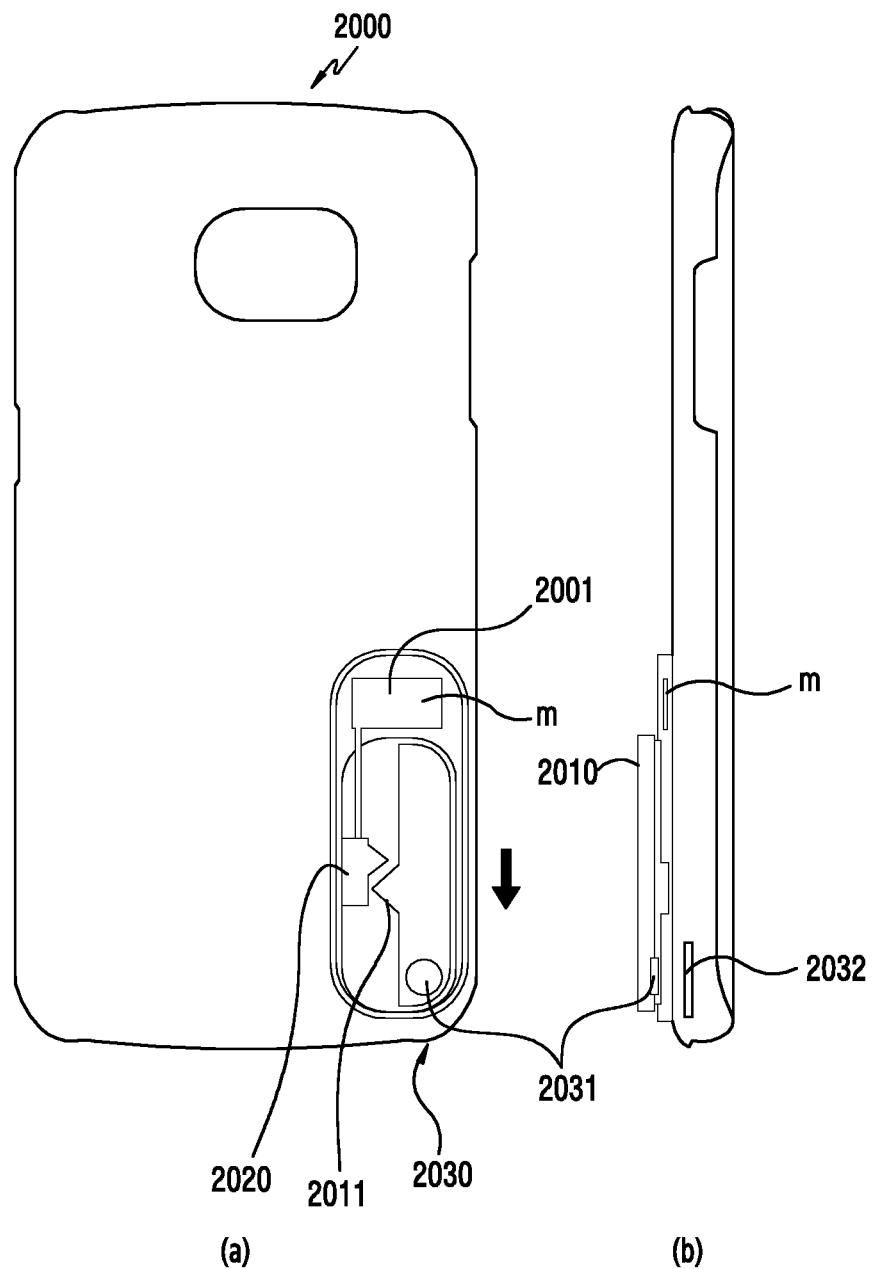
FIG. 20B illustrates a front side (a) and a lateral cross-sectional view (b) of a state after a sliding key of a layered accessory case moves, according to an embodiment.
Figure 20C:
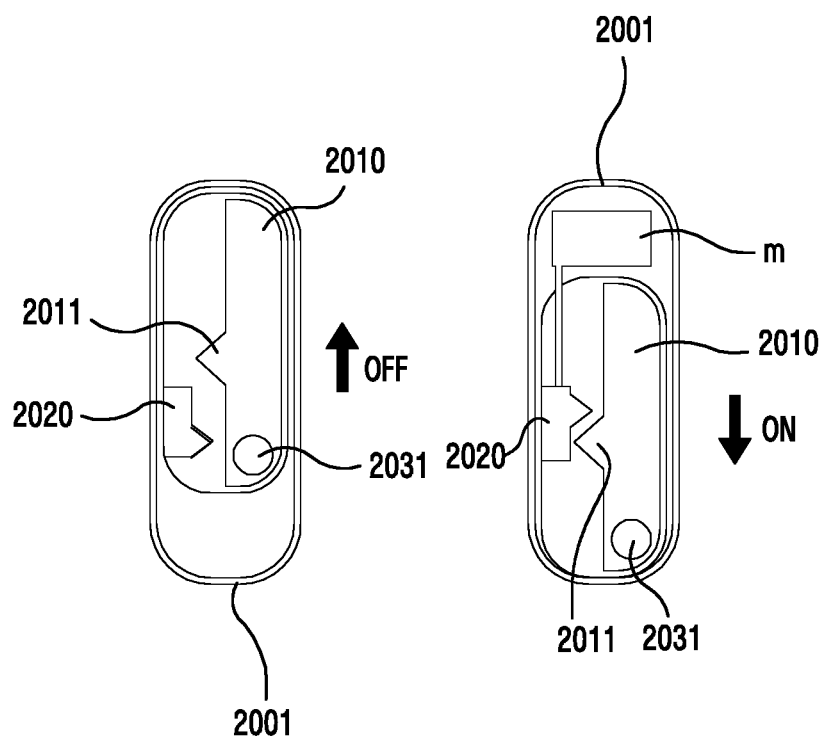
FIG. 20C illustrates a state where a switching device is turned on or off depending on a movement of a sliding key of a layered accessory case, according to an embodiment.

Referring to FIG. 20A to FIG. 20C, a switching device disposed in a case 2000 may include a sliding member 2010, a micro switch 2020, and a magnetic switch 2030.

The switching device may turn the micro switch 2020 on when the sliding member 2010 moves and also simultaneously turn the magnetic switch 2030 on. Therefore, even when the electronic device is in a sleep state or a lock screen state, a service of a short-range communication module m may be available with a single motion.

The case 2000 may include a bottom part 2001 to which the switching device is disposed. The sliding member 2010 and the micro switch 2020 may be disposed on the bottom part 2010.

The sliding member 2010 is a movement member which moves while maintaining a horizontal state on the bottom part 2001 while facing the bottom part 2001. The micro switch 2020 and the magnetic switch 2030 may be simultaneously turned on or off depending on whether sliding is achieved. When the sliding member 2010 of FIG. 20A is located at one side, the switching device may be in an off state, and when the sliding member 2010 of FIG. 20B is moved to the other side, the switching device may be in an on state. The sliding member 2010 may have a trigger 2011 for turning the micro switch 2020 on according to the sliding. The trigger 2011 may be configured in a protrusion shape on the sliding member 2010 to turn the micro switch 2020 on by pressing an actuator of the micro switch 2020 in a sliding operation of the sliding member 2020, and to turn the micro switch 2020 on by pressing the actuator of the micro switch 2020 in a reverse sliding operation of the sliding member 2010. That is, the trigger 2011 of the sliding member may be mounted to interwork with the actuator of the micro switch 2020 when the sliding member 2010 moves. For example, the trigger 2011 may be disposed in a middle portion of the sliding member 2010. In addition, the sliding member 2010 may be provided with a magnet 2031 in a specific region.

The micro switch 2020 may be disposed at the bottom part 2001 to face the trigger 2011 of the sliding member. That is, the actuator of the micro switch 2020 may be disposed to face the trigger 2011, and may be disposed on the bottom part 2001 to interwork according to whether the sliding member 2010 moves. The micro switch 2020 may be electrically coupled to a short-range communication module m. When the micro switch 2020 is turned on, the short-range communication module m receives a service using the short-range communication module m.

The magnetic switch 2030 may include the magnet 2031 disposed on the sliding member 2020 and a magnetic sensor 2032 disposed on the case 2000. In a top view, when the magnet 2031 and the magnetic sensor 2032 do not overlap with each other, the magnetic sensor 2032 may be in an off state, and when the magnet 2031 and the magnetic sensor 2032 are disposed at an overlapping position, the magnetic sensor 2032 may be in an on state.

The micro switch 2020 and the magnetic sensor 2032 are in an off state before the sliding member 2010 moves as shown in FIG. 20A, and the micro switch 2020 and the magnetic sensor 2032 may be in an on state after the sliding member 2010 moves as shown in FIG. 20B. The micro switch may be used to enable minimization.

Figure 21A:
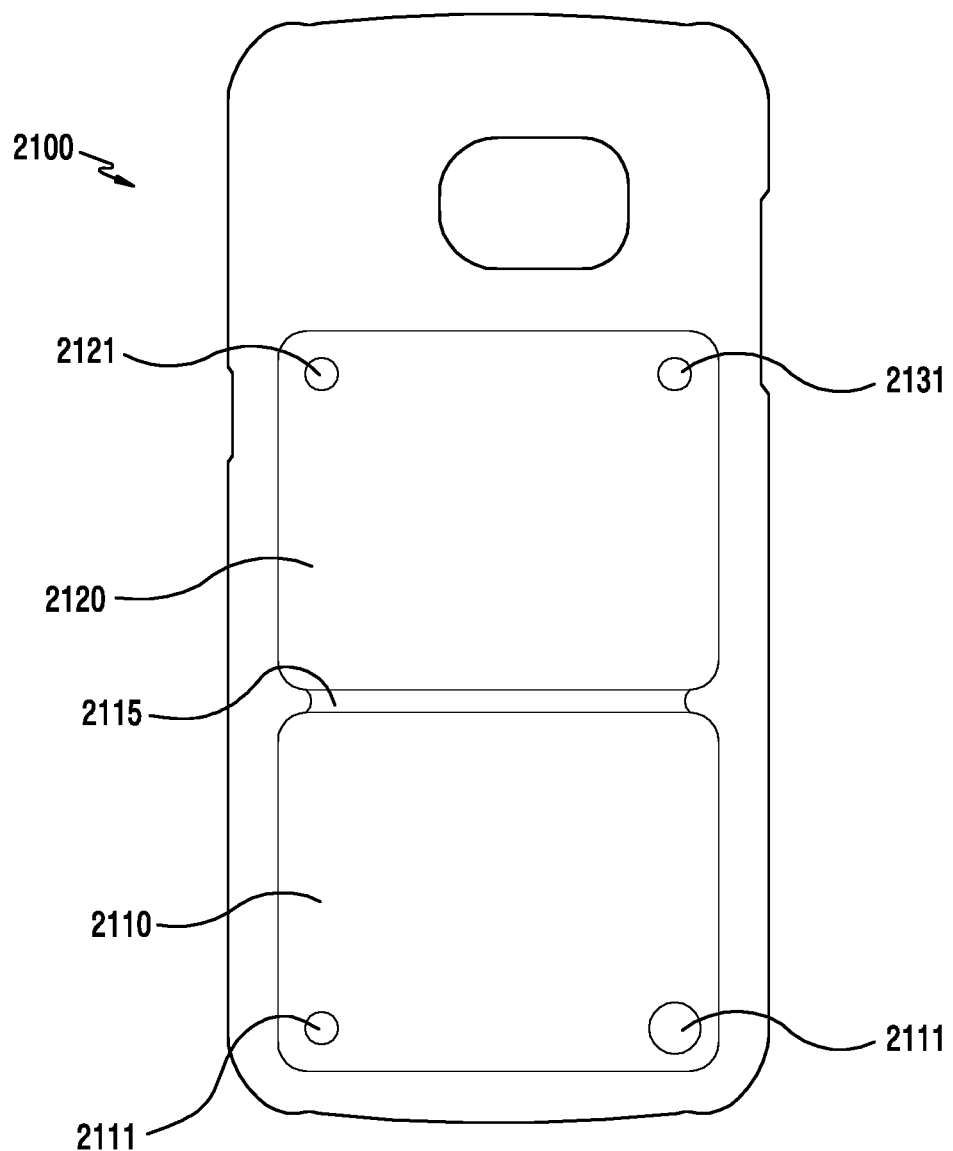
FIG. 21A illustrates a state where a foldable member provided in a layered accessory case is unfolded, according to an embodiment.
Figure 21B:
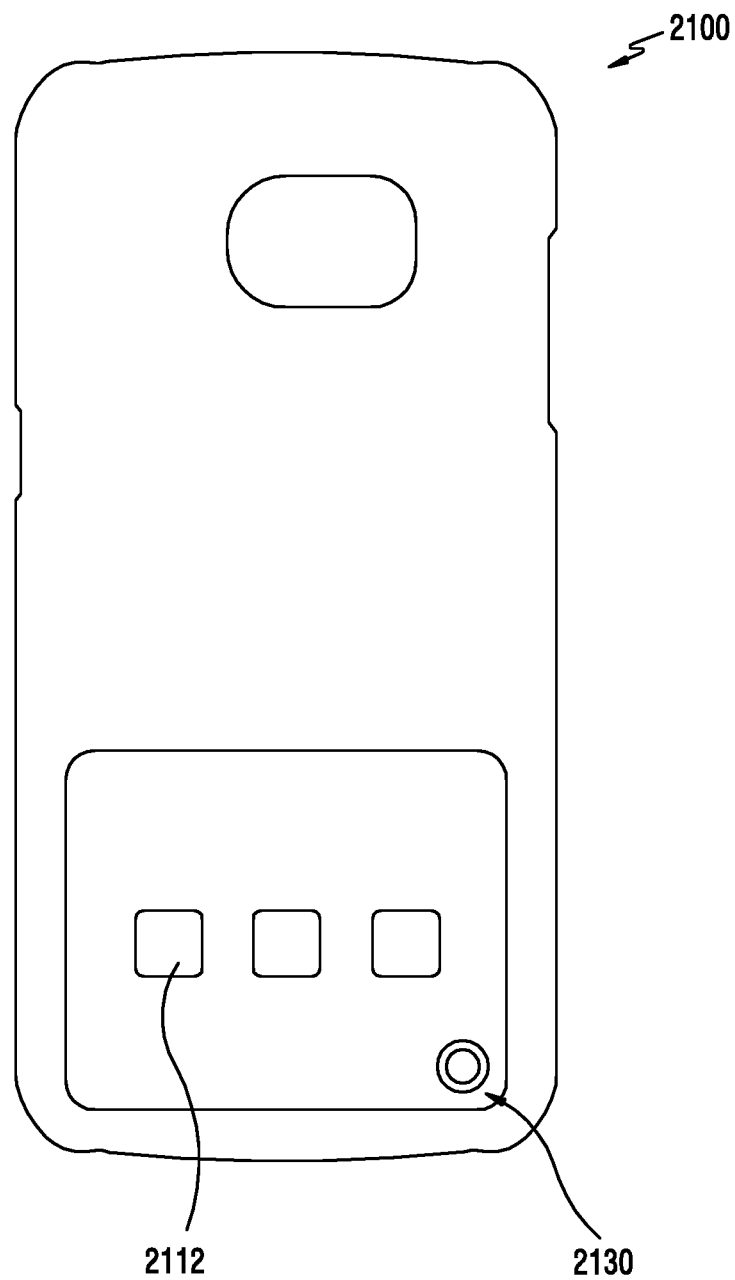
FIG. 21B illustrates a state where a foldable member provided in a layered accessory case is folded, according to an embodiment.
Figure 21C:
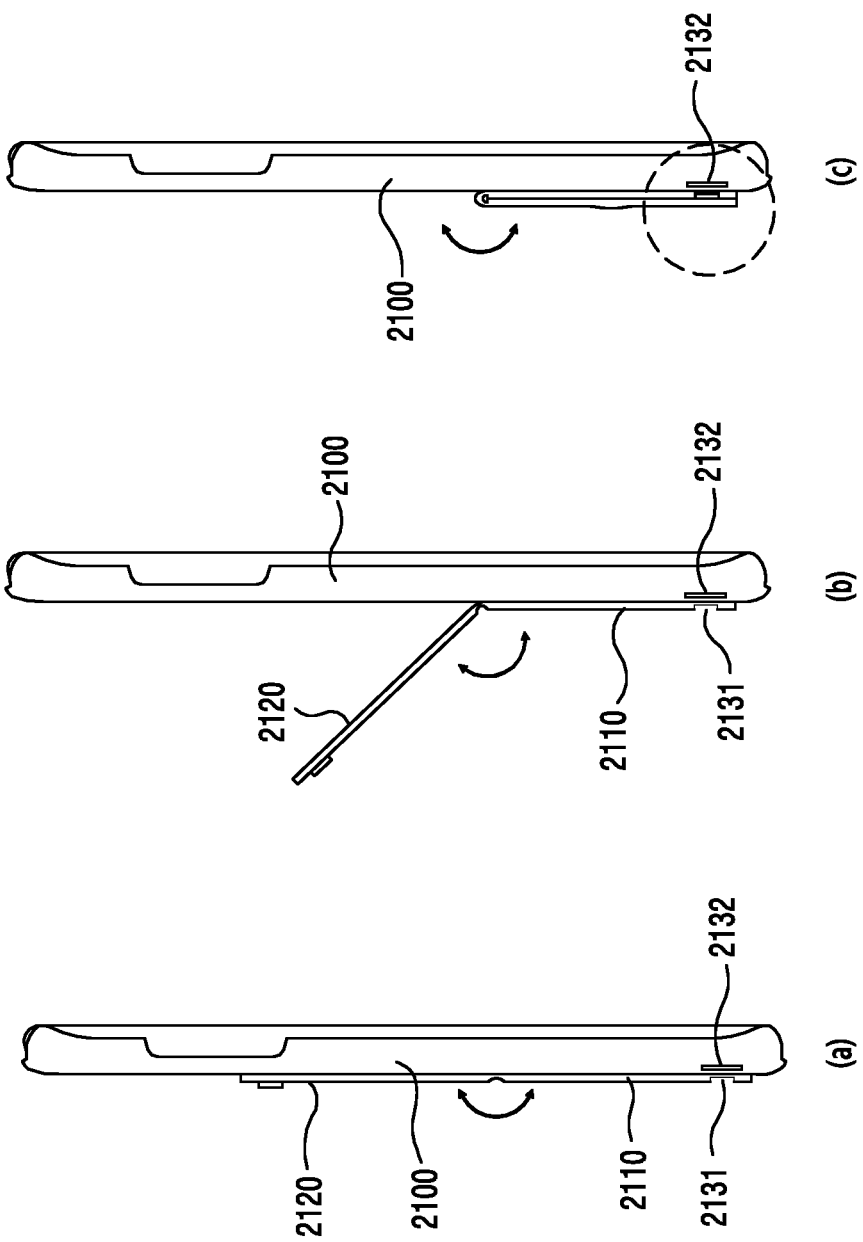
FIG. 21C is a lateral view illustrating an operation of a foldable member provided in a layered accessory case step by step, according to an embodiment.

Referring to FIG. 21A to FIG. 21C, a switching device mounted to a case 2100 may include foldable members 2110 and 2120 and a magnetic switch 2130. The switching device may be in an on state when the foldable members 2110 and 2120 are folded.

The foldable members may include a fixing member 2110, a folding member 2120, and a coupling member 2115. The fixing member 2110 may be fixed to a second side of the case 2100. The folding member 2120 may be coupled to be folded or unfolded at the fixing member 2110 by means of the coupling member 2115. The coupling member 2115 may be constructed of a flexible material to provide a folding axis of the folding member 2120. The folding axis may face a direction parallel to a widthwise direction. The coupling member 2115 may include a flexible circuit board. That is, the fixing member 2110 and the folding member 2120 may be electrically coupled and physically coupled by means of the coupling member 2115.

When the folding member 2120 is folded at the fixing member 2110, a holding device for holding a folding state may be further provided. The holding device may include at least one groove 2111 provided in the fixing member 2110 and at least one protrusion 2121 disposed at the groove member 2120 and coupled to the groove 2111. First and second grooves 2111 may be located at both corner regions of the fixing member 2110, and first and second protrusions 2121 and 2131 may be disposed at both corner regions of the folding member 2120. When the folding member 2120 is folded at the fixing member 2110, the first and second protrusions 2121 and 2131 may be respectively coupled to the first and second grooves 2111 to hold the folding state.

The folding member 2120 may have at least one button portion 2112 disposed at a first side. When the selected button portion 2112 is pressed, a signal can be delivered by means of the coupling member 2115, that is, a flexible circuit board.

The magnetic switch 2130 may include the magnet 2131 disposed on the folding member 2120 and a magnetic sensor 2132 disposed on the electronic device. The magnet 2131 may constitute one protrusion disposed on the folding member 2120 with a magnetic material. That is, at least one magnet 2131 may be disposed on the folding member in a protrusion shape. For example, the magnetic sensor 2132 may be configured in one groove 2111 corresponding to the magnet 2131, or may be disposed to face one groove 2111 at a position adjacent to the groove 2111 at a position corresponding to an inner portion of the case 2100.

As shown in FIG. 21A, when the folding member 2120 is in an unfolding state with respect to the fixing member 2110, the magnetic sensor 2132 may be in an off state, and the button portion 2112 may be in an inoperable state and an off state. The magnet 2131 and the magnetic sensor 2132 may be disposed so as not to overlap with each other.

As shown in FIG. 21B, when the folding member 2120 is in a folding state with respect to the fixing member 2110, the magnet 2131 may face the magnetic sensor 2132 and thus may be in an on state. The button portion 2112 is in an operable state, and the magnet 2131 and the magnetic sensor 2132 may be disposed so as to overlap with each other.

Figure 22A:
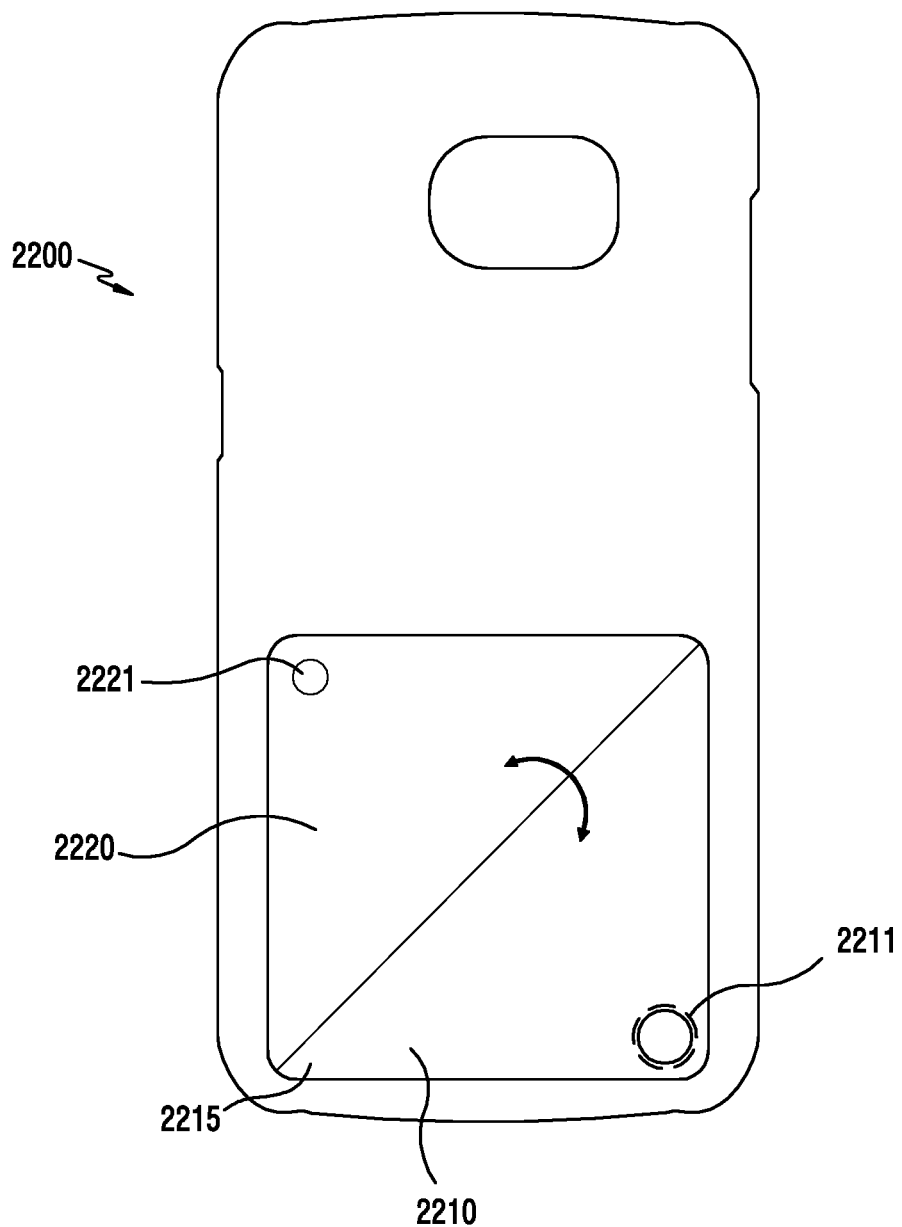
FIG. 22A illustrates a state where a foldable member provided in a layered accessory case is unfolded, according to an embodiment.
Figure 22B:
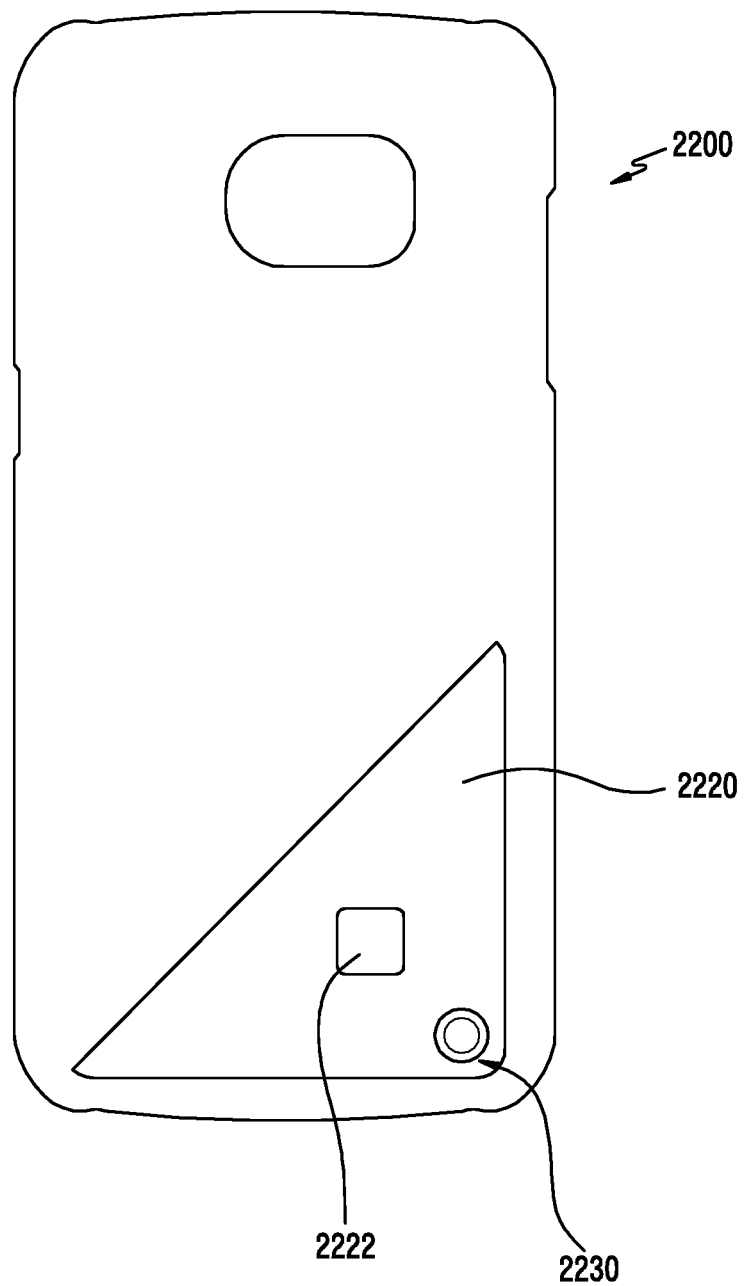
FIG. 22B illustrates a state where a foldable member provided in a layered accessory case is folded, according to an embodiment.

Referring to FIG. 22A and FIG. 22B, a switching device mounted to a case 2200 may include a foldable members and a magnetic switch. The switching device may be in an on state when the foldable members are folded.

The foldable members may include a triangular fixing member 2210, a triangular folding member 2220, and a coupling member 2215. The fixing member 2210 may be fixed to a second side of the case 2200. The triangular folding member 2220 may be coupled to be folded or unfolded at the triangular fixing member 2210 by means of the coupling member 2215. The coupling member 2215 may be constructed of a flexible material to provide a folding axis of the triangular folding member 2220. The folding axis may face a diagonal direction to identify the triangular fixing member 2210 and the triangular folding member 2220 when the triangular fixing member 2210 and the triangular folding member 2220 are in an unfolding state. The coupling member 2215 may include a flexible circuit board. That is, the triangular fixing member 2210 and the triangular folding member 2220 may be electrically coupled and physically connected by means of the coupling member 2215.

When the triangular folding member 2220 is folded at the triangular fixing member 2210, a holding device for holding a folding state may be further provided. The holding device may include at least one groove 2211 provided in the triangular fixing member 2210 and at least one protrusion 2221 disposed on the triangular folding member 2220 and coupled to the groove 2211. For example, when the triangular folding member 2220 is folded at the triangular fixing member 2210, the protrusions 2221 may respectively be coupled to the grooves 2211 to hold the folding state.

The triangular folding member 2220 may have at least one button portion 2222 disposed on a first side. When the selected button portion 2222 is pressed, a signal can be delivered by means of the coupling member 2215, that is, a flexible circuit board.

The magnetic switch may include a magnet 2221 disposed on the triangular folding member 2220 and a magnetic sensor disposed on the electronic device. The magnet 2221 may constitute one protrusion disposed on the triangular folding member 2220 with a magnetic material. That is, at least one magnet 2221 may be disposed on the triangular folding member 2220 in a protrusion shape.

As shown in FIG. 22A, when the triangular folding member 2220 is in an unfolding state with respect to the triangular fixing member 2210, the magnetic sensor may be in an off state, and the button portion may be in an inoperable state and in an off state. The magnet 2221 and the magnetic sensor may be disposed so as not to overlap with each other.

As shown in FIG. 22B, when the triangular folding member 2220 is in a folding state with respect to the triangular fixing member 2210, the magnet 2221 may face the magnetic sensor and thus may be in an on state. The button portion 2222 is in an operable state, and the magnet 2221 and the magnetic sensor 2132 may be disposed so as to overlap with each other.

Figure 23A:
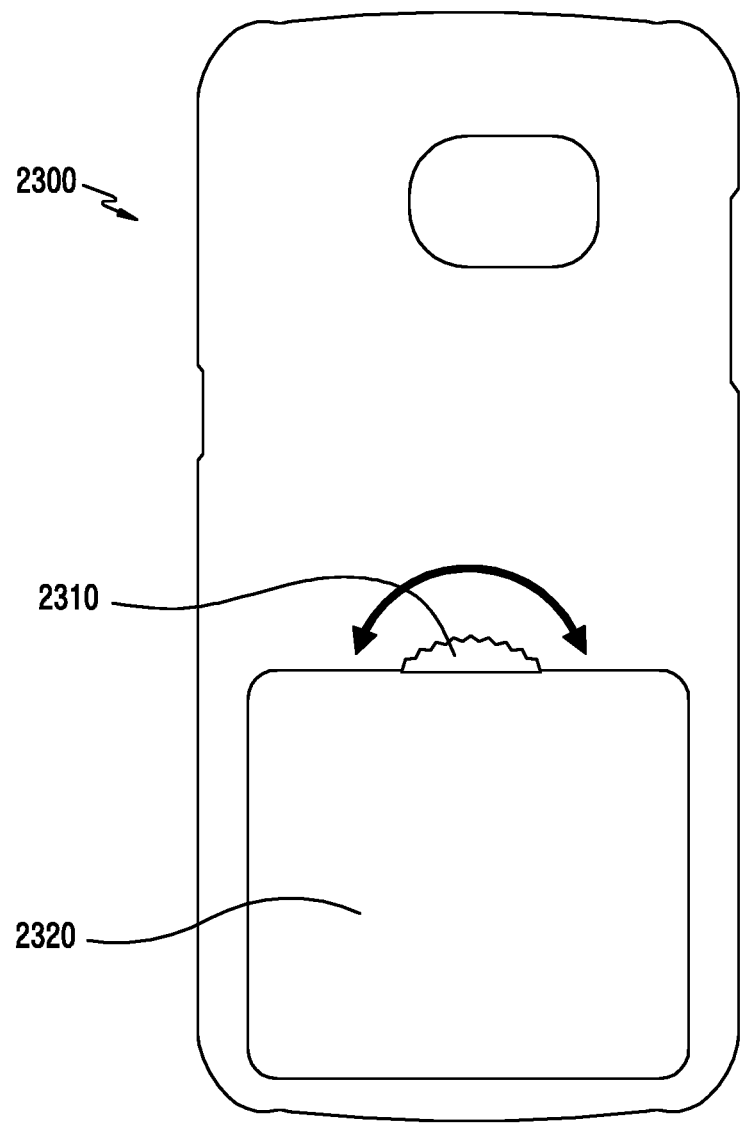
FIG. 23A is a front view illustrating an exterior in a state of mounting a rotation wheel provided in a layered accessory case, according to an embodiment.
Figure 23B:
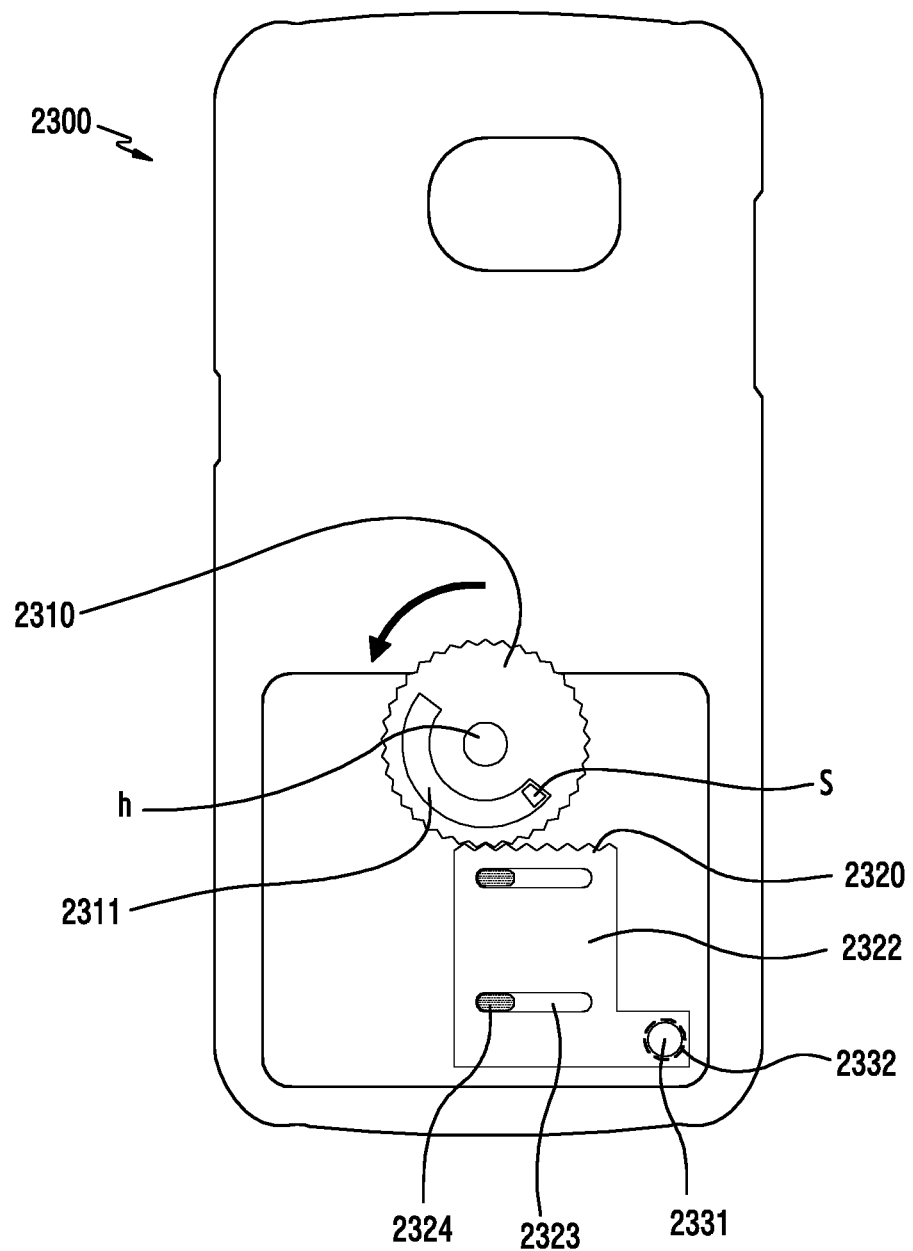
FIG. 23B illustrates a state after a rotation wheel provided in a layered accessory case rotates, according to an embodiment.
Figure 23C:
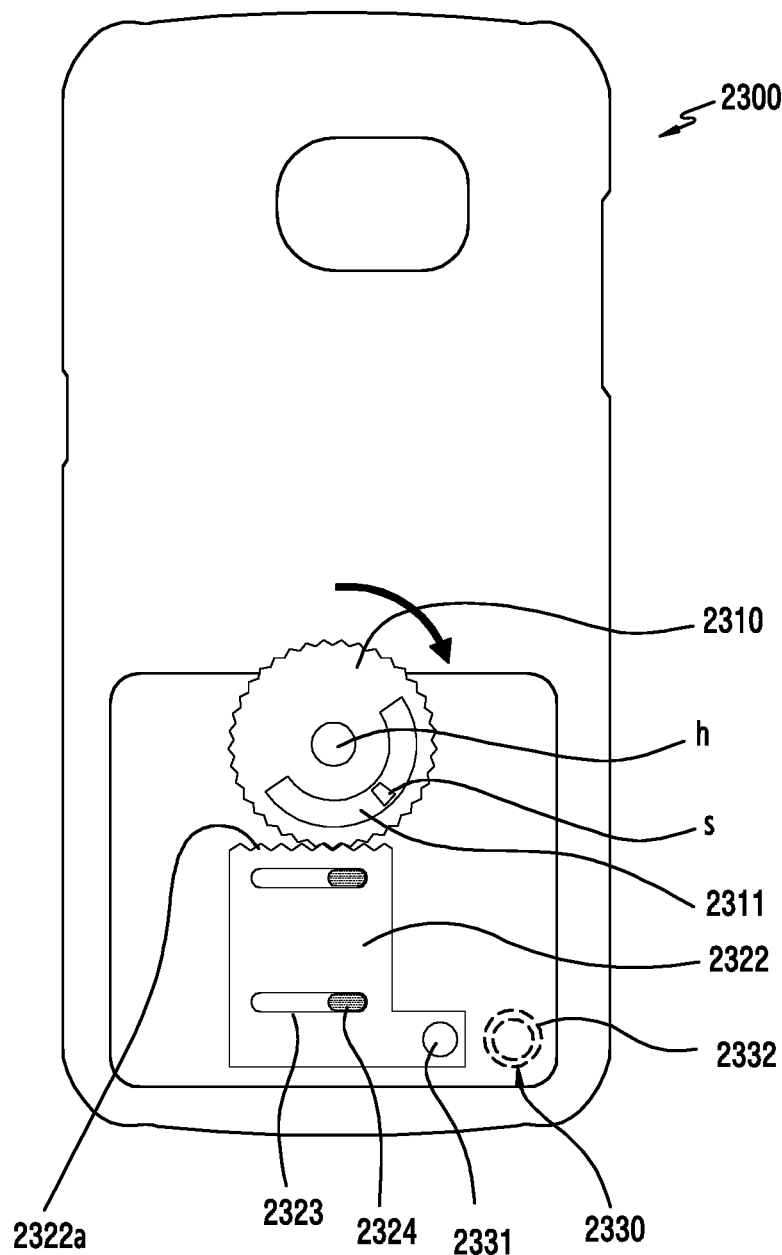
FIG. 23C illustrates a state before a rotation wheel provided in a layered accessory case rotates, according to an embodiment.

Referring to FIG. 23A to FIG. 23C, a switching device mounted to a case 2300 may include a rotation wheel 2310, a gear shifting member 2322, a contact switch S, and a magnetic switch 2330.

The case 2300 may have a switching device operably mounted to a second side. At least a portion of the rotation wheel 2310 may be exposed, and the remaining constitutional elements may be disposed inside the switch box 2320. The exposed portion of the rotation wheel 2310 may be an operable portion. When the rotation wheel 2310 rotates, the contact switch S and the magnetic switch 2330 may be in an on state.

The rotation wheel 2310 may be disposed such that only a portion thereof is exposed in the switch box 2320 and the rest is hidden. The rotation wheel 2310 may facilitate a rotation operation by using a circumference as a gear protrusion, and may be disposed in a rotatable manner to face the second side of the case 2300 in parallel. The gear shifting member 2322 may be disposed so as to move linearly according to the rotation operation of the rotation wheel 2310.

The rotation wheel 2310 may have an opening 2311 with a curvature, and the contact switch S may be disposed inside the opening 2311. That is, the rotation wheel 2310 and the contact switch S are disposed not to overlap, and the contact switch S may be disposed inside the rotation wheel 2310. The contact switch S may be turned on or off depending on whether the rotation wheel 2310 rotates. The opening 2311 may be located between the gear protrusion and the rotation axis h of the rotation wheel 2310. When one end in one side of the opening 2311 is in contact with the contact switch S, the contact switch S may be turned on.

The gear shifting member 2322 may be a shifting member which moves linearly in response to the rotation movement of the rotation wheel 2310. The gear shifting member 2322 is provided with at least one guide opening 2323, and thus a movement distance may be limited. The guide protrusion 2324 to be inserted in the guide opening 2323 may be provided in the case. Therefore, the gear shifting member 2322 may be limited in moving due to a coupling structure between the guide opening 2323 and the guide protrusion 2324. The gear shifting member 2322 may have a gear portion 2322a in one side and a magnet 2331 in the other side. The gear portion 2322a may be disposed in engagement with a gear protrusion to perform a function of converting the rotation movement of the rotation wheel 2310 to the linear movement of the gear shifting member 2322. The gear portion 2322a may be arranged linearly at an upper end of the gear shifting member 2322.

The magnetic switch 2330 may include the magnet 2331 disposed on the gear shifting member 2322 and a magnetic sensor 2332 disposed on the case 2300. In a top view, when the magnet 2331 and the magnetic sensor 2332 are disposed not to overlap with each other, the magnetic sensor is in an off state, and when the magnet 2331 and the magnetic sensor 2332 are disposed so as to overlap with each other, the magnetic sensor is in an on state, thereby being able to deliver a signal.

When the rotation wheel 2310 of FIG. 23B rotates with a specific angle, one end of the opening 2311 may be in an on state by being in contact with the contact switch S, and the magnet 2331 may be disposed to face the magnetic sensor 2332 in an overlapping manner, and thus the magnetic sensor 2332 may be in an on state. The contact switch S and the magnetic sensor 2332 may be substantially simultaneously turned on or off.

Figure 24A:
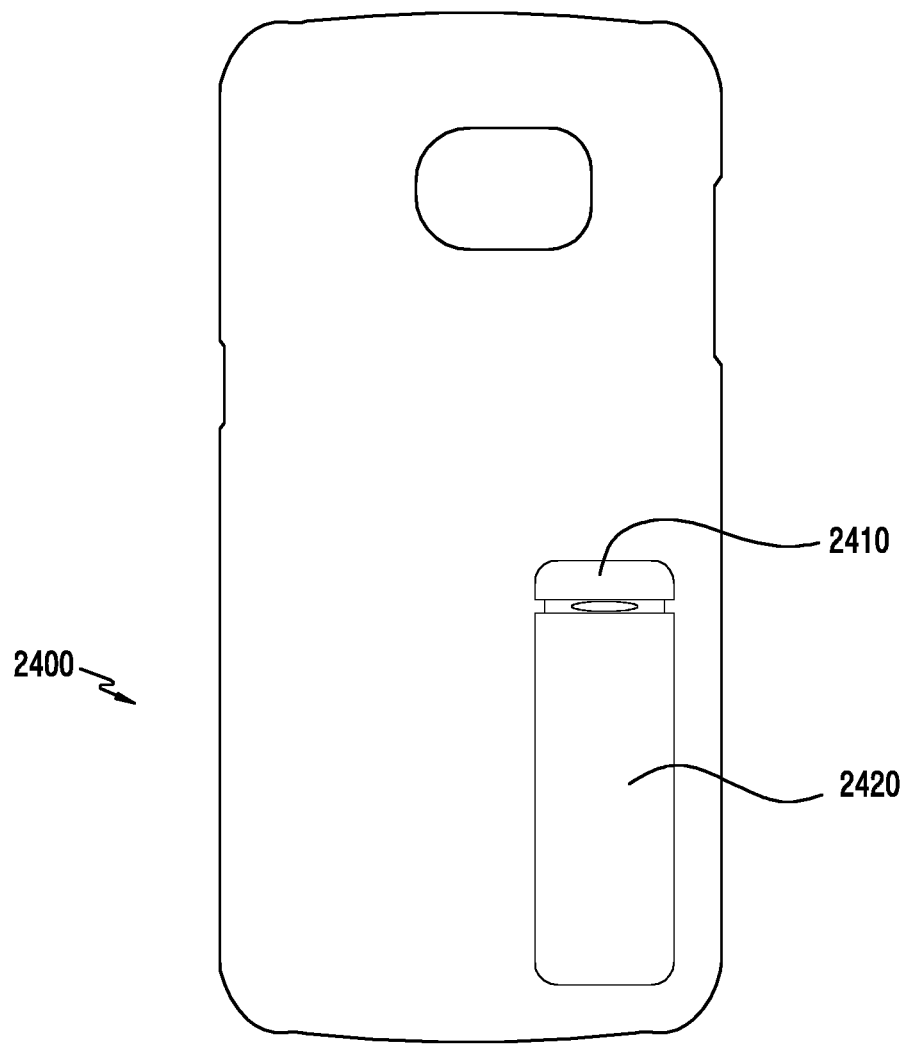
FIG. 24A illustrates a state before a button provided in a layered accessory case is clicked, according to an embodiment.
Figure 24B:
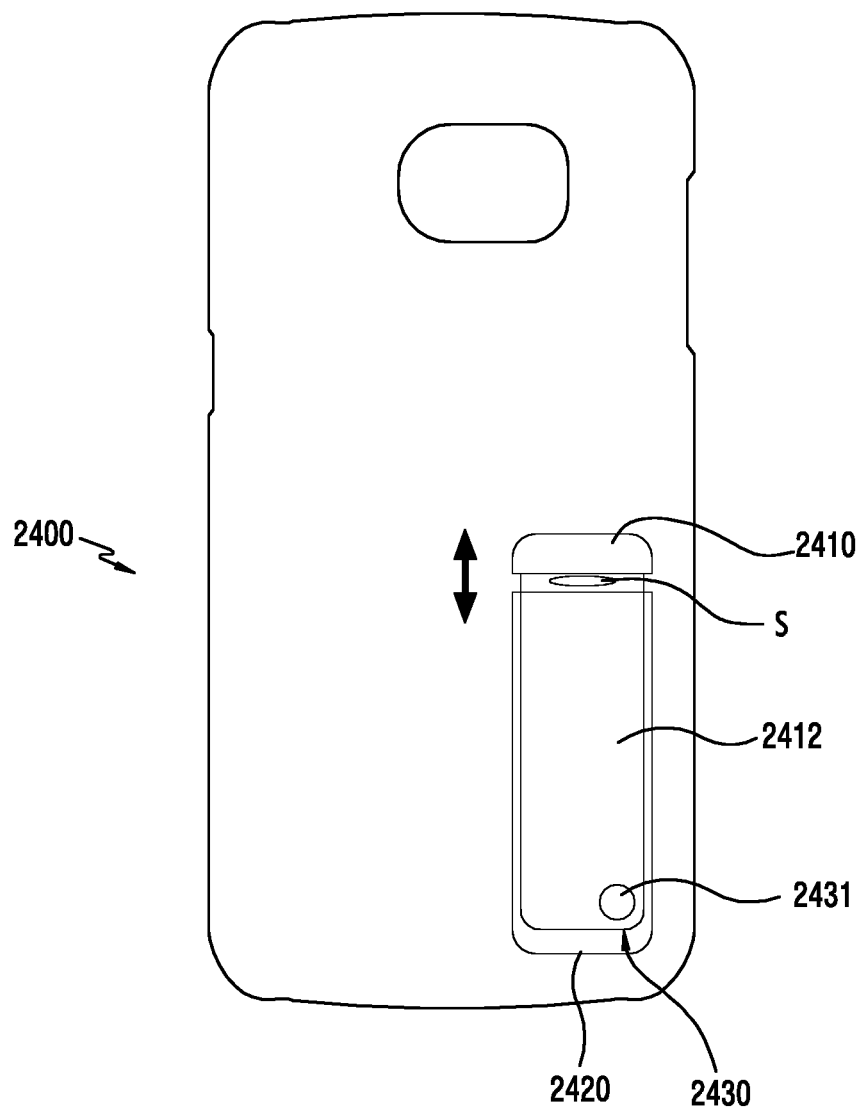
FIG. 24B illustrates a state after a button provided in a layered accessory case is clicked, according to an embodiment.
Figure 24C:
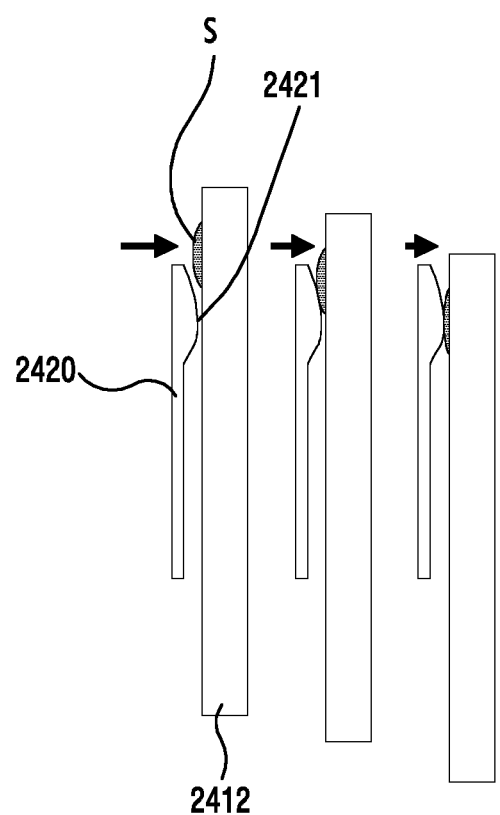
FIG. 24C is a lateral view illustrating an operation of a button provided in a layered accessory case step by step, according to an embodiment.

Referring to FIG. 24A to FIG. 24C, a switching device mounted to a case 2400 may be configured by using a switchgear principle of a ballpoint pen. That is, when the button 2410 is pressed, the provided contact switch S and magnetic switch 2430 may be turned on, and when pressed again, the contact switch S and magnetic switch 2430 in the on state may be turned off.

The switching device may include a button 2410, a switch box 2420, a contact switch S, and a magnetic switch 2430. A mechanism by which the button 2410 is in a state where the button 2410 is pulled into or pulled out from the switch box 2420 in response to whether it is pressed (clicked) uses the switchgear principle of the ballpoint pen, and descriptions thereof will be omitted by considering that it is well-known in the art.

The button 2410 is a portion to be clicked or pressed, and may have a button body 2412 accommodated inside the switch box 2420. The button body 2412 may be disposed in such a manner that an upper portion is extracted in a state of being accommodated inside the switch box 2420 or is hidden in a state of being completely inserted. The contact switch S may be disposed on the upper portion of the button body 2412, and the magnet 2431 may be disposed on a lower portion.

The contact switch S may be disposed on the upper portion of the button body 2412, and thus may be turned on or off in response to whether it is in contact with the contact protrusion 2421 disposed on the switch box 2420.

The magnetic switch may consist of a magnet 2431 disposed on a lower portion of the button body and a magnetic sensor disposed on the case 2400. When the magnet 2431 is disposed not to overlap with the magnetic sensor, the magnetic sensor may be turned off. When the magnet 2431 is disposed to face the magnetic sensor in an overlapping manner, the magnetic sensor may be turned on.

When the button 2410 is inserted into the switch box 2420, the contact protrusion 2421 and the contact switch S may be in contact (or pressed) with each other. Thus, the contact switch S may be turned on to deliver a signal, and the magnetic sensor may be turned on to deliver a signal. When the button 2410 is clicked once again, the button body 2412 may be in a state of being extracted from the switch box 2420. The contact switch may be turned off, and the magnetic sensor may also be turned off.

Figure 25A:
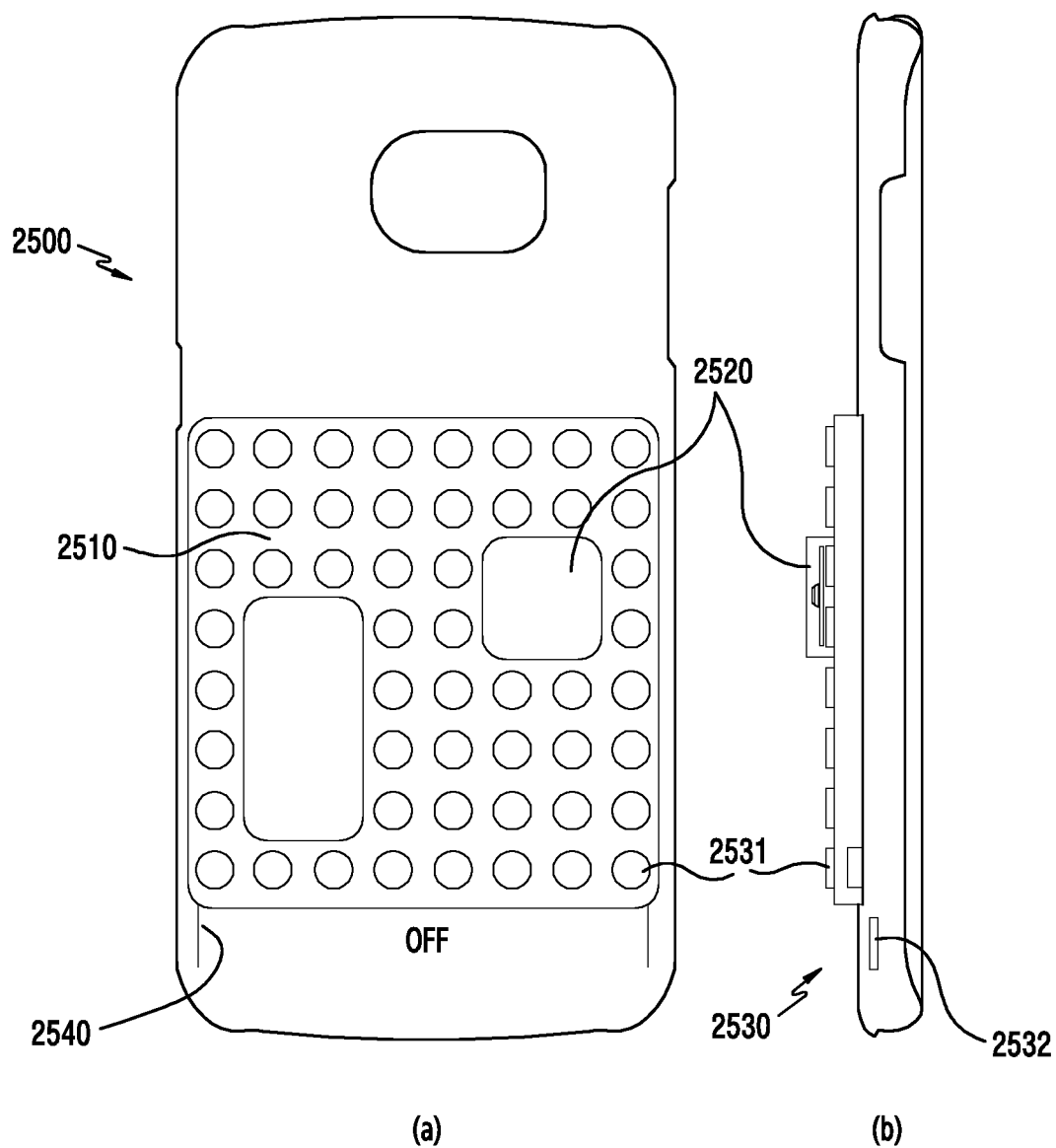
FIG. 25A illustrates a front side (a) and a lateral cross-sectional view (b) of a state before a sliding key of a layered accessory case moves, according to an embodiment.
Figure 25B:
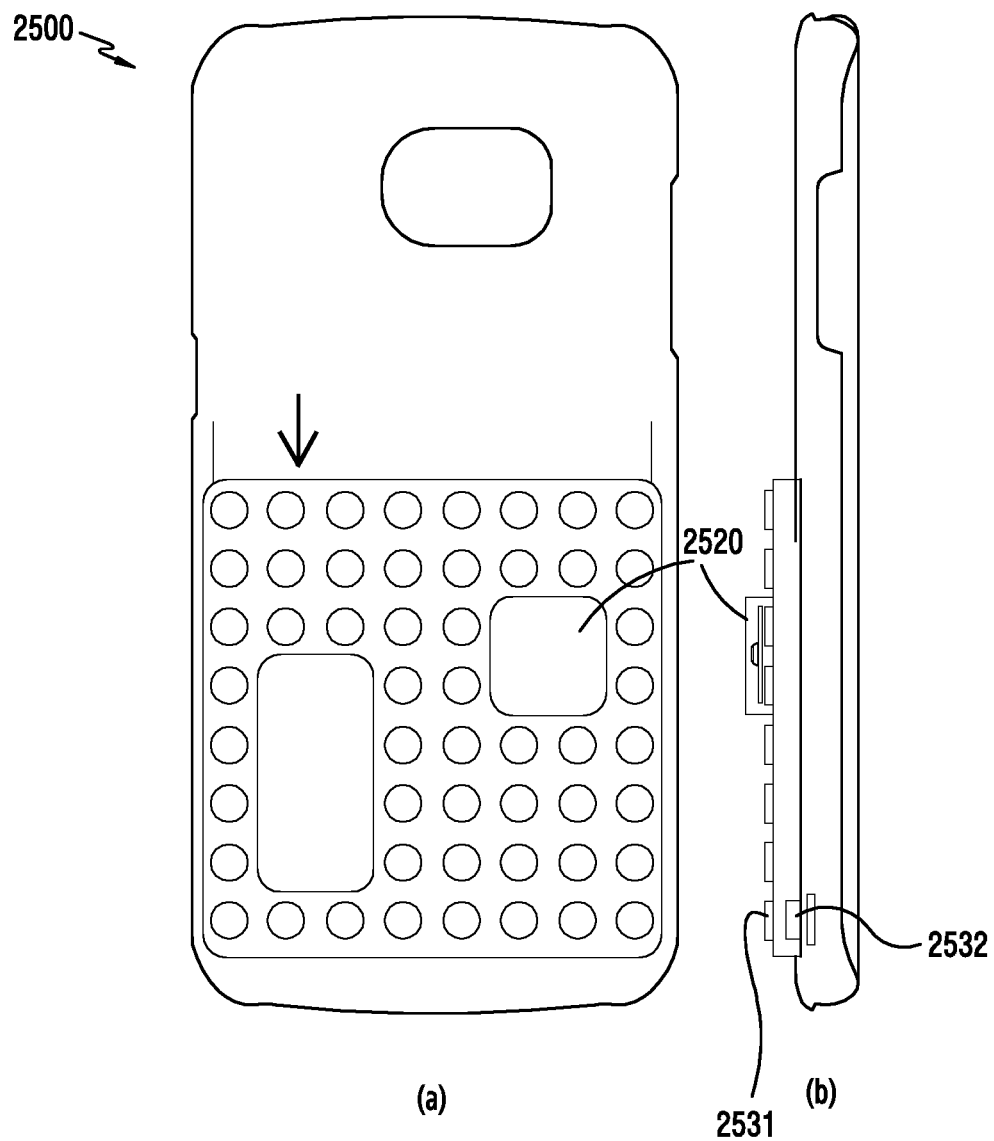
FIG. 25B illustrates a front side (a) and a lateral cross-sectional view (b) of a state after a sliding key of a layered accessory case moves, according to an embodiment.
Figure 26A:
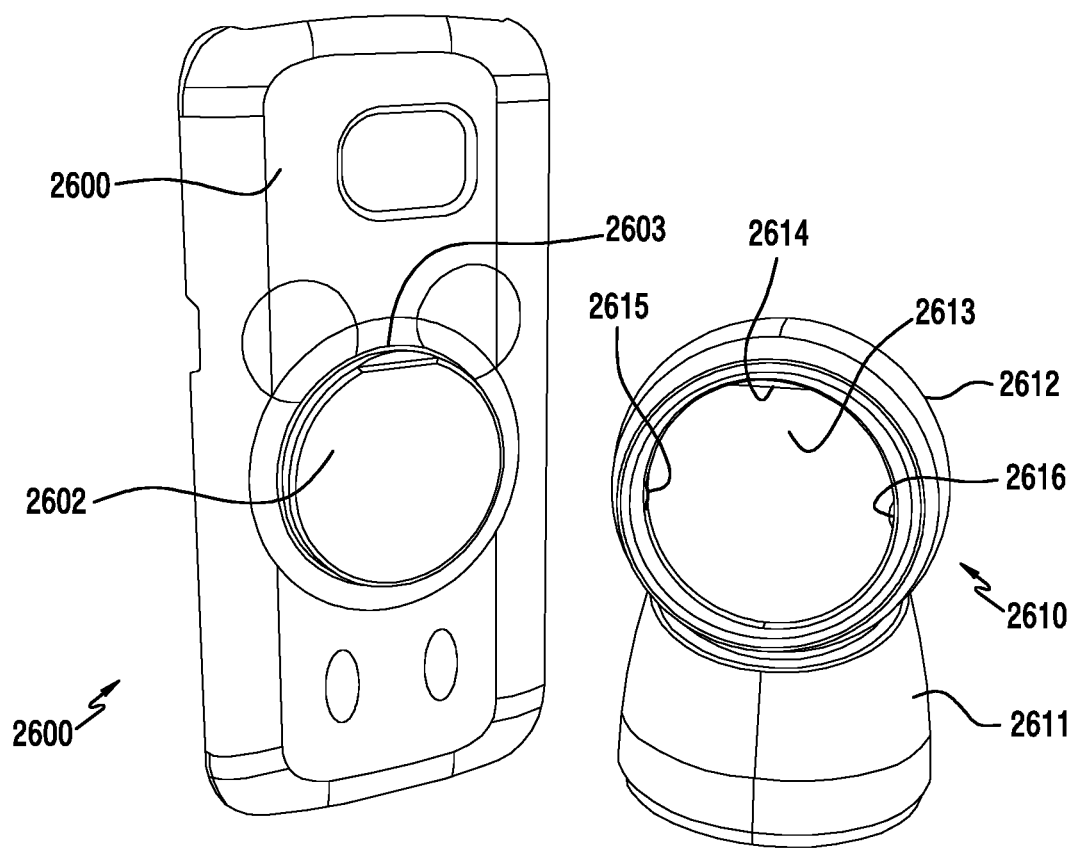
FIG. 26A and FIG. 26B are perspective views illustrating a state before a case is mounted to a cradle, according to an embodiment.
Figure 26B:
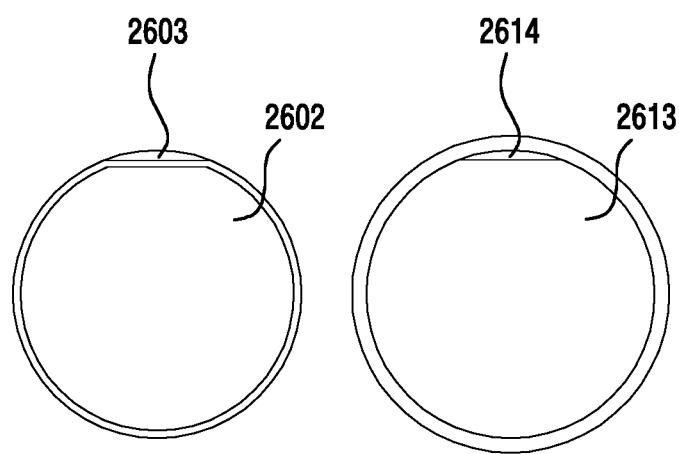
Figure 26C:
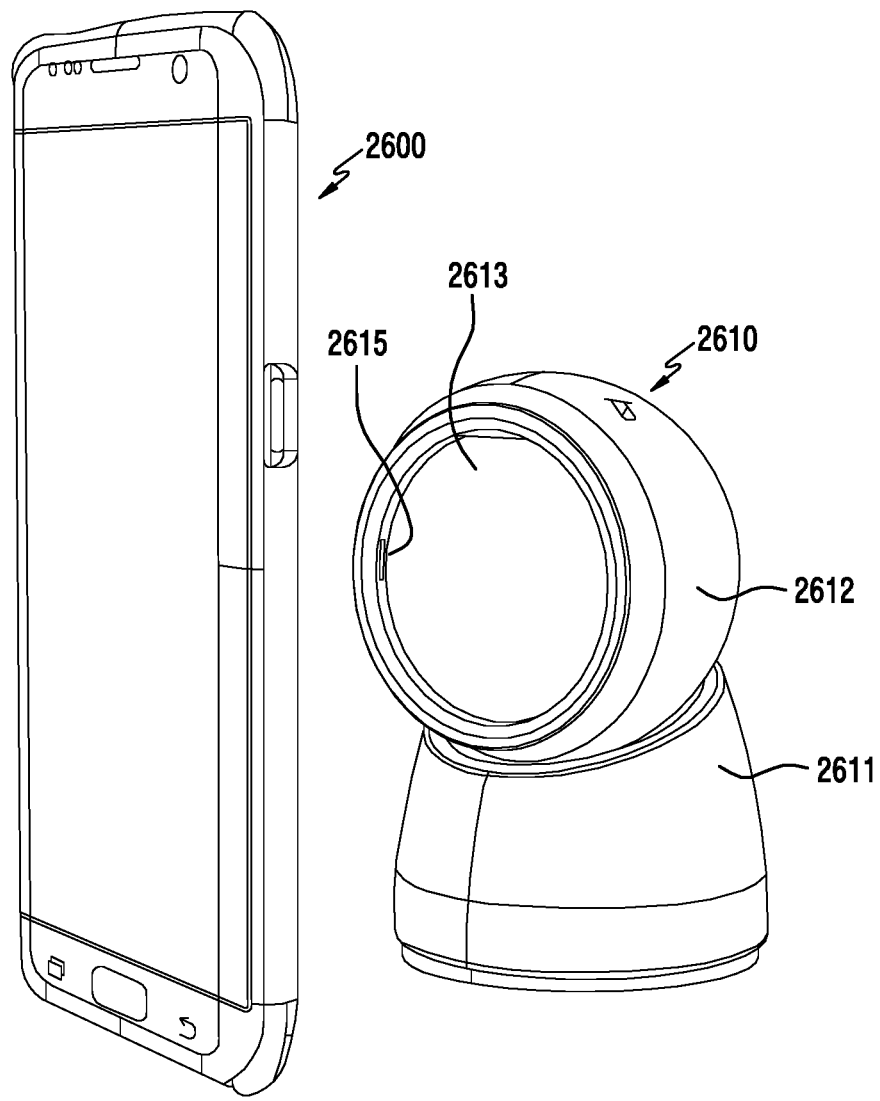
FIG. 26C illustrates a mounting projection and a flat portion, viewed from a front side, according to an embodiment.
Figure 26D:
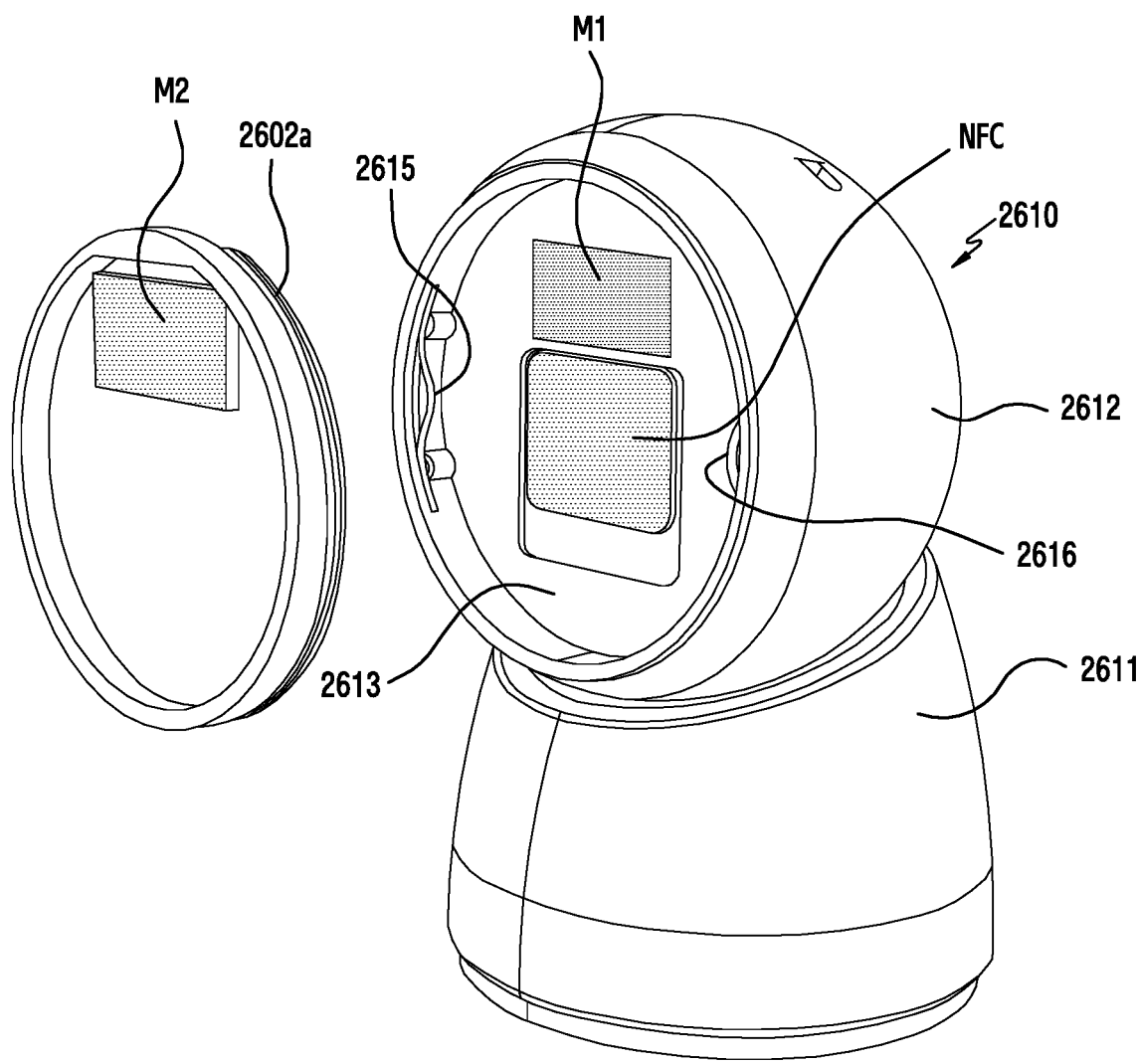
FIG. 26D is a perspective view illustrating a state before a mounting projection is coupled to a flat portion of a mounting body, according to an embodiment.

Referring to FIG. 25A and FIG. 25B, a switching device disposed on a case 2500 may include a sliding key 2510, a contact switch S, and a magnetic switch 2530.

The sliding key 2510 may be mounted slidably in a horizontal direction while maintaining a state of facing a second side of the case 2500. The magnetic switch 2530 may be turned on/off in response to whether the sliding key 2510 is slid. An outer surface of the sliding key 2510 may be configured to have the same structure as a block toy for kids, such as a block structure such as LEGO™ (e.g., a concave-convex shape). The sliding key 2510 may move linearly in the case 2500 by means of a guide rail 2540. A module-type functional component 2520 having at least one block structure may be used by being mounted to the outer surface of the sliding key 2510.

According to the block structure of the sliding key 2510, the contact switch 2520 may be configured with a block structure and be coupled individually to the sliding key 2510. When the coupled contact switch 2520 is pressed, the button of the contact switch 2520 is pressed, and thus the contact switch 2520 may be turned on. The contact switch 2520 may be configured in one module type, and thus may be coupled to or separated from a proper position of the sliding key 2510. The button may be coupled to the contact switch 2520, and the contact switch 2520 may be coupled to a short-range communication module to use a service provided by the short-range communication module.

The magnetic switch 2530 may consist of a magnet 2531 disposed on an edge of the sliding key 2510 and a magnetic sensor 2532 disposed on the case 2500. When the magnet 2531 is disposed not to overlap with the magnetic sensor 2532, the magnetic sensor 2532 may be turned off, and when the magnet 2531 is disposed so as to overlap with the magnetic sensor 2532, the magnetic sensor 2532 may be turned on. The magnetic sensor 2532 may be turned off before the sliding key 2510 moves, and the magnetic sensor 2532 may be turned on after the sliding key 2510 moves.

Hereinafter, a cradle to which a case is mounted and a coupling structure thereof will be described according to an embodiment. The cradle is a cradle that may be provided in a vehicle. The case may be coupled to the cradle according to a separate coupling structure, and the case may rotate and operate in the coupled state.

Referring to FIG. 26A to FIG. 26D, a cradle 2610 may be disposed as a cradle for a vehicle in a state of being placed upright on the vehicle. The cradle 2610 may include a first mounting body 2611 and a second mounting body 2612 which rotates or slides variously in the first mounting body 2611. The first mounting body 2611 may play a role of a support of the cradle, and the second mounting body 2612 may include a mounting portion (e.g., a flat portion 2613) coupled to a case 2600.

The second mounting body 2612 has a substantially spherical shape, but may include the flat portion 2613 coupled with the case 2600. The flat portion 2613 is a recessed portion to which the case 2600 is mounted and coupled, and at least one coupling structure may be located. The flat portion 2613 may include, for example, a circular mounting surface, and may have a projection 2614 to be correctly coupled with the case at an upper portion of the mounting surface. At least one or more coupling protrusions 2615 and 2616 may protrude on an outer circumferential surface. The coupling protrusions 2615 and 2616 may include a stopper ring. The stopper ring may having elasticity to provide a force for supporting the mounted case 2600.

The case 2600 may include a mounting projection 2602 disposed on a rear side of the case 2600 and mounted, coupled, and rotated with respect to the flat portion 2613 of the second mounting body 2612. The mounting projection 2602 may be coupled to the flat portion 2613 and may be a portion for mounting the case 2600 to the second mounting body 2612. The mounting projection 2602 may have an opening 2603 for coupling with the second mounting body 2612 at a correct position, and a coupling groove 2602*a* (shown in FIG. 26D) may be disposed on an outer circumferential surface. The coupling groove 2602*a* and the coupling protrusions 2615 and 2616 may be inserted to constitute a first coupling structure. The first coupling structure may allow the case 2600 to be rotatable. The case 2600 may be mounted to the second mounting body 2612 with various angles according to a mode.

The coupling structure may consist of a first coupling structure configured in a physical groove or protrusion shape and a second coupling structure utilizing magnetic properties.

The first coupling structure may include the mounting projection 2602 of the case 2600, the coupling groove 2602*a* disposed on an outer circumferential surface of the mounting projection 2602, the flat portion 2613 provided in the second mounting body 2012, and at least one or more coupling protrusions 2615 and 2616 disposed around the flat portion 2613 and coupled to the coupling groove 2602*a*.

The second coupling structure may be constructed of a metal material portion M2 provided in the mounting projection 2602 of the case 2600 and a magnet M1 provided in the flat portion 2613 of the second mounting body. The metal material portion M2 may be disposed on a mounting projection in a plate shape, and the magnet M1 may be disposed on the flat portion 2613 in the plate shape. A coupling force may be applied on the metal material M2 and the magnet M1 to mount the case 2600 to the second mounting body 2612, and a force for maintaining a mounting state of the case 2600 may be provided. The mounting projection 2602 may be replaced with a magnet instead of the metal material portion M2, and the magnet M1 and the metal material portion M2 may be disposed at different positions facing each other. That is, the magnet M1 may be disposed on the mounting projection 2602, and the metal material M2 or another magnet may be disposed on the flat portion 2613 of the second mounting body.

The flat portion 2613 of the second mounting body may have a short-range communication module (e.g., an NFC module) to communicate with a mounted electronic device.

Figure 27A:
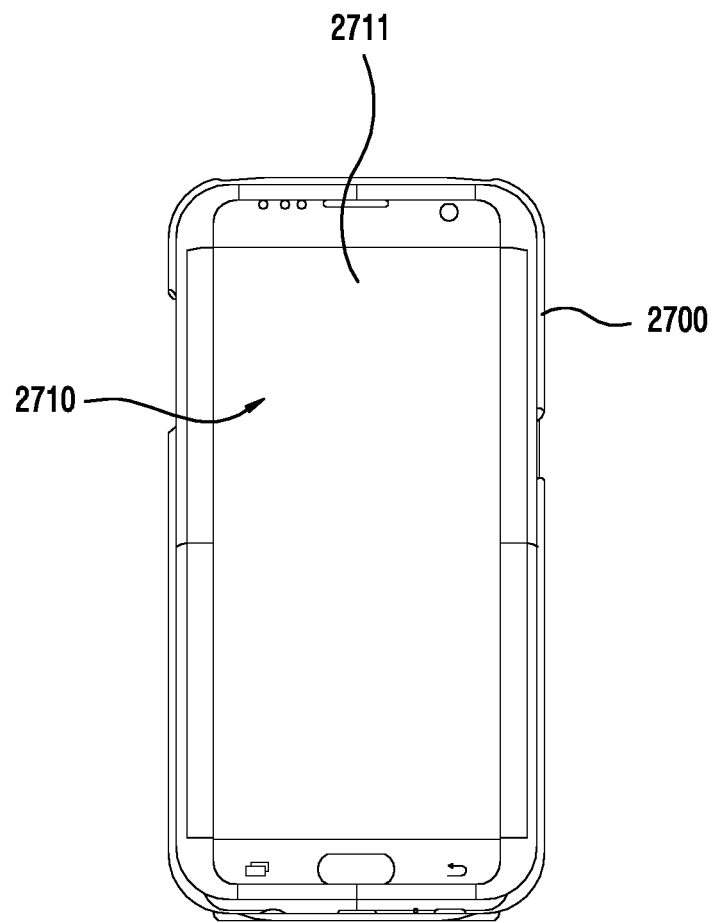
FIG. 27A is a front view illustrating a state where a case coupled to an electronic device is mounted to a mounting body in a lengthwise direction, according to an embodiment.
Figure 27B:
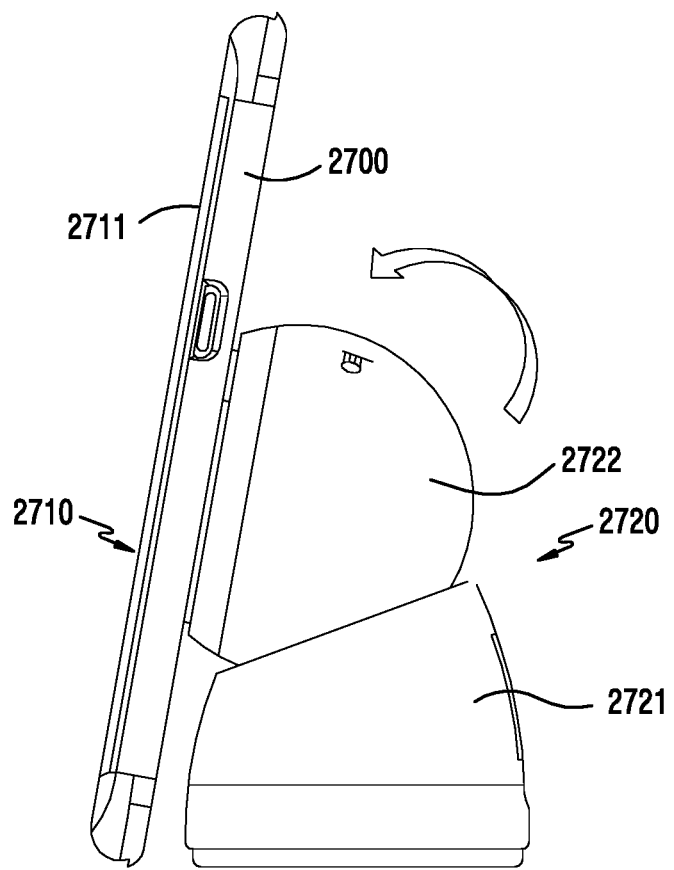
FIG. 27B is a lateral view illustrating a state where a case coupled to an electronic device is mounted to a mounting body in a lengthwise direction, according to an embodiment.

Referring to FIG. 27A and FIG. 27B, an electronic device 2710 coupled to a case 2700 may be mounted in a first mode in which a display 2711 is located longitudinally on a cradle 2720 in a lengthwise direction. In addition, the display 2711 of the electronic device 2710 may be mounted in a slightly inclined manner for easy viewing, when the second mounting body 2722 moves. This may be implemented in such a manner that the second mounting body 2722 moves in a surface contact sliding manner.

Figure 27C:
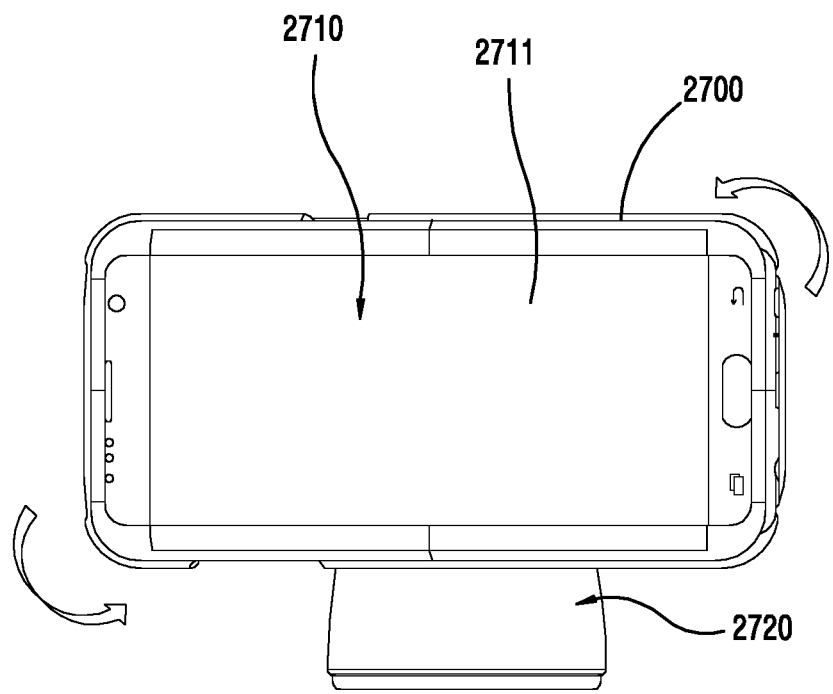
FIG. 27C is a front view illustrating a state where a case coupled to an electronic device is mounted to a mounting body in a widthwise direction, according to an embodiment.
Figure 27D:
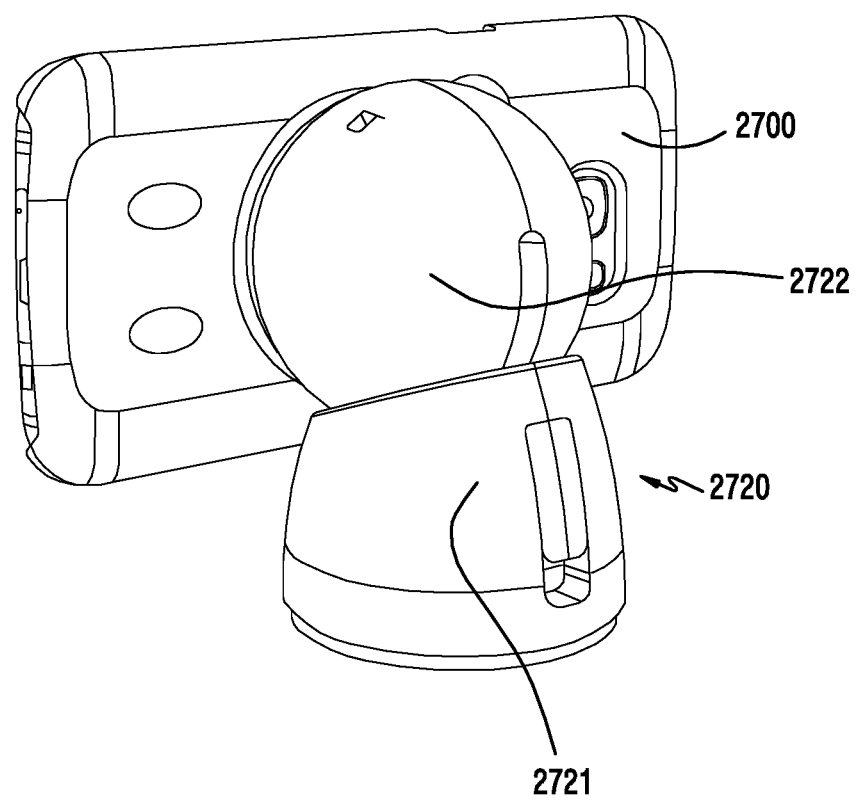
FIG. 27D is a lateral view illustrating a state where a case coupled to an electronic device is mounted to a mounting body in a widthwise direction, according to an embodiment.

Referring to FIG. 27C and FIG. 27D, an electronic device 2710 coupled to a case 2700 may be mounted in a second mode in which a display 2711 is located longitudinally on a cradle 2720 in a widthwise direction. In addition, the display 2711 of the electronic device 2710 may be mounted in a slightly inclined manner for easy viewing, when the second mounting body 2722 moves. This may be implemented in such a manner that the second mounting body 2722 moves in a surface contact sliding manner.

Figure 28A:
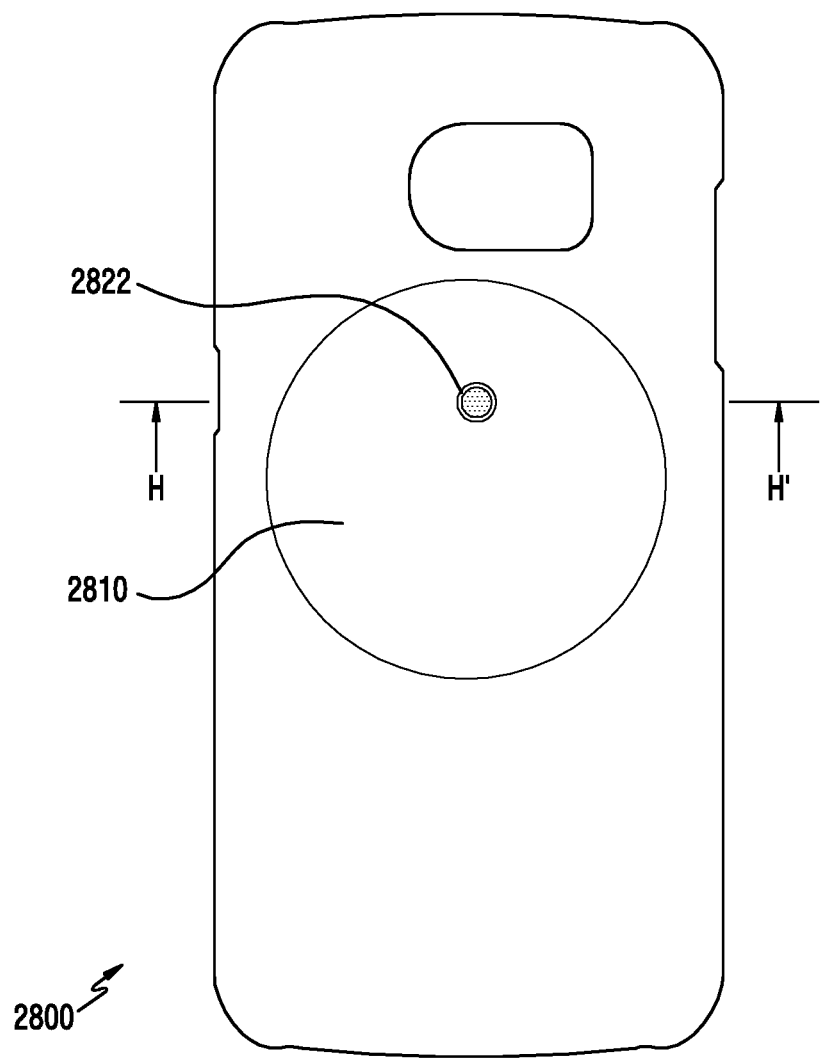
FIG. 28A is a front view illustrating a layered accessory case, according to an embodiment.
Figure 28B:
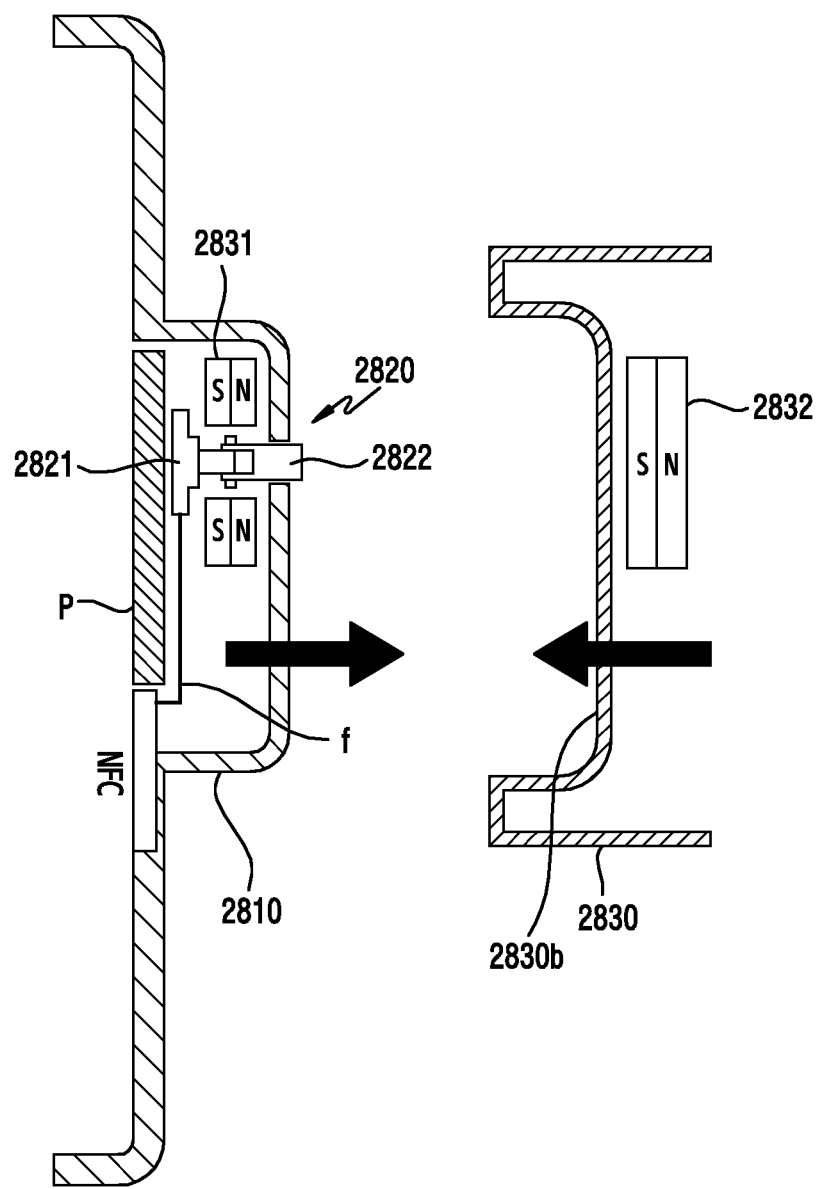
FIG. 28B is a cross-sectional view illustrating a state before a layered accessory case is coupled to a mounting body, and the cross-sectional view illustrating a mounting projection, taken along the line H-H' of FIG. 28A in a state before being coupled to the mounting body, according to an embodiment.
Figure 28C:
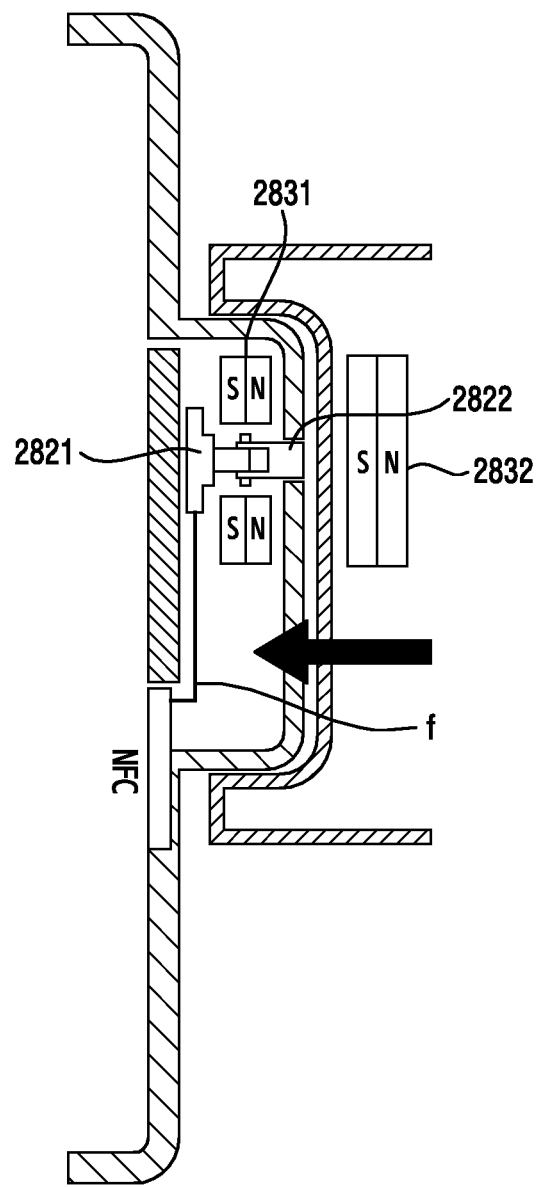
FIG. 28C is a cross-sectional view illustrating a state after a layered accessory case is coupled to a mounting body, and the cross-sectional view illustrating a mounting projection, taken along the line H-H' of FIG. 28A in a state after being coupled to the mounting body, according to an embodiment.

Referring to FIG. 28A to FIG. 28C, an embodiment will be described in which a dedicated service output is possible by generating a signal automatically on the basis of a switching structure between a case 2800 and a mounting body 2830 of a cradle.

The case 2800 may be provided with a mounting projection 2810 on a rear side. The mounting projection 2810 may be coupled to the mounting body 2830 of the cradle, and thus the case 2800 may be mounted to the cradle 2830. A contact switch and a magnetic switch may be disposed between the mounting projection 2810 and the mounting body.

The contact switch 2820 may consist of a button 2822 at least partially exposed to the outside from an outer surface of the mounting projection 2810 and a switch 2821 hidden in the mounting projection 2810 and operating when the button 2822 is pressed. The switch 2821 may be coupled to a short-range communication module (e.g., an NFC module) by means of a flexible circuit f, and may be provided with a service using the short-range communication module when the button 2822 is pressed.

A magnetic coupling structure may include a first magnet 2831 having a first polarity disposed on the mounting projection 2810 and a second magnet 2832 having a second polarity disposed on the mounting body 2830 to which the mounting projection 2810 is coupled.

When the case 2800 is mounted by the magnetic force between the first and second magnets 2831 and 2832, that is, an attractive force generated due to different polarities, the button 2822 may be pressed by a recessed flat portion 2830b of the mounting body 2803 and the switch 2821 may be turned on. Simultaneously, the mounting projection may maintain a state of being coupled to the mounting body due to the attractive force between the first and second magnets 2831 and 2832. When the case 2800 is mounted to the mounting body 2830, the switch 2821 may be simultaneously turned on, and a user may be provided with a service using a short-range communication module (e.g., an NFC module). The provided service may be output to a display of the electronic device. Reference numeral P may be a printed circuit board.

The first magnet 2831 may be disposed to face an inner surface of the mounting projection 2810, and the first magnet 2831 may be further disposed in proximity to the switch 2821, for example, to cover at least a portion of the switch 2821 and the button 2822. The first magnet 2831 may consist of a ring-shaped magnet, and may be disposed in parallel with the mounting projection 2810.

The second magnet 2832 may be disposed in an inner portion in parallel in a state of facing the flat portion 2830b of the mounting body 2830. The second magnet 2832 may be a fragment-shaped magnet. The switch 2821, the button 2822, the first magnet 2831, and the second magnet 2832 may be disposed in a layered structure when the case 2800 is mounted to the mounting body 2830.

Figure 29A:
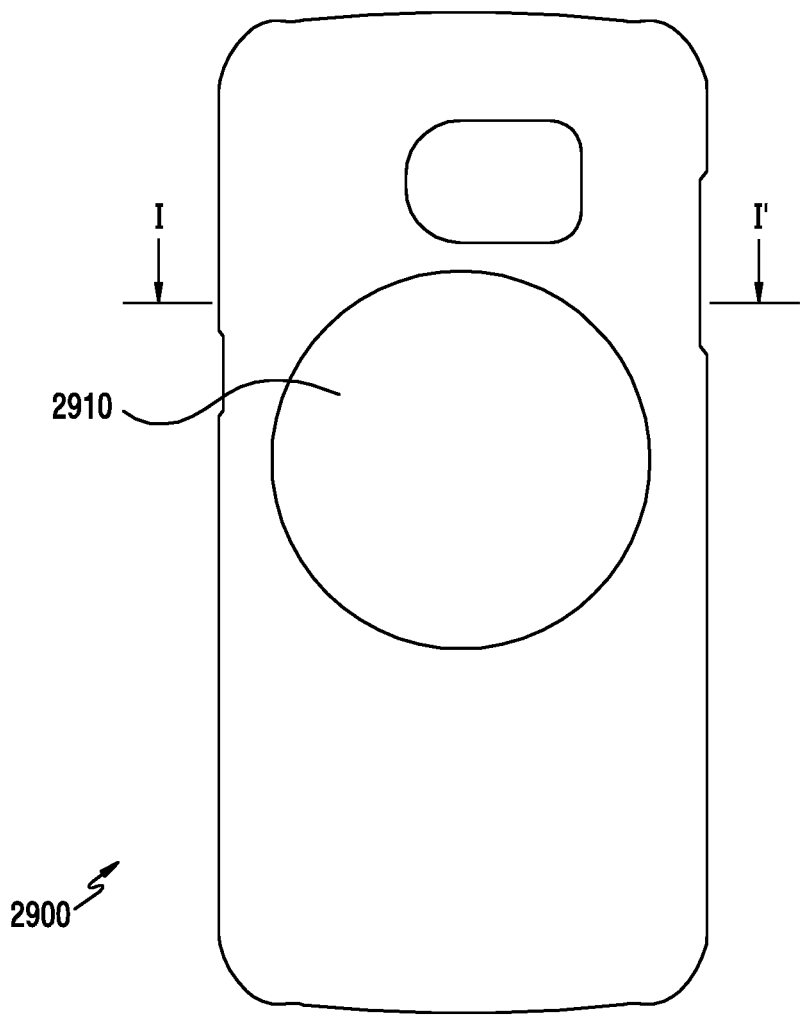
FIG. 29A is a front view illustrating a layered accessory case, according to an embodiment.
Figure 29B:
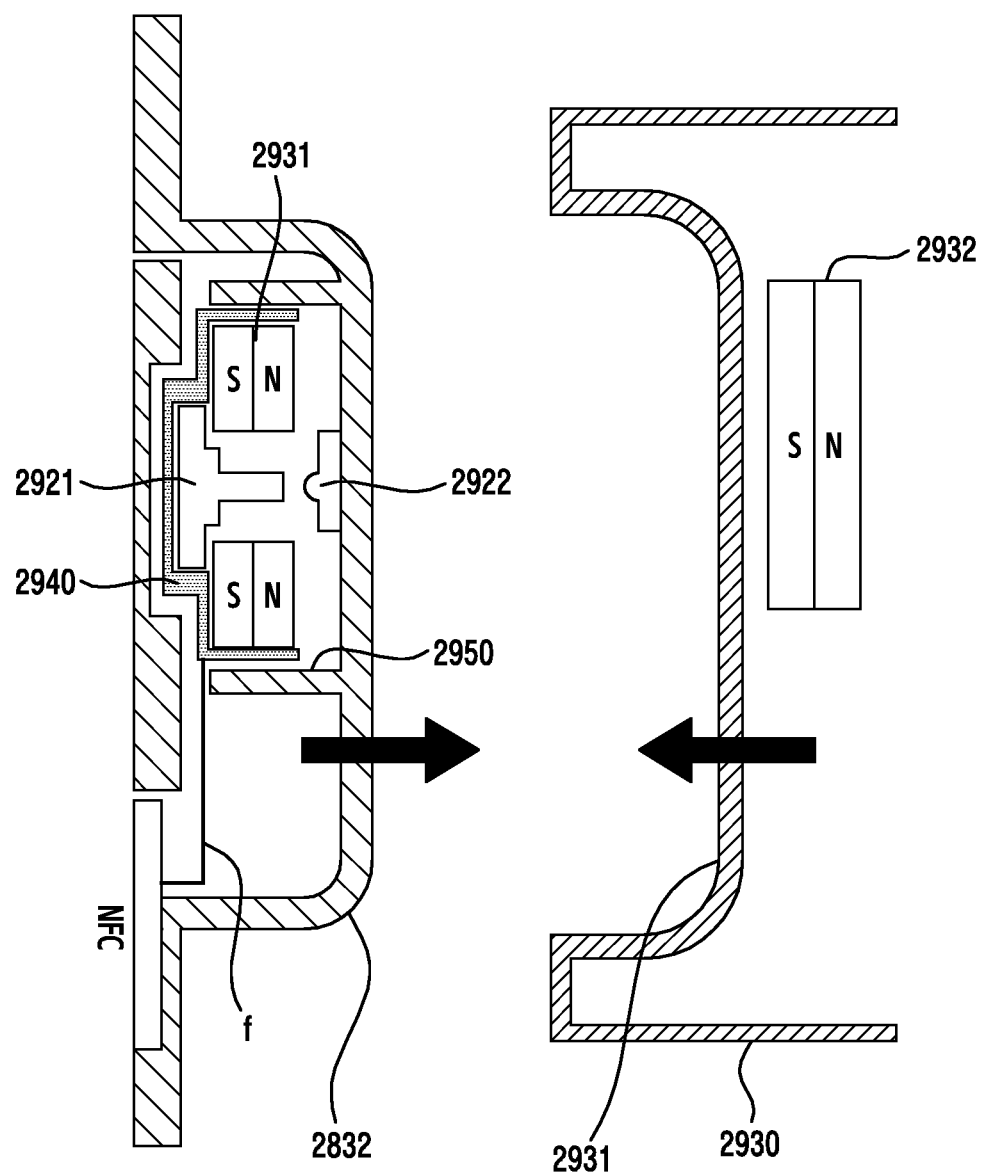
FIG. 29B is a cross-sectional view illustrating a state before a layered accessory case is coupled to a mounting body, and the cross-sectional view illustrating a mounting projection, taken along the line I-I' of FIG. 29A in a state before being coupled to the mounting body, according to an embodiment.
Figure 29C:
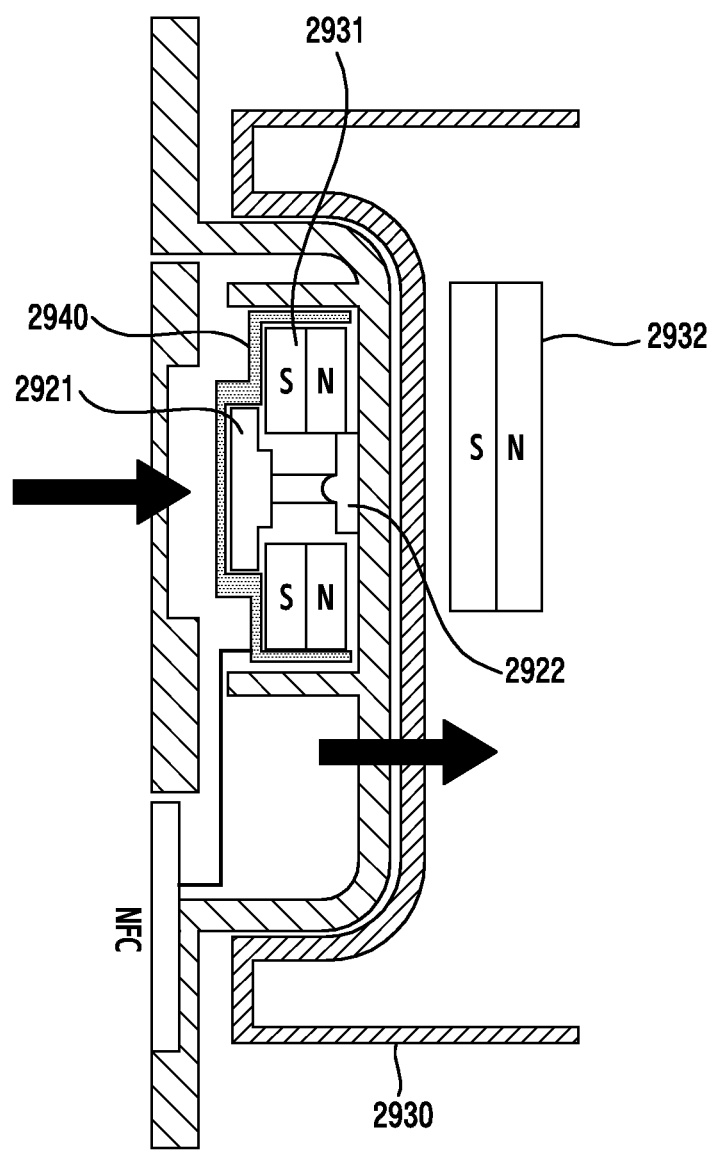
FIG. 29C is a cross-sectional view illustrating a state after a layered accessory case is coupled to a mounting body, and the cross-sectional view illustrating a mounting projection, taken along the line I-I' of FIG. 29A in a state after being coupled to the mounting body, according to an embodiment.

Referring to FIG. 29A to FIG. 29C, a case 2900 may be provided with a mounting projection 2910 on a rear side. The mounting projection 2910 may be coupled to a mounting body 2930 of a cradle, and the case 2900 may be mounted to the mounting body 2930. A contact switch and a magnetic switch may be disposed between the mounting projection 2910 and the mounting body 2930.

The contact switch may consist of a button 2922 fixed to an inner side of the mounting projection 2910 and a movement switch 2921 hidden inside the mounting projection 2910 and the movement switch 2921 moving based on a coupling force with respect to the mounting body 2930 when the button 2922 is pressed. The movement switch 2921 may be coupled to the NFC module to be provide with a service using the NFC module when the button 2922 is pressed. The movement switch may be supported by a movement body 2940 configured to be movable in a coupling direction of the mounting body 2930 in the mounting projection 2910. For example, the moving body 2940 may be a supporting body for supporting the movement switch 2921 and the first magnet 2931 while moving.

The magnetic coupling structure may include a first magnet 2931 disposed on the movement body 2940 and a second magnet 2932 disposed inside the mounting body 2930 to which the mounting projection 2910 is coupled.

When the case 2900 is fixed to the mounting body 2930 by a magnetic force between the first and second magnets 2931 and 2932, that is, an attractive force generated due to different polarities, the movement body 2930 may move towards the button 2922 due to the attractive force, and thus the switch 2921 may be turned on by being pressed by the button 2922. That is, a user may be provided with a desired service by automatically turning on the switch 2921 according to a mounting operation of the electronic device. When the case 2800 is mounted to the mounting body 2830, the switch 2821 may be simultaneously turned on, and the user may be provided with a service using a short-range communication module (e.g., an NFC module).

The provided service may be output to a display of the electronic device. The mounting projection 2910 may further have a guide 2950 for movement of the moving body 2940.

The first magnet 2931 may be disposed to face an inner side of the mounting projection 2910 at a position proximate to the contact switch 2921, for example, the first magnet 2931 may be disposed to cover the switch 2921 and the button 2922, and may be disposed on the movement body 2940. The first magnet 2931 may consist of a ring-shaped magnet, and may be disposed in parallel with the mounting projection.

The second magnet 2932 may be disposed on an inner portion in parallel with the flat portion 2931 in a state of facing the flat portion 2931 of the mounting body. The second magnet 2931 may be a fragment-shaped magnet.

Figure 30A:
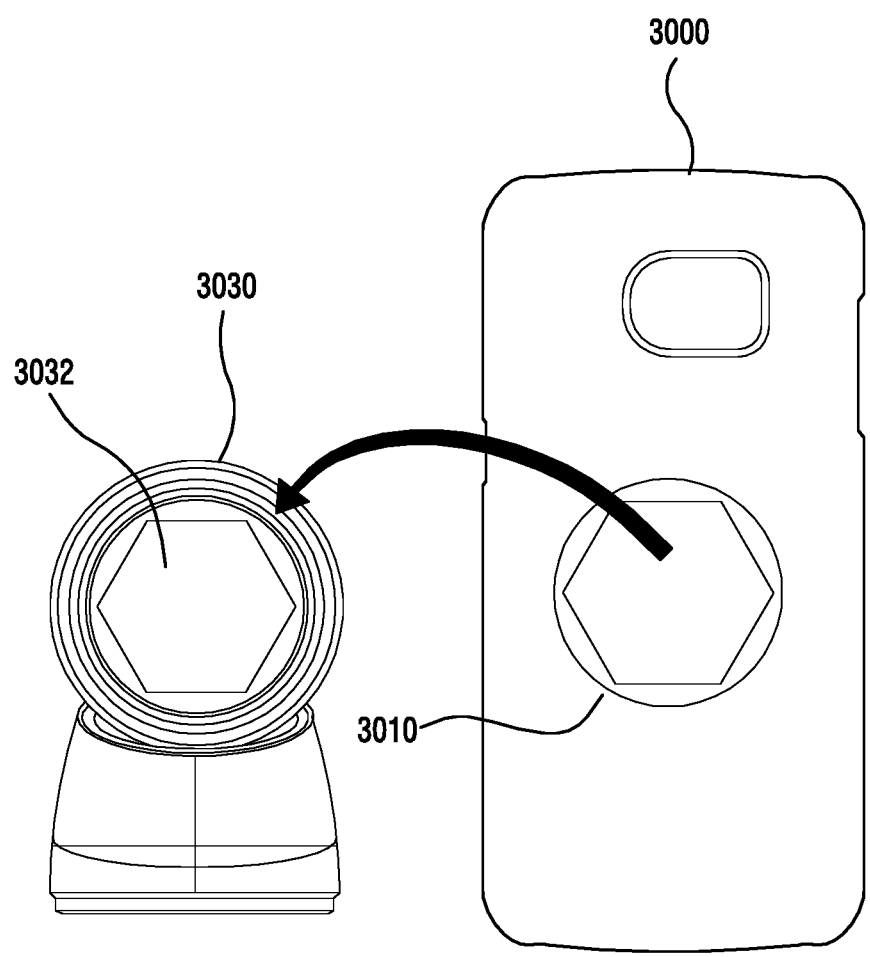
FIG. 30A is a front view illustrating a state before a case is coupled to a mounting body, according to an embodiment.

Referring to FIG. 30A, a coupling structure between a case 3000 and a mounting body 3030 may be configured. For example, in a top view, although it is exemplified that the coupling structure of FIG. 26A consists of a circular mounting projection 2610 and a flat portion of the circular mounting body, such a structure is not necessarily limited to a circular structure, and thus the structure may consist of various polygonal shapes.

Figure 30B:
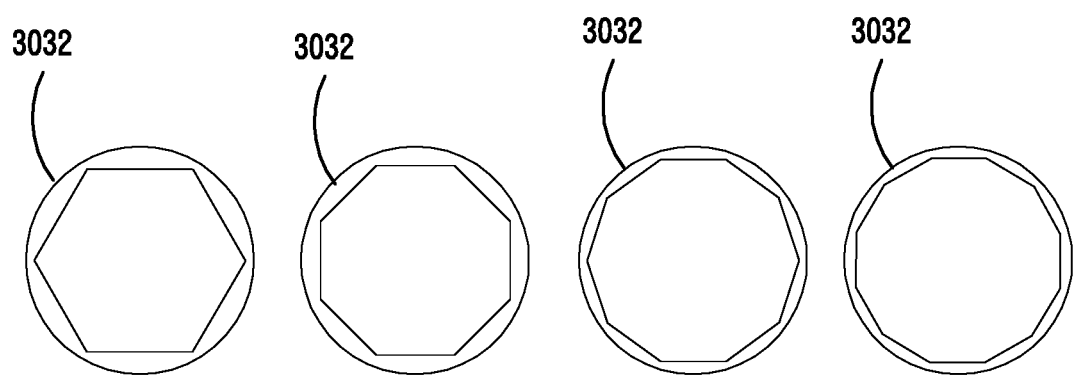
FIG. 30B illustrates examples of a flat portion of a mounting body, according to an embodiment.

FIG. 30B illustrates various polygonal (e.g., pentagonal, hexagonal, octagonal, or decagonal) flat portions in a flat portion 3032 of the mounting body 3030. A mounting projection 3010 of the corresponding case 3000 may also consist of various polygons. In a coupling structure in which a facing surface has a polygonal shape, the polygonal shape plays a role of a latch portion when the mounted case 3000 rotates, thereby preventing the mounted case 3000 from running idle.

Figure 31A:
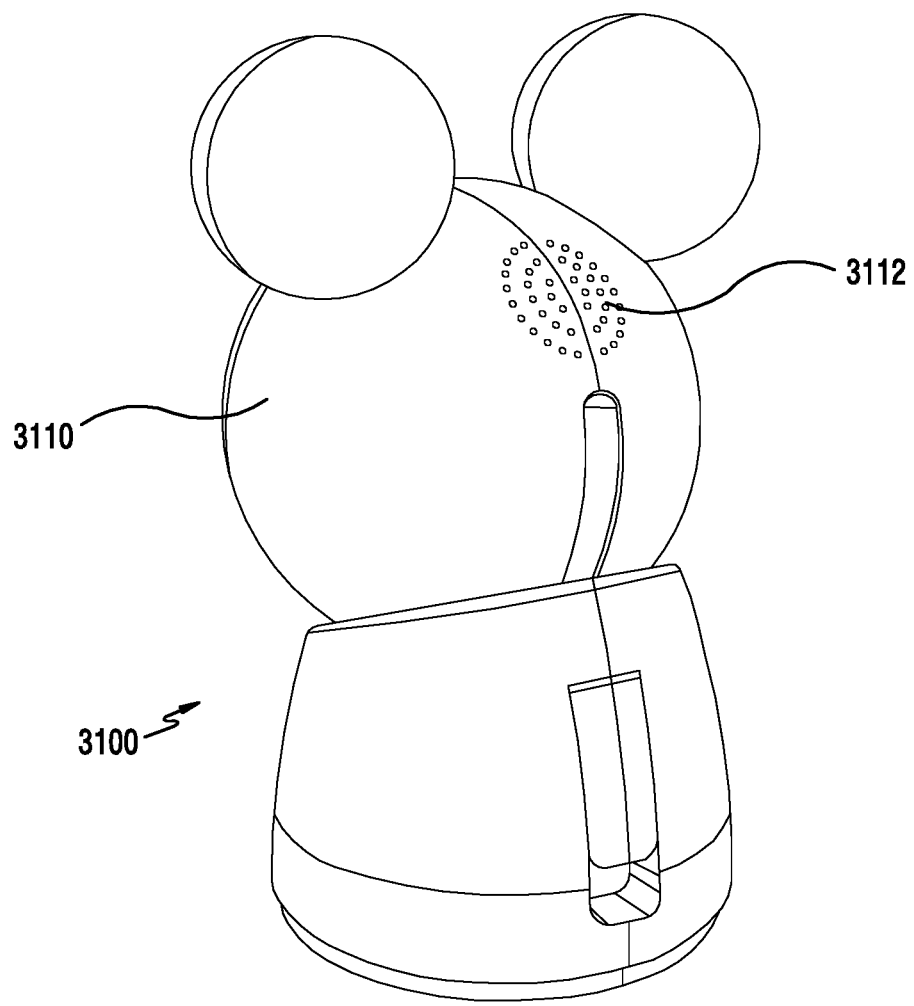
FIG. 31A is a perspective view illustrating a front side of a cradle, according to an embodiment.
Figure 31B:
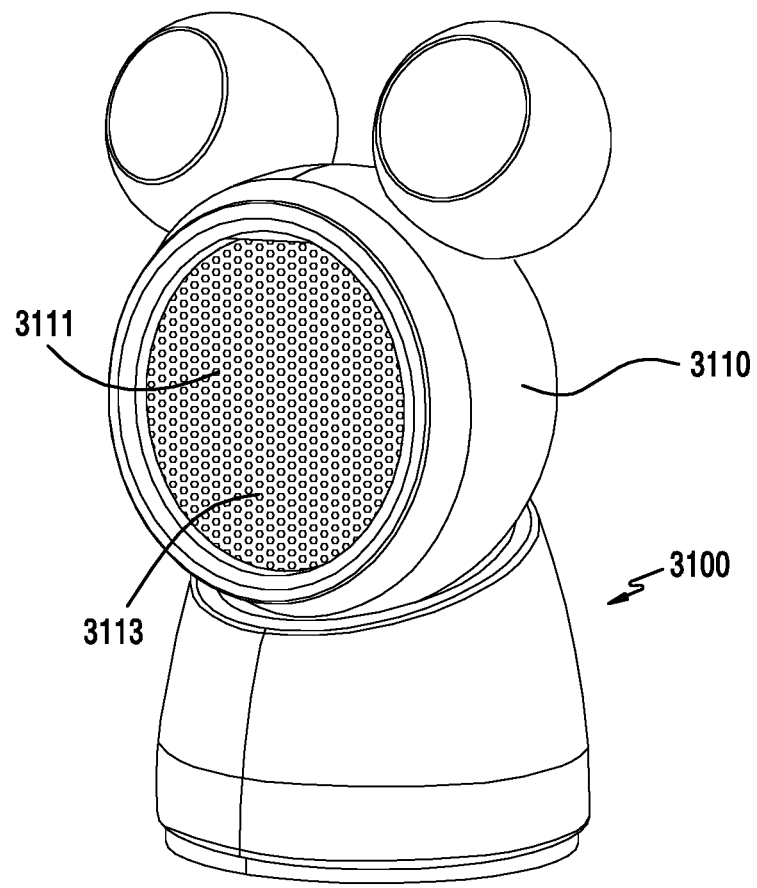
FIG. 31B is a perspective view illustrating a rear side of a cradle, according to an embodiment.
Figure 32A:
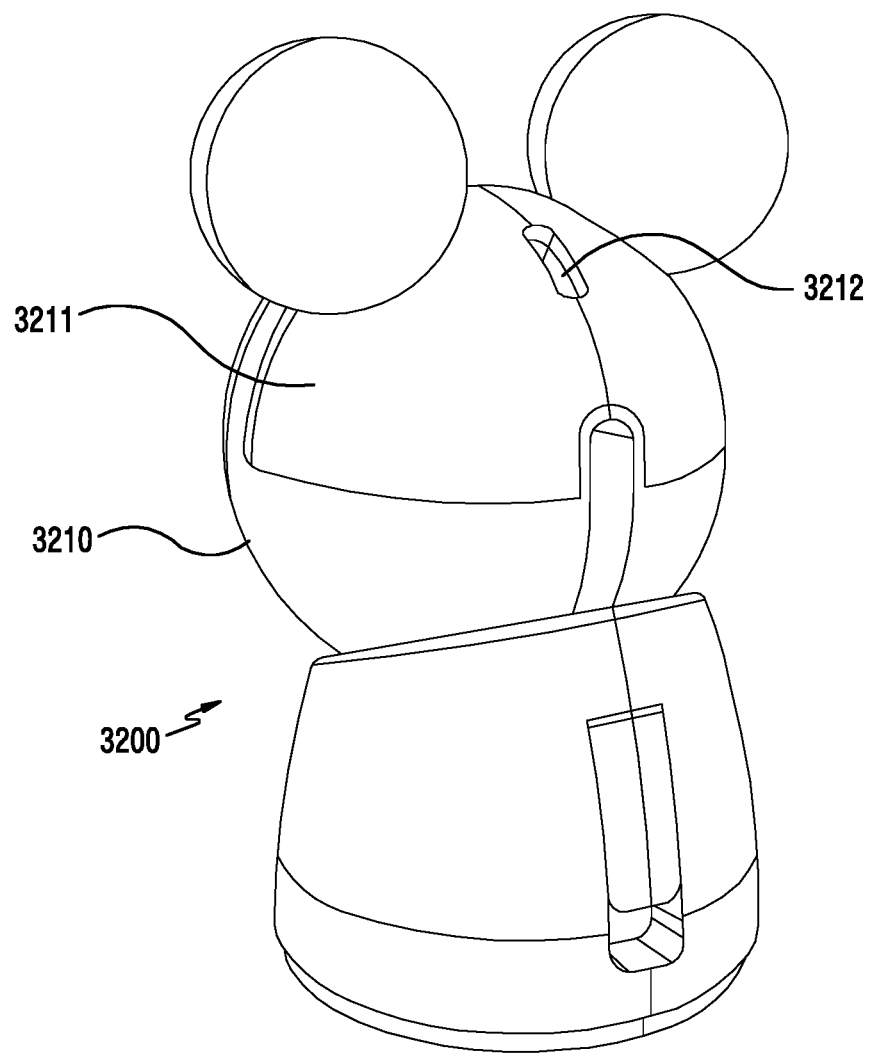
FIG. 32A is a perspective view illustrating a rear side of a cradle, according to an embodiment.
Figure 32B:
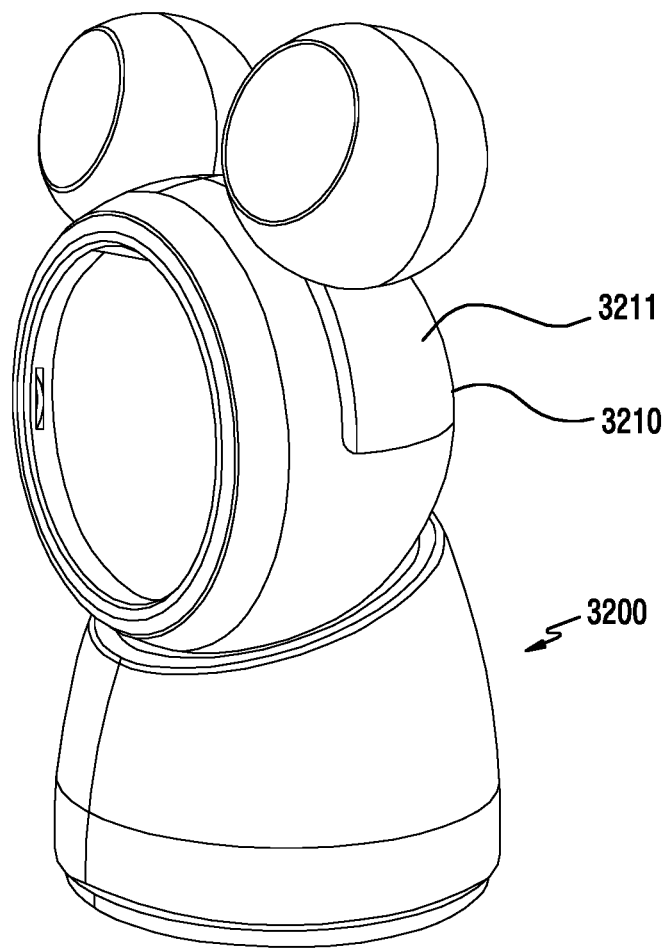
FIG. 32B is a perspective view illustrating a front side of a cradle, according to an embodiment.
Figure 32C:
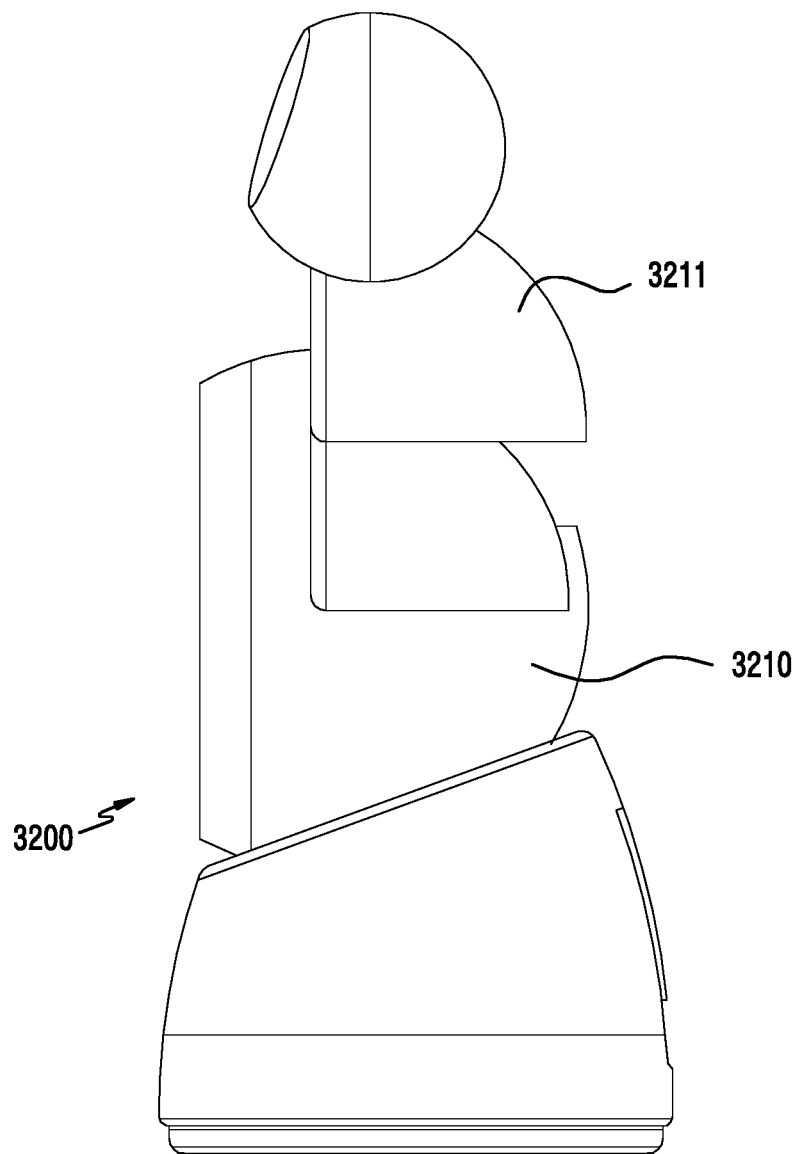
FIG. 32C is a lateral view illustrating a lateral side of a cradle, according to an embodiment.
Figure 32D:
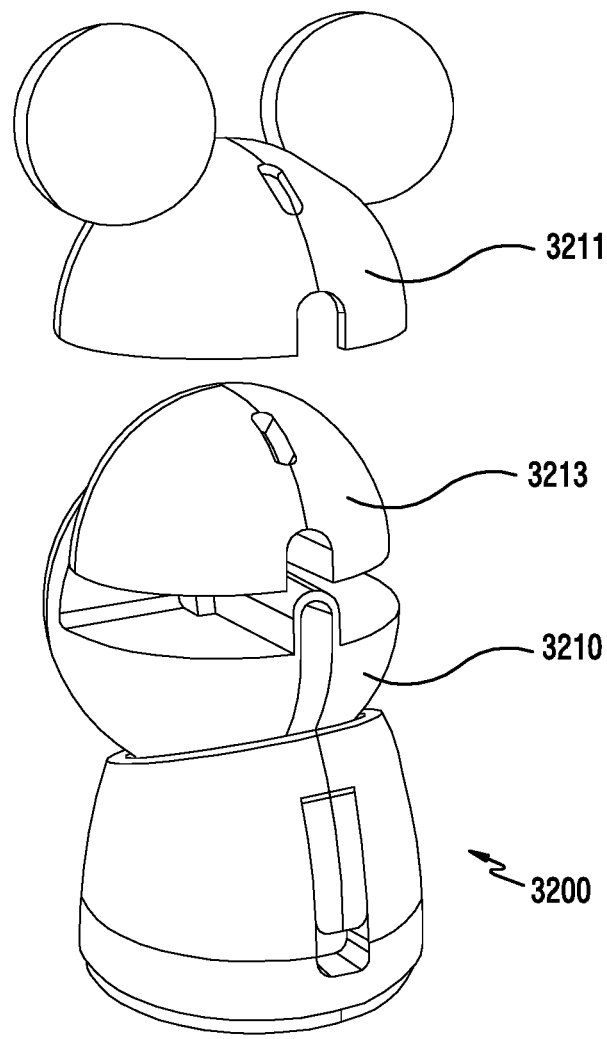
FIG. 32D is an exploded perspective view illustrating a cradle, according to an embodiment.

Referring to FIG. 31A and FIG. 31B, a cradle 3100 according to various embodiments may be utilized as a desk speaker. For example, a plurality of first speaker holes 3113 may be disposed in a flat portion 3111 provided on a front surface of the mounting body 3110 of the cradle to radiate a speaker sound.

A plurality of second speaker holes 3112 may be disposed on a rear side of the mounting body 3110 to radiate a speaker sound. The first and second speakers 3113 and 3112 may be a Bluetooth speaker disposed on respective mounting bodies.

The cradle 3100 may be utilized as a wireless charger. For example, a charging antenna and a coil may be disposed on a mounting projection of a case, and a coil may be disposed on the flat portion 3111 of the mounting body, thereby being able to charge an electronic device coupled to the case in a wireless manner.

Referring to FIG. 32A to FIG. 32D, a cradle may be utilized as a diffuser or an air freshener. For example, a hole 3212 may be disposed in a cover 3211 coupled to a rear side of the mounting body 3210 of the cradle 3200, and a storage space 3213 may be disposed inside the cover 3211 so as to be used as a desk diffuser or an air refresher.

Figure 33A:
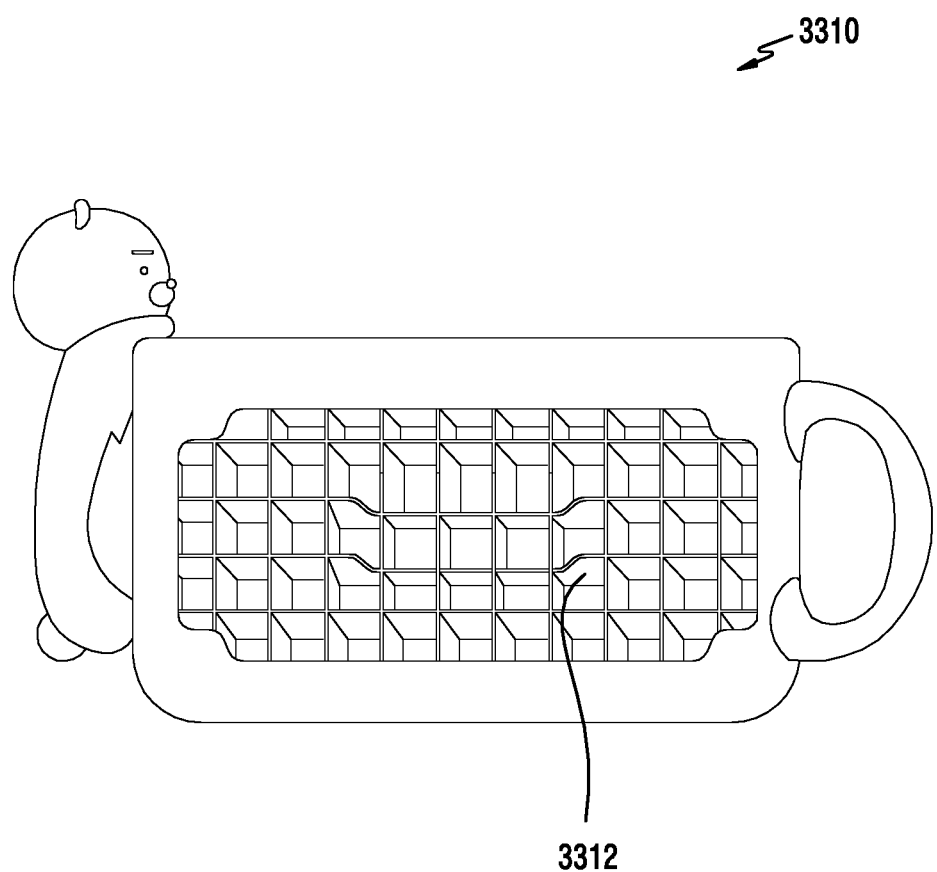
FIG. 33A is a front view illustrating a cradle, according to an embodiment.
Figure 33B:
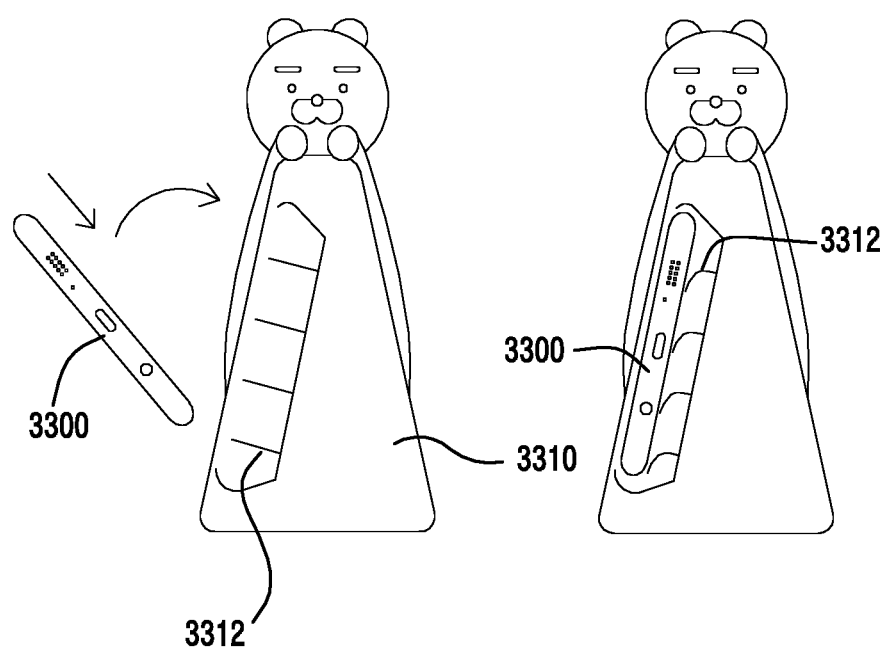
FIG. 33B is a lateral perspective view illustrating a state before and after an electronic device is mounted to a cradle, according to an embodiment.

Referring to FIG. 33A and FIG. 33B, a cradle 3310 is constructed of a flexible material for a cradle for kids, and may reliably mount an electronic device of various sizes by using an inner space, to which the electronic device 3300 is mounted, as a grid structure 3312. The inner grid structure 3312 provided in the cradle 3310 is constructed of a flexible material to absorb a shock or the like applied to the accommodated electronic device 3300. In addition, an exterior, and also the inner grid structure 3312, is constructed of a flexible material, and thus the cradle 3310 may accommodate and mount the electronic device of various sizes (e.g., a smartphone of various sizes may be mounted in the inner space).

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. An accessory case of an electronic device, the accessory case comprising:
    a case that can be coupled to or separated from the electronic device, the case including a front surface that contacts the electronic device when attached to the electronic device and a rear surface opposite the front surface;
    a sliding key disposed on the rear surface of the case;
    a bottom part disposed between the sliding key and the rear surface of the case, the bottom part configured to provide a space through which the sliding key moves;
    at least one switch disposed on the rear surface of the case, the at least one switch being turned on or off depending on whether the sliding key moves, wherein the at least one switch comprises:
        a first switch disposed on the bottom part to face the sliding key, wherein the first switch is interfered with by movement of at least a portion of the sliding key; and
        a second switch disposed in proximity to the first switch and turned on or off by at least the portion of the sliding key; and
    a short-range communication module electrically coupled to the first switch, and
    wherein the first switch is configured to transmit a signal to the short-range communication module when the first switch is turned on, and
    wherein the short-range communication module is configured to:
        activate, in response to receiving the signal, and
        communicate with a communication module of the electronic device for providing a near field communication service.

2. The accessory case of claim 1, wherein the first and second switches operate substantially simultaneously in response to the movement of the sliding key.

3. The accessory case of claim 2, wherein the first switch is a micro switch, and the second switch is a magnetic switch.

4. The accessory case of claim 3, wherein the sliding key has a trigger, and the micro switch is turned on or off by a sliding movement of the trigger.

5. The accessory case of claim 4, wherein the trigger is disposed to face the micro switch and is disposed to be interfered with.

6. The accessory case of claim 3, wherein the magnetic switch comprises:
    a magnet disposed on at least a portion of the sliding key; and
    a magnetic sensor disposed on the electronic device,
    wherein the magnetic switch is turned off when the magnet and the magnetic sensor are disposed so as not to overlap, and is turned on when the magnet and the magnetic sensor are disposed so as to overlap.

7. The electronic device of claim 6, wherein the short-range communication module of the accessory case is further configured to, when the magnetic switch is turned on, change a state of the electronic device to an unlocked state from a locked state.

* * * * *